(12) United States Patent
Clem et al.

(10) Patent No.: US 7,979,358 B1
(45) Date of Patent: Jul. 12, 2011

(54) QUALITY ASSURANCE OF IMAGE-CUSTOMIZATION OF COMPUTER-BASED VALUE-BEARING ITEMS

(75) Inventors: John Roland Clem, Hermosa Beach, CA (US); Daniel David Farino, Santa Monica, CA (US); Kenneth Thomas McBride, Hermosa Beach, CA (US); Michael John Biswas, Los Angeles, CA (US); James Bortnak, Glendale, CA (US); Bry Willis, Beverly Hills, CA (US)

(73) Assignee: Stamps.com Inc., Los Angeles, CA (US)

( * ) Notice: Subject to any disclaimer, the term of this patent is extended or adjusted under 35 U.S.C. 154(b) by 1154 days.

(21) Appl. No.: 11/114,964

(22) Filed: Apr. 25, 2005

Related U.S. Application Data

(63) Continuation-in-part of application No. 10/994,914, filed on Nov. 22, 2004.

(60) Provisional application No. 60/591,535, filed on Jul. 27, 2004.

(51) Int. Cl.
 *G06Q 10/00* (2006.01)
(52) U.S. Cl. .................................. 705/300; 705/401
(58) Field of Classification Search .................. None
See application file for complete search history.

(56) References Cited

U.S. PATENT DOCUMENTS

| | | | |
|---|---|---|---|
| 4,831,554 A | 5/1989 | Storace et al. | |
| 4,831,555 A | 5/1989 | Sansone et al. | |

(Continued)

FOREIGN PATENT DOCUMENTS

JP 2005132049 5/1993

(Continued)

OTHER PUBLICATIONS

"New Version of Leading A2iA CheckReader Recognition SOftware Now Integrates Document Identification, Image Usability Testing and Handwritten Address Capture." Business Wire, Monday, Apr. 26, 2004.*

(Continued)

*Primary Examiner* — Rutao Wu
(74) *Attorney, Agent, or Firm* — Khorsandi Patent Law Group, A Law Corporation; Marilyn R. Khorsandi

(57) ABSTRACT

The exemplary embodiment of the present invention will provide methods and a computer system for managing image content review for image customization of computer-based value-bearing items such as, for example, an exemplary image-customized computer-based postage label 1 in an exemplary embodiment of the present invention as depicted in FIG. 1. With reference to FIG. 1, the exemplary customized computer-based postage label 1 will bear an image 2 that would be provided by a corresponding user, namely by the user that orders the customized computer-based postage label. The user may provide image 2 in an electronic form, such as by uploading a digital representation of image 2. In a variation of the exemplary embodiment, a user could alternatively provide a hardcopy image. The exemplary customized computer-based postage label 1 will bear a human-readable indication of the country 4 for which the postage is approved. The exemplary customized computer-based postage label 1 will also bear a human-readable indication of an amount of postage 5. The exemplary customized computer-based postage label 1 will also bear a human-readable identifier (such as a serial number) 6 that will uniquely identify the particular customized computer-based postage label. The exemplary customized computer-based postage label 1 will also bear a machine-readable set of information 7.

18 Claims, 32 Drawing Sheets

U.S. PATENT DOCUMENTS

| | | | |
|---|---|---|---|
| 4,872,706 | A | 10/1989 | Brewen et al. |
| 5,360,628 | A | 11/1994 | Butland |
| 5,384,886 | A | 1/1995 | Rourke |
| 5,410,642 | A | 4/1995 | Hakamatsuka et al. |
| 5,423,573 | A | 6/1995 | de Pasille |
| 5,425,586 | A | 6/1995 | Berson et al. |
| 5,449,200 | A | 9/1995 | Andric |
| 5,471,925 | A | 12/1995 | Heinrich et al. |
| 5,494,445 | A | 2/1996 | Sekiguchi |
| 5,510,992 | A | 4/1996 | Kara |
| 5,524,995 | A | 6/1996 | Brookner et al. |
| 5,554,842 | A | 9/1996 | Connell et al. |
| 5,617,519 | A | 4/1997 | Herbert |
| 5,651,238 | A | 7/1997 | Belec et al. |
| 5,666,215 | A | 9/1997 | Fredlund et al. |
| 5,682,318 | A | 10/1997 | Kara |
| 5,717,597 | A | 2/1998 | Kara |
| 5,717,980 | A | 2/1998 | Oka et al. |
| 5,737,729 | A | 4/1998 | Denman |
| 5,801,944 | A | 9/1998 | Kara |
| 5,812,991 | A | 9/1998 | Kara |
| 5,819,240 | A | 10/1998 | Kara |
| 5,923,406 | A | 7/1999 | Brasington et al. |
| 5,932,139 | A | 8/1999 | Oshima |
| 6,033,751 | A | 3/2000 | Kline |
| 6,175,826 | B1 | 1/2001 | Malandra et al. |
| 6,181,433 | B1 | 1/2001 | Hayama et al. |
| 6,208,980 | B1 | 3/2001 | Kara |
| 6,234,694 | B1 | 5/2001 | Brookner |
| 6,249,777 | B1 | 6/2001 | Kara |
| 6,311,240 | B1 | 10/2001 | Boone et al. |
| 6,322,192 | B1 | 11/2001 | Walker |
| 6,415,983 | B1 | 7/2002 | Ulvr et al. |
| 6,427,021 | B1 | 7/2002 | Fischer et al. |
| 6,428,219 | B1 | 8/2002 | Stier et al. |
| 6,438,530 | B1 | 8/2002 | Heiden |
| 6,523,014 | B1 | 2/2003 | Pauschinger |
| 6,526,391 | B1 | 2/2003 | Cordery et al. |
| 6,595,412 | B2 | 7/2003 | Manduley |
| 6,655,579 | B1 | 12/2003 | Delman et al. |
| 6,671,813 | B2 | 12/2003 | Ananda |
| 6,692,031 | B2 | 2/2004 | McGrew |
| 6,697,822 | B1 * | 2/2004 | Armatis et al. ................ 1/1 |
| 6,834,112 | B1 | 12/2004 | Brickell |
| 6,868,406 | B1 | 3/2005 | Ogg et al. |
| 6,904,168 | B1 * | 6/2005 | Steinberg et al. ............. 382/165 |
| 6,946,960 | B2 | 9/2005 | Sisson et al. |
| 7,127,434 | B2 | 10/2006 | Burningham |
| 7,149,726 | B1 | 12/2006 | Lingle et al. |
| 7,162,460 | B2 | 1/2007 | Cleckler et al. |
| 7,191,158 | B2 | 3/2007 | Ogg et al. |
| 7,201,305 | B1 | 4/2007 | Correa |
| 7,933,845 | B1 | 4/2007 | Leon et al. |
| 7,222,236 | B1 | 5/2007 | Pagel |
| 7,234,645 | B2 | 6/2007 | Silverbrook et al. |
| 7,243,842 | B1 | 7/2007 | Leon et al. |
| RE39,779 | E | 8/2007 | Kovlakas |
| 7,305,556 | B2 | 12/2007 | Slick et al. |
| 7,396,048 | B2 | 7/2008 | Janetzke et al. |
| 7,418,599 | B2 | 8/2008 | Peters |
| 7,509,291 | B2 | 3/2009 | McBride et al. |
| 7,577,618 | B2 | 8/2009 | Raju |
| 2001/0042052 | A1 | 11/2001 | Leon |
| 2001/0054153 | A1 | 12/2001 | Wheeler et al. |
| 2002/0023057 | A1 | 2/2002 | Goodwin et al. |
| 2002/0033598 | A1 | 3/2002 | Beasley |
| 2002/0046195 | A1 | 4/2002 | Martin |
| 2002/0073039 | A1 | 6/2002 | Ogg et al. |
| 2002/0083020 | A1 | 6/2002 | Leon |
| 2002/0083021 | A1 | 6/2002 | Ryan et al. |
| 2002/0149195 | A1 | 10/2002 | Beasley |
| 2002/0190117 | A1 | 12/2002 | Manduley |
| 2003/0002709 | A1 | 1/2003 | Wu |
| 2003/0030270 | A1 | 2/2003 | Franko et al. |
| 2003/0037008 | A1 | 2/2003 | Raju |
| 2003/0059635 | A1 | 3/2003 | Naasani |
| 2003/0078893 | A1 | 4/2003 | Shah et al. |
| 2003/0088426 | A1 | 5/2003 | Benson et al. |
| 2003/0140017 | A1 * | 7/2003 | Patton et al. ................ 705/410 |
| 2003/0144972 | A1 | 7/2003 | Cordery et al. |
| 2004/0070194 | A1 | 4/2004 | Janetzke et al. |
| 2004/0174012 | A1 | 9/2004 | Hagen |
| 2004/0200902 | A1 | 10/2004 | Ishioroshi |
| 2004/0215523 | A1 | 10/2004 | Wulff et al. |
| 2004/0220935 | A1 | 11/2004 | McGraw et al. |
| 2004/0236938 | A1 | 11/2004 | Callaghan |
| 2004/0241424 | A1 | 12/2004 | Barbera-Guillem |
| 2004/0254898 | A1 | 12/2004 | Parker et al. |
| 2005/0071296 | A1 | 3/2005 | Lepkofker |
| 2005/0071297 | A1 | 3/2005 | Kara |
| 2005/0080751 | A1 | 4/2005 | Burningham |
| 2005/0082818 | A1 | 4/2005 | Mertens |
| 2005/0114276 | A1 | 5/2005 | Hunter et al. |
| 2005/0195214 | A1 | 9/2005 | Reid et al. |
| 2006/0116971 | A1 | 6/2006 | Beckstrom et al. |
| 2006/0136347 | A1 | 6/2006 | Reichelsheimer et al. |
| 2006/0173796 | A1 | 8/2006 | Kara |
| 2006/0287096 | A1 | 12/2006 | O'Kelley et al. |
| 2007/0005518 | A1 | 1/2007 | Beckstrom et al. |
| 2007/0011995 | A1 | 1/2007 | Weaver et al. |
| 2007/0017985 | A1 | 1/2007 | Lapstun et al. |
| 2007/0100672 | A1 | 5/2007 | McBride et al. |
| 2007/0198441 | A1 | 8/2007 | Kara |
| 2007/0255664 | A1 | 11/2007 | Blumberg et al. |
| 2009/0125561 | A1 | 5/2009 | Garcia |

FOREIGN PATENT DOCUMENTS

| | | |
|---|---|---|
| JP | 2005215905 | 8/2005 |
| WO | 9519016 | 7/1995 |

OTHER PUBLICATIONS

"Pornography: Prevent It Being e-mailed Into and Out of Your Company." Business Wire, Wednesday, Sep. 20, 2000.*

United States Patent Office; Office Action dated Apr. 17, 2008 for McBride et al.;Customized Computer-Value Bearing Item Quality Assurance; U.S. Appl. No. 10/994,914, filed Nov. 22, 2004.

United States Patent Office; Office Action dated May 29, 2008 for Huebner et al.; Printing of Computer-Based Value-Bearing Items; U.S. Appl. No. 10/994,728, filed Nov. 22, 2004.

United States Patent Office; Office Action dated Aug. 19, 2008 for Leon et al.; Image-Customization of Computer-Based Value-Bearing Items; U.S. Appl. No. 10/994,698, filed Nov. 22, 2004.

United States Patent Office; Notice of Allowance dated Jan. 5, 2007 for Huebner et al.; Computer-Based Value-Bearing Item Customization Security; U.S. Appl. No. 10/994,768, filed Nov. 22, 2004.

United States Patent Office; Office Action dated Jun. 19, 2007 for Mc Bride et al.; Formatting Value-Bearing Item Indicia; U.S. Appl. No. 11/635,871, filed Dec. 8, 2006.

United States Patent Office; Office Action dated Dec. 12, 2007 for Mc Bride et al.; Formatting Value-Bearing Item Indicia; U.S. Appl. No. 11/635,871, filed Dec. 8, 2006.

United States Patent Office; Notice of Allowance dated Jul. 15, 2008 for Mc Bride et al.; Formatting Value-Bearing Item Indicia; U.S. Appl. No. 11/635,871, filed Dec. 8, 2006.

McBride, et al.; Image-Customized Labels Adapted for Bearing Computer-Based, Generic, Value-Bearing Items, and Systems and Methods for Providing Image-Customized Labels U.S. Appl. No. 11/475,298, filed Jun. 26, 2006; pp. 1-42; Figs. 1-11; Throughout.

Clem; Rolls of Image-Customized Value-Bearing Items and Systems and Methods for Providing Rolls of Image-Customized Value-Bearing Items; U.S. Appl. No. 11/435,453, filed May 16, 2006; pp. 1-52; Figs. 1-12; Throughout.

Leon; Systems and Methods for Creating and Providing Shape-Customized, Computer-Based, Value-Bearing Items; U.S. Appl. No. 11/644,458, filed Dec. 20, 2006; pp. 1-53; Figs. 1-21.

Leon, et al.; Computer-Based Value-Bearing Item Customization Security; U.S. Appl. No. 11/729,148, filed Mar. 27, 2007; pp. 1-6 and 85-93.

Leon, et al.; Computer-Based Value-Bearing Item Customization Security; U.S. Appl. No. 11/729,239, filed Mar. 28, 2007; pp. 1-6 and 85-93.

"Picture It Postage by endicia," http://www.pictureitpostage.com/PhotoEditor/EditImage.cfm, Endicia; printed on Nov. 17, 2006; 2 pages.

"Zazzle Custom Stamps for Business; Zazzel.com Pitney Bowes," http://www.zazzle.com/stamps/design.asp, Pitney Bowes; printed on Nov. 16, 2006; 2 pages.

"What's selling: from bricks and mortar to bricks and clicks", Playthings Magazine, Feb. 1, 2003 (3 pages).

Porter, William, "Personal Postage Canadians take to vanity stamps in very big way", Denver Post, Jul. 9, 2000 (2 pages).

McBride, et al.; Customized Computer-Based Value-Bearing Item Quality Assurance; U.S. Appl. No. 10/994,914, filed Nov. 22, 2004; pp. 1-6 and 85-93.

Huebner, et al.; Printing of Customized Computer-Based Value-Bearing Items; U.S. Appl. No. 10/994,728, filed Nov. 22, 2004; pp. 1-4 and 82-86.

Leon, et al.; Image-Customization of Computer-Based Value-Bearing Items; U.S. Appl. No. 10/944,698, filed Nov. 22, 2004; pp. 1-5 and 84-90.

Leon, et al.; Image-Customization of Computer-Based Value-Bearing Items; U.S. Appl. No. 10/994,768, filed Nov. 22, 2004; pp. 1-6 and 85-93.

Canada Post Corporation; "Collecting—Picture Postage", 3 pages, © 2004, http://www.canadapost.ca/personal/collectino/default-e.asp?stamp=postage.

Personal Postage Corporation; "Personal Postage", 1 page, Undated, http://www.personalpostage.com, Printed Jul. 20, 2004.

Personal Postage Corporation; "Personal Postage", 2 pages, Undated, http://www.personalpostage.com/home.htm, printed Jul. 20, 2004.

Canada Post International, LLC; "Personal Postage", 2 psges, Undated, http://www.personalpostage.com/Canada%20Post.htm, printed Jul. 20, 2004.

Personal Postage Corporation; "Quick Reference Guide"; 8 pages; Undated; http://www.personalpostage.com/Om_page1.htm,_page2.htm,_page3.htm_page4.htm, printed Jul. 20, 2004.

Avery Dennison Corporation; "Avery Creative Postage Labels", 4 pages, http://www.creativepostagelabels.avery.com/postage_aap.html; © 1996-2004.

Avery Dennison Corporation; "Avery Creative Postage Labels", 2 pages, http://www.creativepostagelabels.avery.com/order.php; © 1996-2004.

Canadian Post; picture stamp sample, undated, prior to Jul. 27, 2004, 1 page.

Canadian Post; Set of pictures and address labels; sample undated, prior to Jul. 27, 2004, 1 page.

"It's in the mail: a personalized postcode for life", an article about Royal Mail picture stamps, date unknown (prior to Jul. 27, 2004), publication unknown, 1 page.

Australian Post sample; Jul. 7-16, 2000; Anaheim, CA, 1 page.

Office Action for U.S. Appl. No. 10/994,914, dated Dec. 10, 2008, pp. 1-28, USPTO.

Office Action for U.S. Appl. No. 10/994,728, dated Jan. 26, 2009, pp. 1-16, USPTO.

Office Action for U.S. Appl. No. 10/994,698, dated Mar. 4, 2009, pp. 1-16.

Office Action for U.S. Appl. No. 11/475,298, dated Jan. 21, 2009, pp. 1-14.

Notice of Allowance for U.S. Appl. No. 11/635,871, dated Nov. 17, 2008, pp. 1-12.

United States Postal Service, "Information-Based Indicia Program (IBIP) Performance Criteria for Information-Based Indicia and Security Architecture for Closed IBI Postage Metering Systems (PCIBI-C)", Published Jan. 12, 1999, pp. 1-49.

U.S. Appl. No. 11/509,309, filed Aug. 24, 2006; pp. 1-14, and 2 pages of drawings.

Office Action for U.S. Appl. No. 10/994,914; pp. 1-6, dated Apr. 29, 2009, USPTO.

Office Action for U.S. Appl. No. 10/994,914; pp. 1-35, dated Aug. 26, 2009, USPTO.

Office Action for U.S. Appl. No. 10/994,728; pp. 1-14, dated Aug. 19, 2009, USPTO.

Office Action for U.S. Appl. No. 10/994,698; pp. 1-14, dated Aug. 3, 2009, USPTO.

Office Action for U.S. Appl. No. 11/475,298; pp. 1-22, dated Sep. 15, 2009, USPTO.

Office Action for U.S. Appl. No. 11/644,458; pp. 1-10, dated Aug. 11, 2009, USPTO.

Office Action for U.S. Appl. No. 11/644,458; pp. 1-16, dated Apr. 16, 2009, USPTO.

J.P. Leon; "Mail Piece Processing"; U.S. Appl. No. 12/316,542, filed Dec. 11, 2008 (including specification pp. 1-58 and drawings pp. 59-72).

John Roland Clem; "Automatic Guarantee Delivery Tracking and Reporting for United States Postal Service Postage Refunds for Paid Computer-Based Postage"; U.S. Appl. No. 12/500,970, filed Jul. 10, 2009 (including specification pp. 1-49 and drawings pp. 50-67).

Office Action for U.S. Appl. No. 10/994,914, dated Mar. 15, 2010, pp. 1-31, USPTO.

Office Action for U.S. Appl. No. 10/994,728, dated Mar. 16, 2010, pp. 1-14, USPTO.

Office Action for U.S. Appl. No. 11/644,458, dated Dec. 4, 2009, pp. 1-17, USPTO.

Office Action for U.S. Appl. No. 11/729,239, dated Dec. 9, 2009, pp. 1-7, USPTO.

Jay Bigalke, "Small business personalized stamps", publication date unknown; undated; article shows stamp label bearing a date of Jan. 14, 2006, 1 page.

Pitney Bowes, "Create personal postage—Custom postage Stamp Expresssions Printer, How the Stamp Expressions Printer Works", http://www.stampexpressions.com/how_it_works.cfm; undated, printed Nov. 11, 2009, 2 pages.

Office Action for U.S. Appl. No. 10/994,914, dated Jul. 21, 2010, pp. 1-38, USPTO.

Office Action for U.S. Appl. No. 10/994,698, dated May 11, 2010, pp. 1-22, USPTO.

Office Action for U.S. Appl. No. 11/435,453, dated Apr. 21, 2010, pp. 1-13, USPTO.

Notice of Allowance for U.S. Appl. No. 11/435,453, dated Aug. 5, 2010, pp. 1-18, USPTO.

Office Action for U.S. Appl. No. 11/644,458, dated May 7, 2010, pp. 1-99, USPTO.

Office Action for U.S. Appl. No. 11/729,148, dated May 13, 2010, pp. 1-15, USPTO.

Notice of Allowance for U.S. Appl. No. 11/729,148, dated Sep. 1, 2010, pp. 1-74, USPTO.

Notice of Allowance for U.S. Appl. No. 11/729,239, dated Jun. 24, 2010, pp. 1-21, USPTO.

Office Action for U.S. Appl. No. 10/991,241, dated Jul. 19, 2005, pp. 1-16, USPTO.

Office Action for U.S. Appl. No. 10/991,241, dated Jan. 31, 2006, pp. 1-13, USPTO.

Office Action for U.S. Appl. No. 10/991,241, dated Oct. 31, 2006, pp. 1-14, USPTO.

Office Action for U.S. Appl. No. 10/991,241, dated Jul. 12, 2007, pp. 1-16, USPTO.

Office Action for U.S. Appl. No. 10/991,241, dated Dec. 31, 2007, pp. 1-15, USPTO.

Office Action for U.S. Appl. No. 10/991,241, dated Jul. 7, 2008, pp. 1-13, USPTO.

Examiner's Answer for U.S. Appl. No. 10/991,241, dated Feb. 19, 2009, pp. 1-14, USPTO.

Administrative Judge Anton W. Fetting, Appeal Decision for U.S. Appl. No. 10/991,241, dated Apr. 20, 2010, pp. 1-9, USPTO.

Notice of Abandonment for U.S. Appl. No. 10/991,241, dated Jun. 30, 2010, pp. 1-2, USPTO.

* cited by examiner

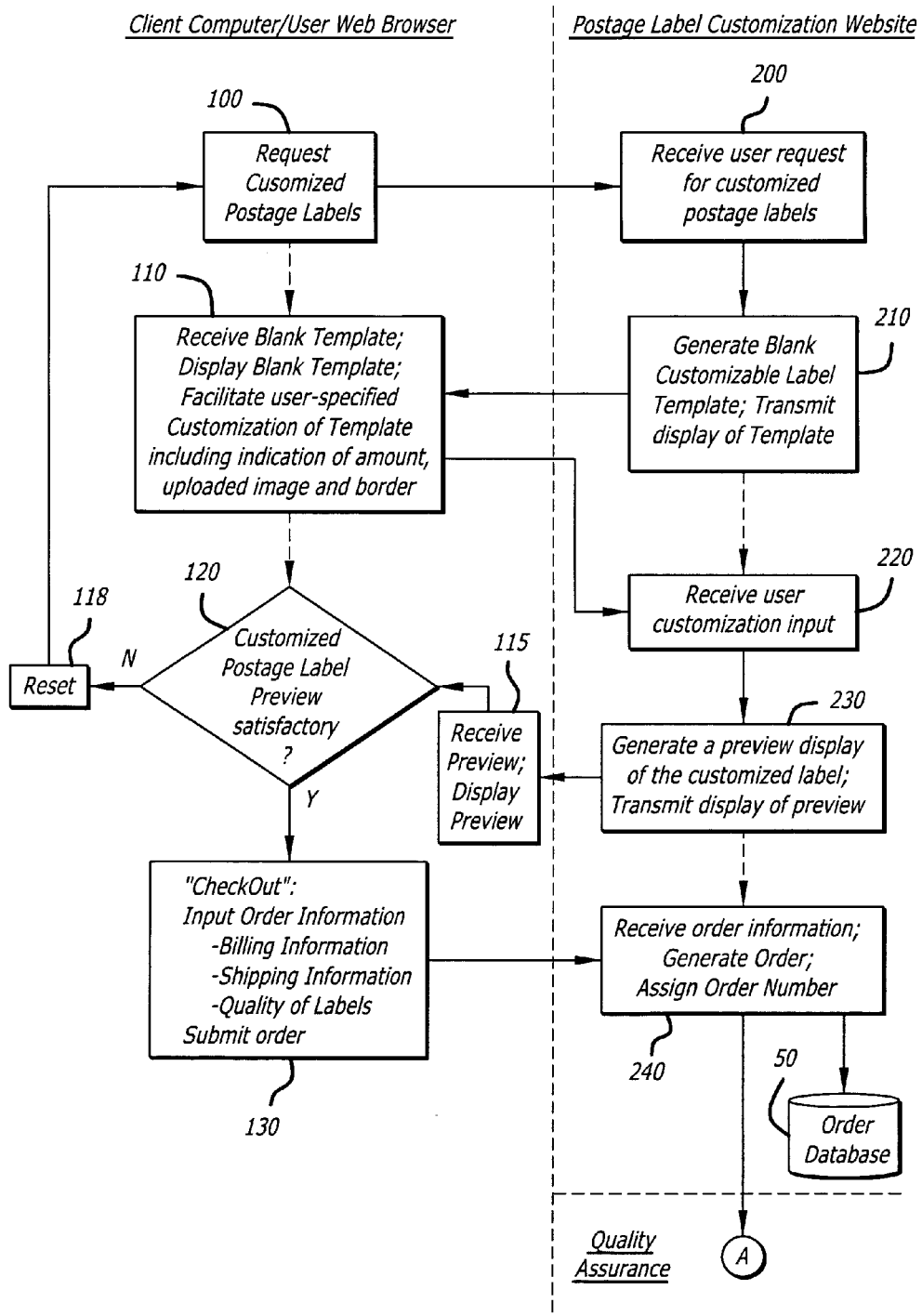

| Indicia Content Description |
|---|
| Indicia Content |
| IBI Version    06062S<br>MATS Model ID    N/A<br>PSD    IBM 4758 Host |

| Field Order in Indicia | Field Length Bytes | Fixed Value | Format | Description | |
|---|---|---|---|---|---|
| 1 | 1 | 06 | Binary | Indicia Version | 441 |
| 2 | 2 |  | Binary | Software ID | 442 |
| 3 | 3 |  | Binary | Postage Value | 443 |
| 4 | 2 | 06 | Text | IBI Vendor | 444 |
| 5 | 2 | 2S | Binary | Model ID | 445 |
| 6 | 8 |  | Binary | Indicia ID Number | 446 |
| 7 | 2 |  | Binary | Encoder values | 447 |

Total Bytes=20

PhotoStamps™                    home | learn more | help | my account | cart

Billing Information
Update your confidential credit card information or billing address.
Type in the new information and click "Confirm your Order"

Reuse a previous card — 651

( Confirm your order ) — 652

Card Type [Visa ▽] — 653 / 654

[MASTERCARD] [VISA] [AMERICAN EXPRESS] [DISCOVER]

| Name On Card | John Doe | — 655 |
| Card Number | 4111111111111111 | — 656 |
| Expiration Date | 99/99 | — 657 |

658 — ☐ Do not save this card
659 — ☑ Billing Address same as Shipping?

| First Name | John | — 660 |
| Last Name | Doe | — 661 |
| Street Address | 1111 Any Street | — 662 |
| Apt/Ste/Unit |  | — 663 |
| City | City | — 664 |
| State | State | — 665 |
| Zip | 11111-1111 | — 666 |
| Daytime Phone | 999-555-1212 | — 667 |
| Evening Phone | 999-555-1212 | — 668 |
| Email Address | myemail@someemail.com | — 669 |

( Confirm your order ) — 670

- 
- 
- illegal activities, celebrities or celebrity likenesses, regional, national or international leaders or politicians, current or former world leaders, convicted criminals, or newsworthy, notorious or infamous images and individuals;
D. To upload material that emulates any form of valid indicia or payment for postage;
E. To upload, order for print, or otherwise transmit or communicate any material that you do not have a right to transmit or communicate under any contractual or fiduciary relationship or which infringes any copyright, trade mark, patent or other intellectual property right or any moral right of any party;
F. To harm minors in any way, including, but not limited to, content that violates child pornography laws, child sexual exploitation laws and laws prohibiting the depiction of minors engaged in sexual conduct; and
G. To upload or otherwise transmit any material which is likely to cause harm to PhotoStamps or anyone else's computer systems, including but not limited to that which contains any virus, code, worm, data or other files or programs designed to damage or allow unauthorized access to the PhotoStamps service or which may cause any defect, error, malfunction or corruption to the service.

You agree that If Stamps.com, in its sole discretion, determines that any material you upload may not meet these content requirements, Stamps.com may reject your order without explanation. Stamps.com reserves the right to charge a processing fee of $10.00 for each image, graphic or photograph that you submit as an order in the PhotoStamps service which violates our content restrictions.

} 300

4. Suspension and Termination of Access

You agree that Stamps.com may at any time without notice:

A. Refuse to accept your orders for PhotoStamps service;
B. Move or suspend any part of the PhotoStamps service; or
C. Refuse to fulfill any order, or any part of any order or terminate your account and delete any content stored in your account if, in Stamps.com's sole discretion, you fail to comply with any of these Terms or if a competent regulatory authority requires Stamp.com to do so.

PhotStamps by Stamps.com will not be liable to you or any third party for any suspension or termination of your access to the Website or failure to produce any Postage, except that PhotStamps by Stamps.com will refund to you any amounts paid by you for Products not produced.

} 310

5. Reporting Violations of your Intellectual Property

Stamps.com is committed to protecting intellectual property. Each user of PhotoStamps by Stamps.com is required by law and these Terms to own the right to or to obtain permission to use any image to create Postage. If you believe your intellectual property or other legal rights ("Intellectual Property") have been infringed, please contact us at the following address.

Customer Service
ATTN: IP Protection
Stamps.com Inc.
12959 Coral Tree Place
Los Angeles, CA 90066
Fax: (310) 482-5900
Email: ip@stamps.com Please provide us with the following and any other relevant information, which Stamps.com may then forward to the alleged infringer:

1. Identify the Intellectual Property that you claim has been infringed;
2. Provide a photocopy or scanned image of the allegedly infringing Postage for identification purposes;
3. Provide your address, telephone number, and email address;
4. Provide a statement that (i) you have a good faith belief that the disputed use is not authorized by the Intellectual Property owner, its agent, or the law, (ii) the information you have provide to us is accurate, and (iii) you are the owner of the Intellectual Property involved or you are authorized to act on behalf of that owner; and
5. provide your physical or electronic signature Upon receiving your complaint, Stamps.com may suspend or terminate the account of the customer who appears to be infringing you Intellectual Property, and may take further appropriate action.

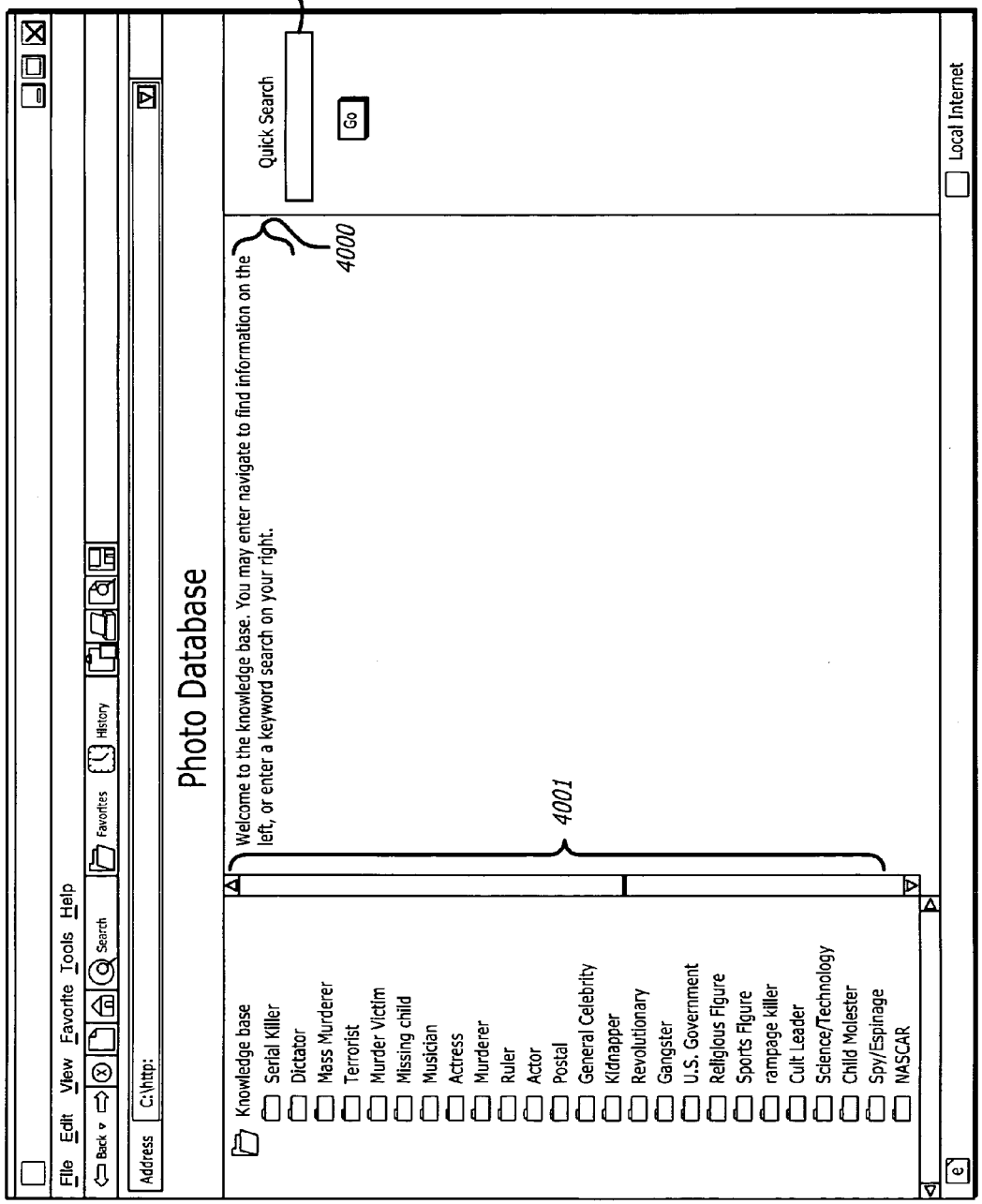

FIG. 17

Photo Database Profile Creation Form

Photo Database

| | | | |
|---|---|---|---|
| Name | First — 4006 | Middle — 4007 | Last — 4008 |
| Notriety | 4009 Not Selected ▼ 4010 | | |
| Hair Color | Not Selected ▼ — 4012 | Eye Color Not Selected ▼ — 4011 | |
| Ethnicity | Not Selected ▼ | Approx. DOB (mm/dd/yyyy) — 4014 | |
| Starting Category | Not Selected ▼ | | |
| Photo 1: 4015 | Browse... — 4025 | | |
| Photo 2: 4016 | Browse... — 4026 | | |
| Photo 3: 4017 | Browse... — 4027 | | |
| Photo 4: 4018 | Browse... — 4028 | | |
| Photo 5: 4019 | Browse... — 4029 | | |

Submit — 4020
Reset Form — 4021

4013

Main Menu
Announcements
View/Edit Personal Info
Create Category
Create Profile
Research
System Admin Links
Knowlege Base
SDC: Main Page Quick Search Documentation
Image Approval Guidelline

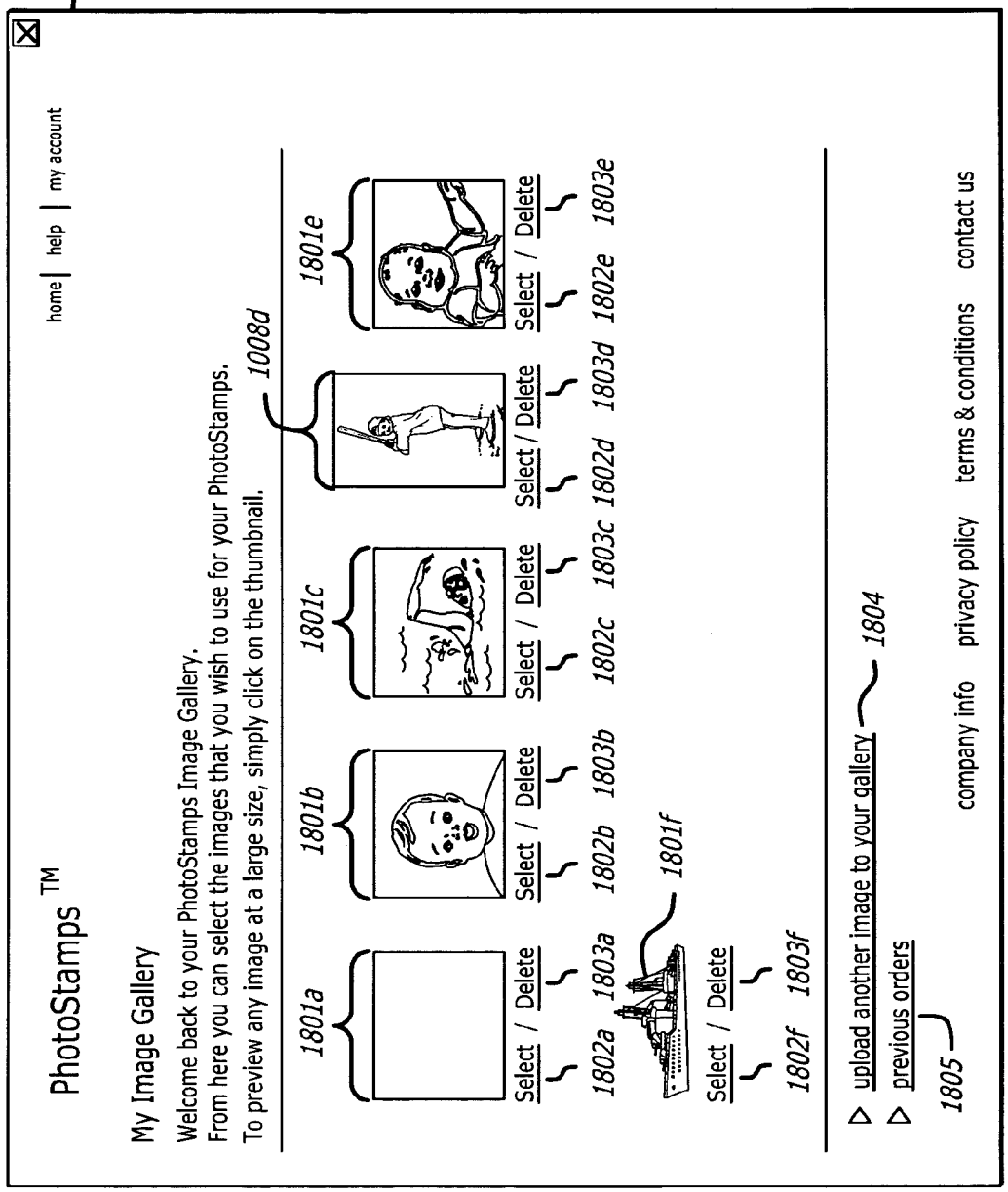

FIG. 23

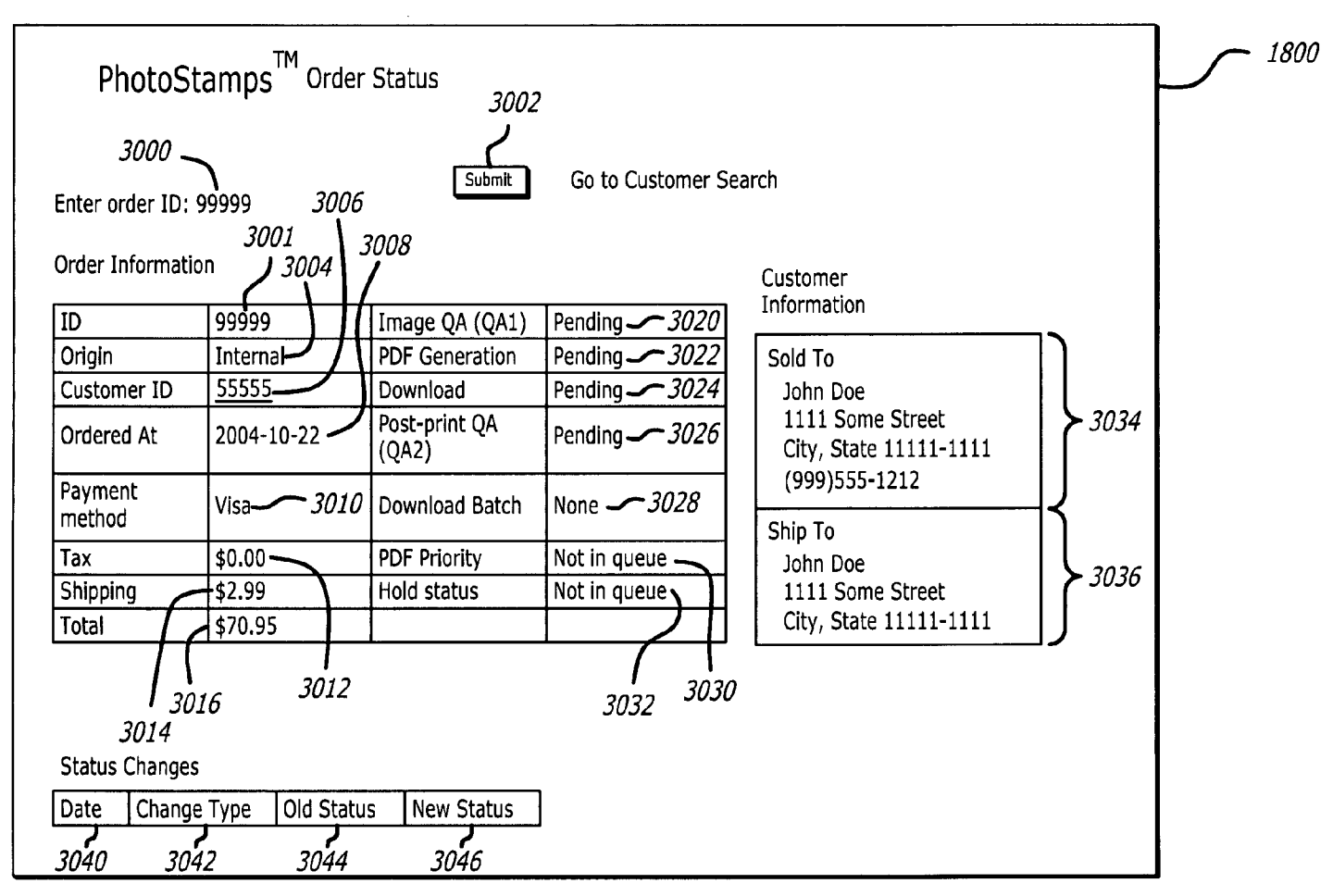

PhotoStamps™ Order Status

Enter order ID: 99999

[Submit] Go to Customer Search

Order Information

| | | |
|---|---|---|
| ID | 99999 | Image QA (QA1) | Pending — 3020 |
| Origin | Internal | PDF Generation | Pending — 3022 |
| Customer ID | 55555 | Download | Pending — 3024 |
| Ordered At | 2004-10-22 | Post-print QA (QA2) | Pending — 3026 |
| Payment method | Visa | Download Batch | None — 3028 |
| Tax | $0.00 | PDF Priority | Not in queue |
| Shipping | $2.99 | Hold status | Not in queue |
| Total | $70.95 | | |

Customer Information

| Sold To | John Doe<br>1111 Some Street<br>City, State 11111-1111<br>(999)555-1212 |
|---|---|
| Ship To | John Doe<br>1111 Some Street<br>City, State 11111-1111 |

Status Changes

| Date | Change Type | Old Status | New Status |
|---|---|---|---|

Line Items    3101a

| Line Item Number 1 | | |
|---|---|---|
| Image 1 (3100a, 3102a) | Description: | Sheet of 20 $0.37 PhotoStamps —3104a |
| | Design ID: | 1 —3106a |
| | Value (in cents): | 37 —3108a |
| | Quantity: | 1 —3110a |
| | Unit Price: | $16.99 —3112a |
| | Line Item Total: | $16.99 —3114a |
| | Image QA Status: | Pending Manager Vote (Add QA Vote) —3116a |
| | Original image filename: | F:\2004-10 (Oct)\John Doe-1.jpg —3118a |
| | Border Color | ▭ 3119a |
| | Image QA (QA1) votes: —3150a | |

| Desc | Is Manager | User | Date | Comments | |
|---|---|---|---|---|---|
| OK | 0 | CORP\QAuser | 2004-10-22 09:27:41 | | Delete Vote |
| 3120a | 3122a | 3124a | 3126a | 3130a | 3132a |

3151a — Post-print QA(QA2) votes: None
                              3134a       3128a

| Line Item Number 2 — 3101b | |
|---|---|
| Image 2<br>3100b  3102b | Description: Sheet of 20 $0.37 PhotoStamps — 3104b<br>Design ID: 1 — 3106b<br>Value (in cents): 37 — 3108b<br>Quantity: 1 — 3110b<br>Unit Price: $16.99 — 3112b<br>Line Item Total: $16.99 — 3114b<br>Image QA Status: Pending Manager Vote (Add QA Vote) — 3116b<br>Original image filename: F:\2004-10 (Oct)\John Doe-2.jpg — 3118b<br>Border Color ▭ 3119b<br><br>Image QA (QA1) votes: — 3150b |

| Desc | Is Manager | User | Date | Comments | |
|---|---|---|---|---|---|
| OK | 0 | CORP\QAuser | 2004-10-22 09:27:38 | | Delete Vote |

3120b  3122b   3124b   3126b   3128b  3130b   3132b

3151b — Post-print QA(QA2) votes: None
— 3134b

| Line Item Number 3 — 3101c | |
|---|---|
| Image 3<br>3100c  3102c | Description: Sheet of 20 $0.37 PhotoStamps — 3104c<br>Design ID: 1 — 3106c<br>Value (in cents): 37 — 3108c<br>Quantity: 1 — 3110c<br>Unit Price: $16.99 — 3112c<br>Line Item Total: $16.99 — 3114c<br>Image QA Status: Pending Manager Vote (Add QA Vote) — 3116c<br>Original image filename: F:\2004-10 (Oct)\John Doe-3.jpg — 3118c<br>Border Color ▭ 3119c<br><br>Image QA (QA1) votes: — 3150c |

| Desc | Is Manager | User | Date | Comments | |
|---|---|---|---|---|---|
| OK | 0 | CORP\QAuser | 2004-10-22 09:27:43 | | Delete Vote |

3120c  3122c   3124c   3126c   3128c  3130c   3132c

3151c — Post-print QA(QA2) votes: None
— 3134c

FIG. 27A

Subject: Important information about your PhotoPostage Order

Dear [FIRST NAME], — 3600

We just wanted to let you know that your PhotoStamps are on their way! We shipped the following on [SHIP DATE] from Order#[ORDER NUMBER]: — 3602
— 3601

Shipping Group # [SHIPPING GROUP NO.]: — 3603

|  | Description | Price | Qty | Total Price |
|---|---|---|---|---|
|  | Sheet of 20 PhotoStamps- $0.37 | $16.99 | 1 | $16.99 | 3604

Shipping Info:

John Doe          Subtotal    $16.99
1111 Any Street     Discounts   $0.00
City, State 11111-1111   Shipping    $2.99
Phone: 999-555-1212    Sales Tax    $0.00    3605

Shipping Method:
Standard Shipping (3-5    Total      $19.98
business days)

If you do not receive your order in the expected shipping time as noted in your shipment(s) abouve, please feel free to e-mail us at support@photostams.com for more information.

Unfortunately, we were unable to accept the following image(s) you have submitted:

|  | Description | Price | Qty | Total Price |
|---|---|---|---|---|
|  | Rejected Image | $0.00 | 1 | $0.00 | 3606

Please note that currently we are unable to accept images that may be construed as business advertising or notices (more information here). Additionally, PhotoStamps will not accept images that may be considered objectionable (e.g.-sexually explicit, obscene, violent, etc.), controversial (e.g.-political, etc.), or newsworthy or notorious (celebrities, politicians, world leaders, etc.) All images must meet our Content Restrictions shown here.

Examples of images that we accept include babies, individuals, couples, families, pets, landscapes, artistic items, and other similar types of images. Any person in a picture should be wearing modest clothing. We are very conservative in our acceptance of images (think of things that were considered appropriate in the 1950's and you are probably safe).

Remember, you must own the rights to the photograph, image, graphic, or logo that you submit and if it is unclear to us that this is the case, we cannot accept your image. Also, if we think your submission will result in a low quality PhotoStamps product (e.g. the image is too dark), we may choose not process the order.

Please note that owing to privacy concerns, our customer support representatives do not have access to image(s) that you submitted. As such, they cannot provide details on why your submission did not meet our content guidelines.

We apologize for any inconvenience we may have caused you but we sincerely hope you will try again and submit another image to us.

Regards,

The PhotoStamps Team
For returns information go to: [insert relevant link here]
For support information got to: http://photo.stamps.com/support/
For contact information go to: http://photo.stamps.com/jcontactus/

PhotoStamps™ Customer Detail

Customer Information New search

| Customer ID | 55555 | — 3006 |
|---|---|---|
| Email Address | johndoe@xxxxx.com | — 3401 |
| First Name | John | — 3402 |
| Last Name | Doe | — 3403 |
| Opt-out | 1 | — 3404 |
| Status | | — 3405 |

Found 1 order: — 3408

| Order ID | Submitted/Card Authorized At | } 3409 |
|---|---|---|
| 99999 | 2004-10-22 08:00:17 | |

3001    3410   3412

Emails Sent

| Date Sent | Subject (click to read) | } 3415 |
|---|---|---|
| 2004-10-22 08:00:19 | Thank you for ordering from PhotoStamps! (Order 99999) | |

3416   3417   3418   3001

Call History Enter a disposition — 3430

| Call Date | Rep. Name | Disposition | Notes | } 3431 |
|---|---|---|---|---|
| 3420 | 3422 | 3424 | 3426 | |

Date: Thu, 7 Oct 2004 01:12:58 UT
From: photo@stamps.com
To: Johndoe@xxxxxxxx.com —— *3401*
Subject: Important information about your PhotoStamps Order
X-Mailer: MIME: :Lite 3.0 (F2.72; B2.21; Q2.21)

This is a multi-part message in MIME format.

--_-----------_1097111578246971
Content-Disposition: inline
Content:-Length: 1036
Content-Transfer-Enconding: binary
Content-Type: text/plain Dear John, —— *3402*

Thank you for your order.

Unfortunately, we are currently unable to accept the following image(s) you have submitted. Thumbnails of the rejected image(s) are attached to this e-mail.

As such we have canceled your entire order (number 99999) and will not charge your credit card for any portion of it.

PhotoStamps will NEVER accept anything that is objectionable (e.g.- sexually explicit, obscene, violent, etc.) or controversial (e.g.- political, etc.) in any way.

For more information, please refer to the Terms and Conditions found on our web site (http://photo.stamps.com/conditions/).

Remember, you must own the rights to the photograph, image, graphic, or logo that you submit and if it is unclear to us that this is the case, we cannot accept your image. Also, if we think your submission will result in a low quality PhotoStamps product (e.g. the image is too dark), we may choose not process the order.

We apologize for any inconvenience we may have caused you.

Regards,

The PhotoStamps Team

QUALITY ASSURANCE OF IMAGE-CUSTOMIZATION OF COMPUTER-BASED VALUE-BEARING ITEMS

CROSS REFERENCE TO RELATED APPLICATIONS

This application is a continuation-in-part of U.S. patent application Ser. No. 10/994,914, titled "CUSTOMIZED COMPUTER-BASED VALUE-BEARING ITEM QUALITY ASSURANCE", filed on Nov. 22, 2004, which claimed priority to U.S. Provisional Patent Application Ser. No. 60/591,535, titled "CUSTOMIZED COMPUTER-BASED VALUE-BEARING ITEM QUALITY ASSURANCE", filed on Jul. 27, 2004, the entire disclosures of both of which are incorporated herein in full by reference as if stated in full herein.

FIELD OF THE INVENTION

The field of the present invention is computer-based value-bearing items, and particularly, image-customized computer-based value-bearing items such as, for example, image-customized, computer-based postage-indicia-bearing items.

SUMMARY OF THE INVENTION

The exemplary embodiment of the present invention will provide methods and computer systems for quality assurance review and management of image content for image customization of computer-based value-bearing items such as, for example, an exemplary image-customized computer-based postage label 1 in an exemplary embodiment of the present invention as depicted in FIG. 1.

The exemplary embodiment of the present invention will provide a method using a computer for managing image content for image customization of computer-based postage-indicia-bearing items, said method comprising: receiving a first quality assurance review result by a first quality assurance user for a user-supplied image for a respective order for at least one customized computer-based postage-indicia-bearing item; receiving a second quality assurance review result by a second quality assurance user for the user-supplied image for the respective order for the at least one customized computer-based postage-indicia-bearing item; queuing the respective order for further quality assurance processing in one queue of a plurality of queues according to the first quality assurance review result and the second quality assurance review result; and displaying a representation of the respective order from the one queue according to a request by a quality assurance user to inspect the respective order.

The exemplary embodiment of the present invention will provide a method for managing image content review for image customization of computer-based postage-indicia-bearing items, said method comprising: receiving an order from an ordering user for a computer-based postage provider to provide at least one customized computer-based postage-indicia-bearing item, wherein said order is characterized by at least one user-supplied image, and wherein the at least one user-supplied image is directed to a subject matter; analyzing the user-supplied image according to a policy, wherein said analyzing comprises at least one of: sending the ordering user an electronic mail message requesting information about the user-supplied image; comparing the user-supplied image to images reported by a computer system as directed to the subject matter; and accessing information about the ordering user from a database and comparing the information about the ordering user with information reported by the computer system as concerning the ordering user.

The exemplary embodiment of the present invention will provide a method using a computer for managing image content review for image customization of computer-based value-bearing items, said method comprising: populating a database with a plurality of negative image hash values, wherein each negative image hash value corresponds to a respective image; generating a user-supplied image hash value for a user-supplied image submitted by an ordering user for customization of a computer-based value-bearing item; comparing the user-supplied image hash value for the user-supplied image to the plurality of negative image hash values; detecting a match between the user-supplied image hash value and at least one negative image hash value; and displaying an indication of the detecting of the match to a quality assurance review user interface screen.

The exemplary embodiment of the present invention will provide a method using a computer for managing image content review for image customization of computer-based value-bearing items, said method comprising: displaying a quality assurance review interface to a display screen, wherein said quality assurance review interface comprises a user-supplied image submitted as part of an order by an ordering user for customization of at least one computer-based value-bearing item and wherein said quality assurance review interface further comprises a means to access information about the ordering user.

The exemplary embodiment of the present invention will provide a method using a computer for managing image content review for image customization of computer-based value-bearing items, said method comprising: indicating in a customer record in a database, an indication of a customer profile for a customer, wherein the indication of the customer profile comprises one of: an indication that the customer is a trusted source; an indication that the customer is a normal customer; an indication that the customer has previously submitted at least one objectionable image; and an indication that the customer has previously submitted more than one objectionable image.

The exemplary embodiment of the present invention will provide a method using a computer for managing image content review for image customization of computer-based value-bearing items, said method comprising: indicating in a quality assurance user record an authorization level, wherein said authorization level comprises one of: an indication that the quality assurance user may input an independent vote for each image reviewed, and an indication that the quality assurance user may input an overriding vote as to independent votes input for each image reviewed; and acknowledging a login request by the quality assurance user.

The exemplary embodiment of the present invention will provide a method using a computer for managing image content review for image customization of computer-based value-bearing items, said method comprising: detecting a rejection reason for a rejection of a customer-supplied image for a respective order for customized computer-based postage-indicia-bearing item, wherein said rejection reason indicates a violation of a policy; and penalizing a customer that corresponds to the respective order.

The exemplary embodiment of the present invention will provide a method using a computer for managing image content review for image customization of computer-based value-bearing items, said method comprising: detecting a rejection reason for a rejection of a customer-supplied image for a respective order by a customer for customized computer-based postage-indicia-bearing item, wherein said rejection reason indicates a violation of a policy; and populating a first database with information related to the rejection.

The exemplary embodiment of the present invention will provide a method using a computer for managing image content review for image customization of computer-based value-bearing items, said method comprising: receiving an order by an ordering user for customization of at least one computer-based value-bearing item, wherein said order comprises a user-supplied image; printing the at least one computer-based value-bearing item as a printed order, wherein said value-bearing item comprises computer-based indicium that uniquely corresponds to the value-bearing item, and wherein said computer-based indicium is recorded on a database; shipping the printed order to an address designated by the ordering user; detecting that the user-supplied image in the printed order comprises an objectionable image; and canceling the computer-based indicium recorded on the database.

The exemplary embodiment of the present invention will provide a method using a computer for managing image content review for image customization of computer-based value-bearing items, said method comprising: entering a test image in a general image queue for quality assurance analysis, wherein said test image comprises an objectionable image according to an image policy; and monitoring a quality assurance review result by a quality assurance user, wherein the quality assurance review result corresponds to the test image.

The exemplary embodiment of the present invention will provide a method using a computer for managing image content review for image customization of computer-based value-bearing items, said method comprising: populating a first database with information related to a first image; searching the Internet for at least one additional image corresponding to the information related to the first image; and populating a second database with a hash value corresponding to the at least one additional image.

BRIEF DESCRIPTION OF THE DRAWINGS

These and other features, aspects, and advantages of the present invention will become better understood with regard to the following description, appended claims, and accompanying drawings in which:

FIGS. 3A through 3C comprise a high-level flow diagram depicting exemplary high-level logic functions for creating exemplary customized computer-based postage labels in an exemplary embodiment of the present invention;

FIG. 8 is a graphic representation depicting a screen shot of an exemplary shopping cart summary screen in an exemplary embodiment of the present invention;

FIG. 10 is a graphic representation depicting a screen shot of an exemplary billing information screen in an exemplary embodiment of the present invention;

FIGS. 14A-14C are textual representations depicting excerpts of an exemplary Terms and Conditions agreement in an exemplary embodiment of the present invention;

FIG. 15 is a graphic representation depicting an exemplary Photo Database main page screen in an exemplary embodiment of the present invention;

FIG. 17 is a graphic representation depicting an exemplary Photo Database Create Profile Screen in an exemplary embodiment of the present invention;

FIG. 18 is a graphic representation depicting a screen shot of an exemplary user's image gallery summary screen in the exemplary embodiment of the present invention;

FIG. 23 is a graphic representation depicting a screen shot of a portion of an alternative exemplary pre-print image quality assurance order status screen in an alternative exemplary quality assurance processing embodiment of the present invention;

FIG. 24 is a graphic representation depicting a screen shot of a pre-print image quality assurance order line item portion for a first line item of a multi-line item order on an alternative exemplary pre-print image quality assurance order status screen in an alternative exemplary embodiment of the present invention;

FIG. 25 is a graphic representation depicting a screen shot of a pre-print image quality assurance order line item portion for a second and third line item of a multi-line item order on an alternative exemplary pre-print image quality assurance order status screen in an alternative exemplary embodiment of the present invention;

FIGS. 27A and 27B are graphic representations depicting an electronic mail ("email") message, in an exemplary quality assurance processing embodiment of the present invention, notifying a customer that at least one image in an order has been rejected;

FIG. 28 is a graphic representation depicting a screen shot of a pre-print image quality assurance customer detail screen in an alternative exemplary quality assurance processing embodiment of the present invention;

FIG. 29 is a graphic representation depicting an electronic mail ("email") message, in an alternative exemplary quality assurance processing embodiment of the present invention, to a user, notifying the user that one or more images in the user's order were rejected due to quality assurance reasons.

DETAILED DESCRIPTION

Figure 1:
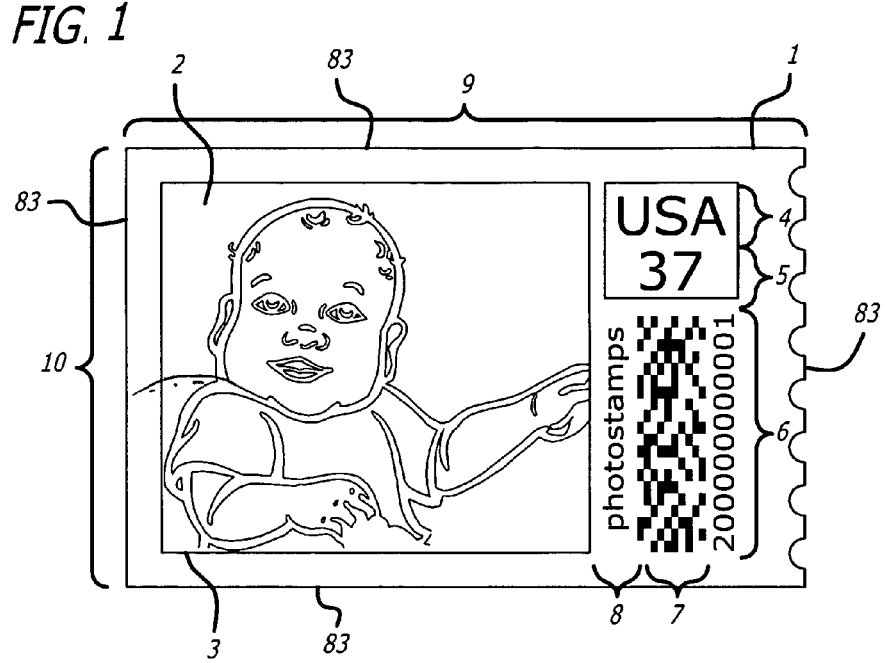
FIG. 1 is a plan view of an exemplary customized computer-based postage label in an exemplary embodiment of the present invention.

The exemplary embodiment of the present invention will provide methods and computer systems for quality assurance review and management of image content for image customization of computer-based value-bearing items such as, for example, an exemplary image-customized computer-based postage label 1 in an exemplary embodiment of the present invention as depicted in FIG. 1. In the exemplary embodiment of the present invention, as will be further explained below, the exemplary quality assurance process features informing customers of appropriate image content guidelines at various points during a customer's interaction with a system for customer-provided image-customization of value-bearing items. As will be further explained below, the exemplary quality assurance process further features evaluating each image provided by a customer to determine whether or not the image meets appropriate image content standards. As yet further explained below, the exemplary quality assurance process also features penalizing customers who submit one or more images that violate appropriate image content standards.

U.S. patent application Ser. No. 10/994,914, titled "CUSTOMIZED COMPUTER-BASED VALUE-BEARING ITEM QUALITY ASSURANCE", filed on Nov. 22, 2004, the entire disclosure of which has been previously incorporated in full herein as if stated herein, disclosed exemplary methods and computer systems via which a customer could provide an electronic representation of an image, such as by uploading a digital picture, and order computer-based image-customized postage bearing an image corresponding to the electronic representation of the image provided by the customer; images ordered were submitted to quality assurance review. Further quality assurance features are disclosed herein.

The exemplary embodiment of the present invention is described herein with respect to an exemplary Internet application of the present invention. It will be understood by someone with ordinary skill in the art that the exemplary Internet embodiment of the present invention is illustrative and non-limiting, and that the present invention will be equivalently applicable to non-Internet embodiments, including but not limited to, PC-based systems.

The exemplary embodiment of the present invention will be implemented, in part, in an online Internet-based (also sometimes referred to herein as computer-based or PC-based) postage system. The United States Postal Service (USPS) provides the Information Based Indicia Program (IBIP.) The IBIP facilitates computer-based Postage, also sometimes referred to as PC-based (Personal Computer based; also sometimes referred to herein as PC Postage), or Internet-based, Postage. In a typical Internet-based postage system, a user can purchase postage credit, and print the postage in the form of PC Postage onto a label or directly onto a mail piece at a printer connected to the user's own computer.

An example of a computer-based postage system is a software-based, online postage system described in U.S. patent application Ser. No. 09/585,025 filed on Jun. 1, 2000, by Piers C. Lingle et al., "Online Postage Value Bearing Item Printing"; U.S. patent application Ser. No. 09/690,066 filed on Oct. 16, 2000, by Craig L. Ogg et al., "Networked Cryptographic Module for Secure Printing of Value-Bearing Items"; and U.S. patent application Ser. No. 09/690,243 filed on Oct. 17, 2000, by An Engelberg et al., "Method and Apparatus for On-Line Value Bearing Item System" the contents of all of which are hereby incorporated by reference as if set forth in full. Exemplary online postage system software comprises user code, also sometimes referred to as client software, that resides on a users client system, and controller code, also sometimes referred to as server software, that resides on a server system. An exemplary on-line postage system may comprise a user system electronically connected to, or otherwise adapted for communication with, a server system, which in turn is connected to, or otherwise adapted for communication with, a USPS system. The server system is preferably capable of communicating with one or more client systems simultaneously.

It will be understood by someone with ordinary skill in the art that the present invention would be equivalently applicable in contexts other than an Internet-based postage provider, including, but not limited to, other PC- and computer-based systems.

There are different types of IBIP postage. One type of IBIP postage is recipient-address specific and is date sensitive/date specific. Another type of IBIP postage is "generic" in that it is neither recipient-address specific or date sensitive/date specific.

IBIP postage is one type of Value Bearing Item ("VBI"). Value Bearing Items ("VBI" or value-bearing items) include, among other things, postage, coupons, tickets, gift certificates, currency, money orders, vouchers and the like. U.S. patent application Ser. No. 09/975,532 entitled "SYSTEM AND METHOD FOR PROVIDING COMPUTER-BASED POSTAGE STAMPS" (hereinafter referred to as the "Generic VBI Invention"), the contents and disclosures of which are incorporated in full herein, discloses systems and methods for the creation of generic VBI postage, such that no intended recipient address need be specified, verified or indicated in any way on the created postage. The systems and methods disclosed in the Generic VBI Invention provided for the generation and printing of generic VBI, such as generic postage, that may be used at any time for any recipient, much like pre-printed postage printed and sold by the United States Postal Service ("USPS"). The terms "generic postage," "generic Internet postage", "computer-based generic IBIP postage" and "computer-based postage" are used synonymously herein to refer to postage that is non-recipient specific and/or non-date specific.

The exemplary embodiment of the present invention will provide a user-interface via which a user (an ordering user is sometimes referred to herein as a "customer" or a "customer-user") would order USPS-approved, customized computer-based IBIP generic postage labels. It will be understood by someone with ordinary skill in the art that although the exemplary embodiment of the present invention is described with respect to customized computer-based IBIP generic postage labels, the invention would apply equally to other types of Value-Bearing Items. It will also be understood by someone with ordinary skill in the art that reference herein to customized computer-based postage labels is synonymous with customized computer-based postage-indicia-bearing items. It will be further understood that the term "label" applies equally to plain paper and to self-adhesive label stock—that is, the use of self-adhesive label stock as described herein regarding the exemplary embodiment is not a limitation of the invention; the invention would apply equally to customized computer-based postage-indicia-bearing items printed on other materials, including but not limited to paper, that may or may not have a self-adhesive substance on the reverse side for affixing to a parcel.

FIG. 1 is a plan view of an exemplary image-customized computer-based postage label 1 in an exemplary embodiment of the present invention. With reference to FIG. 1, the exemplary image-customized computer-based postage label 1 (sometimes interchangeably referred to herein as a customized computer-based postage label, or as a customized computer-based postage-indicia-bearing item, or as an image-customized computer-based postage-indicia-bearing item) will bear an image 2 that would be provided by a corresponding customer-user, namely by the customer-user that orders the customized computer-based postage label. The customer-user may provide image 2 in an electronic form, such as by uploading a digital representation of image 2. In a variation of the exemplary embodiment, a customer-user (also sometimes referred to herein simply as "user") could alternatively provide a hardcopy image.

The exemplary image-customized computer-based postage label 1 will bear an exemplary border 3 that will be selected by the user (users also referred to herein as customers, and customer-users will be understood to be distinguished from Quality Assurance users that are described further below). In the exemplary embodiment, exemplary image-customized computer-based postage label 1 will comprise a particular postage label footprint characterized by a set of particular dimensions, e.g., width 9 and height 10.

In the exemplary embodiment, exemplary image-customized computer-based postage label 1 will also be characterized by a perimeter 83.

The exemplary image-customized computer-based postage label 1 will bear a human-readable indication of the country 4 for which the postage is approved. The exemplary image-customized computer-based postage label 1 will also bear a human-readable indication of an amount of postage 5. The exemplary image-customized computer-based postage label 1 will also bear a human-readable identifier (such as a serial number) 6 that will uniquely identify the particular image-customized computer-based postage label. The exemplary image-customized computer-based postage label 1 will also bear a machine-readable set of information 7. In the exemplary embodiment, the exemplary machine-readable set of information (also referred to as machine-readable postage indicia) 7 will comprise a machine-readable representation of the serial number that uniquely identifies the particular image-customized computer-based postage label, a machine-readable representation of the amount of postage, and machine-readable representations of other information.

A single machine-readable barcode may represent a plurality of items of information, such as, e.g., a serial number, and a postage value. Therefore, even though a barcode may graphically appear to be a singular item, it may represent a plurality of items of information. Therefore, unless otherwise expressly indicated, the terms indicia and indicium may be used interchangeably herein to refer to the singular and the plural.

More specifically, in the exemplary embodiment, the machine-readable postage indicia 7 will comprise 18 bytes of data and 2 bytes of encoder filler, structured according to the USPS Information Based Indicia Program IBI data dictionary format. *IBI Data Dictionary and Indicia Types*, Document version 5.2, USPS Information Based Indicia Program (IBIP), Sep. 29, 2003. In the exemplary embodiment, the machine-readable postage indicia 7 will be generated by a secure vault (the term "vault" is used herein to refer to a postage server located in a secure data center); the secure vault will maintain a one-to-one association of each serial number 6 uniquely identifying a particular image-customized computer-based postage label 1 with a corresponding, and similarly unique, machine-readable postage indicia 7; the secure vault will maintain a record of each serial number 6 uniquely identifying a particular image-customized computer-based postage label 1 and the corresponding, and similarly unique, machine-readable postage indicia 7.

Figures 4, 5:
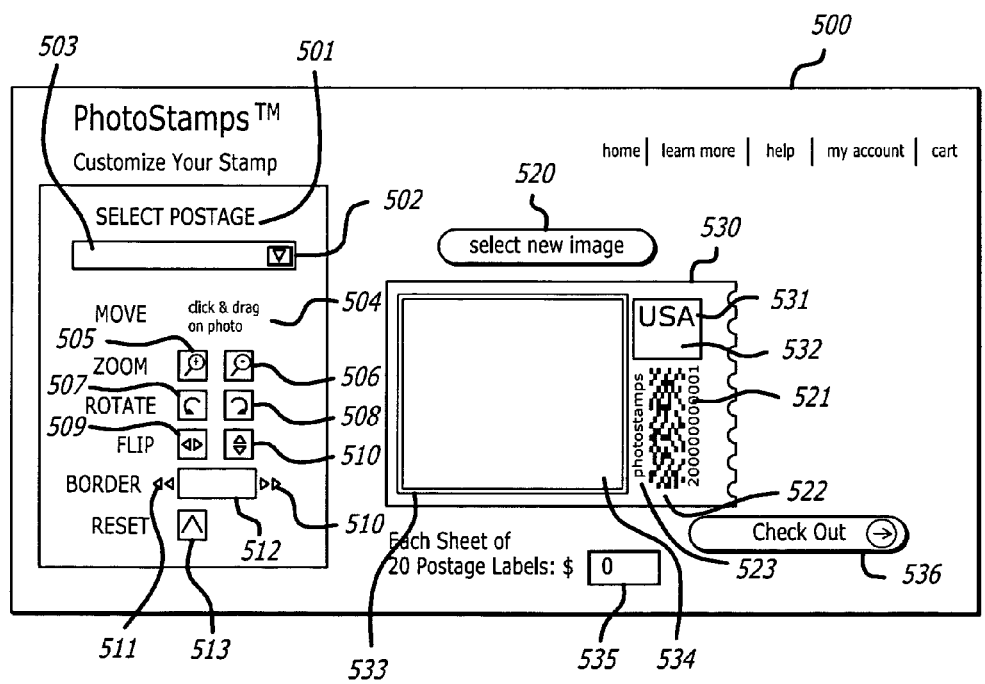
FIG. 4 is a chart depicting content format for machine-readable postage indicia in the exemplary embodiment of the present invention.
FIG. 5 is a graphic representation depicting a screen shot of an exemplary user interface blank postage label template screen that depicts a representation of an exemplary blank customizable postage label template in the exemplary embodiment of the present invention.

FIG. 4 is a chart depicting content format for the machine-readable postage indicia 7 in the exemplary embodiment. As depicted in FIG. 4, in the exemplary embodiment, the machine-readable postage indicia 7 will be a 20-byte field that will include a 1-byte IBI standard Indicia Version number 441, a 2-byte Software ID 442, a 3-byte Postage Value 443, a 2-byte IBI Vendor number 444, a 2-byte Model ID 445, an 8-byte (12-digit) Indicia ID (serial) number 446 (see also, element 6, FIG. 1) that references the unique indicia generated by the secure vault, and a 2-byte field containing Encoder values 447. In the exemplary embodiment, the content of the machine-readable postage indicia 7 will be encoded using a Data Matrix 2D barcode generator from IDAutomation, Inc.; the format will be 20 byte rectangular, with 20 mil element size. *ANSI/AIM BC11 International Symbology Specification*, "Data Matrix." Use in the exemplary embodiment of a Data Matrix 2D barcode is exemplary and non-limiting; machine-readable postage indicia 7 may comprise any other type of machine-readable representation, whether now known or in the future discovered.

Returning with reference to FIG. 1, the exemplary image-customized computer-based postage label 1 will also bear a brand name 8.

Figure 2A:
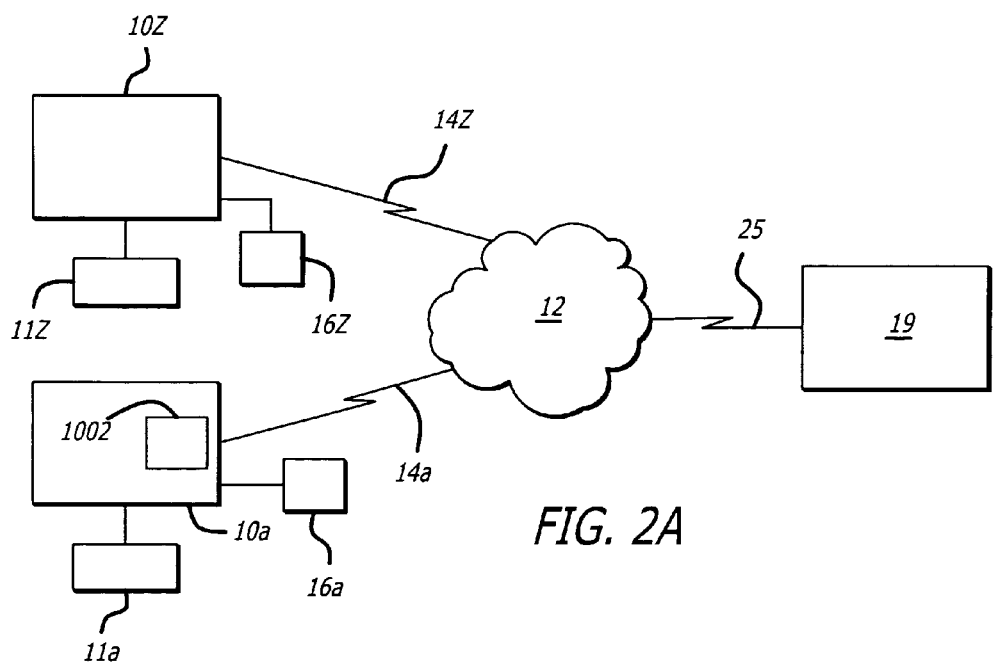
FIG. 2A is a block diagram depicting an exemplary client/Internet environment in an exemplary Internet postage system embodiment of the present invention.

FIG. 2A is a block diagram depicting an exemplary Internet user client/server environment in an exemplary Internet postage system embodiment of the present Invention. It will be understood by someone with ordinary skill in the art that although the exemplary embodiment of the present invention is described in the context of an Internet-based embodiment, that the present invention is not limited to Internet-based applications.

With reference to FIG. 2A, user client devices 10a-10z (sometimes referred to herein simply as "client" or "clients") and a postage label customization website 19 will engage in two-way communication via a communication network 12.

In the exemplary embodiment, communication network 12 will comprise the Internet. However, it will be understood by those skilled in the art that the communication network may take many different forms, such as a local area network (LAN), wide area network (WAN), wired telephone network, wireless network, or any other network that supports data communication between respective entities.

Clients 10a-10z may embody one of a variety of different forms. In one illustrative embodiment, one or more of Clients 10a-10z may comprise personal computers; other of Clients 10a-10z may comprise computers or any other device, whether now known or in the future discovered, that has processing capabilities and that may engage in communication over a communications network such as communication network 12.

Each respective client device 10a-10z will be in communication with a respective display device 11a-11z. Each respective display device, e.g., in the example using client 10a, display device 11a, will be integral to, or connected to, or otherwise in communications with, the respective client device, e.g., 10a.

Clients 10a-10z will be in communications with the communication network 12 through communication links 14a-14z. A communication link e.g., 14a, could comprise a wireless communication, a dedicated line connection, cable communication, satellite communication, telephone communication, or any other type of communication now known or in the future discovered. In addition, each client, e.g., client 10a, may have access to a printer, such as printer 16a. Optionally, a local network may serve as the connection between some of the clients and the Internet 12.

The postage label customization website 19 will also be in communication with the Internet via one or more communication links, e.g., 25. As with communication links 14a-14z between the client devices 10a-10z respectively, communication links, e.g., 25, between the postage label customization website 19 and the Internet could comprise a wireless communication, a dedicated line connection, cable communication, satellite communication, telephone communication, or any other type of communication now known or in the future discovered.

A web browser 1002, such as, for example, NETSCAPE NAVIGATOR®, or MICROSOFT INTERNET EXPLORER®, or some other web browser software, will be installed on each client device, e.g. 10a. Reference herein to web browser 1002 should not be read as referring to any particular web browser brand. Further, reference to a web browser 1002 should not be read as implying that every client computer, e.g., 10a through 10z, all use the same web browser. Rather, each client 10a will have one web browser, that could be selected from various web browsers, whether now known or in the future discovered, with which to control communications between the respective client device, e.g., 10a, and the Internet. Further, it will be understood by someone with ordinary skill in the art that the invention will apply to any computer program or set of computer instructions, whether a web browser or some other software now known or in the future discovered, that is adapted to allow a user to retrieve and render hyper-media content from one or more server computers available for communication via a communications network, such as the Internet.

It should be noted that the use of suffixes such as "a" through "z" in connection with numbered elements of the FIGURES herein are exemplary and are not a limitation of the invention to any particular number. Rather, the suffixes "a" through "z", and similar notations, are used herein to indicate an unknown number of similar elements; although the number is unknown, the "a" through "z" suffix notation is used to express a representation of 1 to many.

Communications between a client, e.g., 10a, and the postage label customization website 19 will be provided via secured eCommerce communications, such as through SSL; HTTPS, which stands for "Hypertext Transfer Protocol over Secure Socket Layer", is an acronym that is often used to describe such a secured eCommerce communications. However, it will be understood by someone with ordinary skill in the art that reference to SSL or HTTPS herein is not a limitation of the invention. Rather, other communication protocols, whether now known or in the future discovered, could be used.

SSL stands for "Secure Sockets Layer," a protocol developed by NETSCAPE® for transmitting private documents via the Internet. SSL works by using a private key to encrypt data that is then transferred over the SSL connection. Both NETSCAPE NAVIGATOR® and MICROSOFT INTERNET EXPLORER® web browsers, support SSL; many websites use SSL protocol to protect the exchange of confidential user information, such as credit card numbers.

Figure 2B:
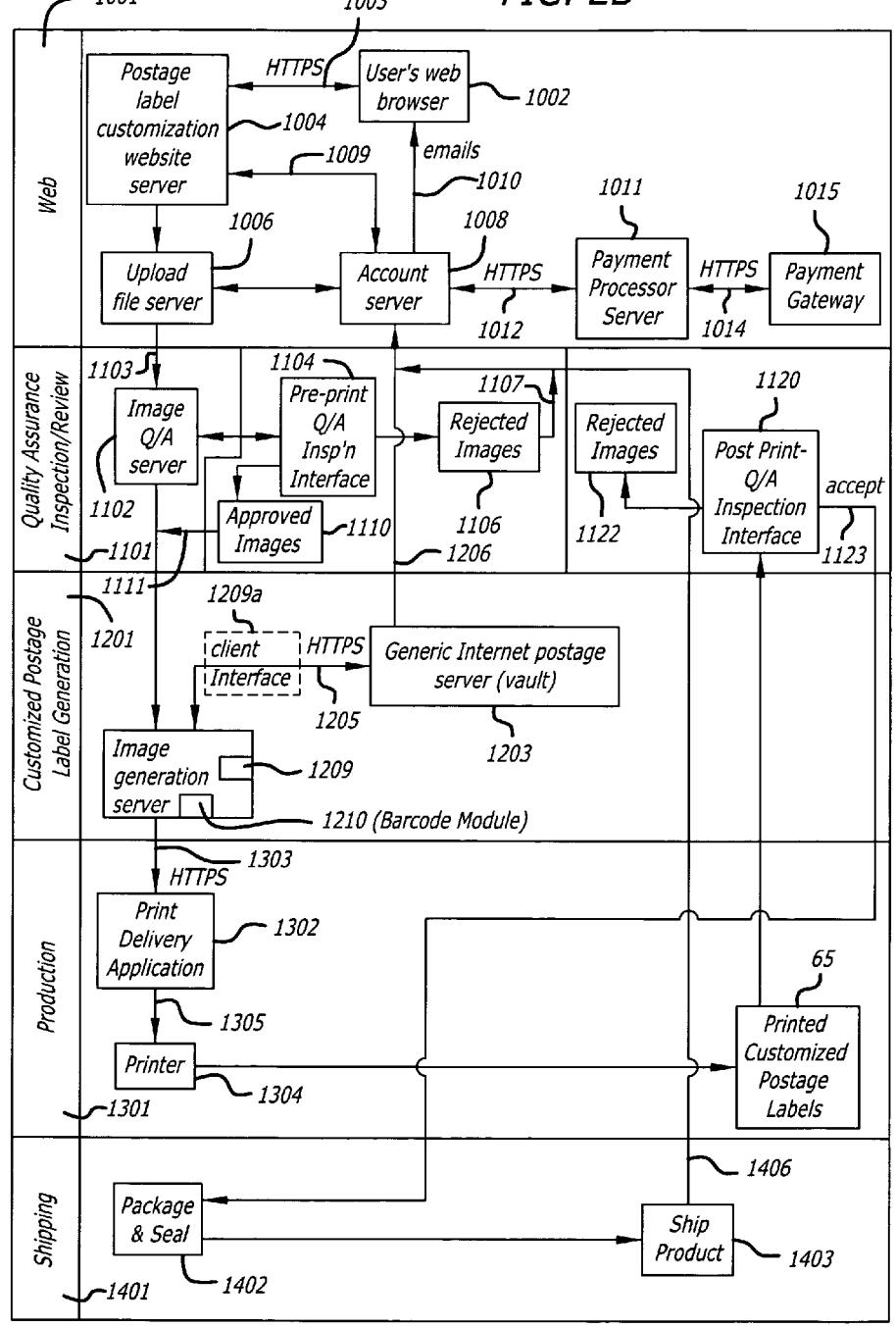
FIG. 2B is a block diagram depicting overview communication interactions in an exemplary embodiment of the present invention.

With reference to FIG. 2B, the exemplary embodiment of the present invention will feature a web environment 1001 in which a user's web browser 1002 (executing from the user's client computer, e.g., element 10a in FIG. 2A) will communicate with a website server 1004 operating in the postage label customization website (see element 19 in FIG. 2A). Through the user's web browser 1002, each respective user will be able to place an order for one or more image-customized computer-based postage labels. It will be understood by someone with ordinary skill in the art that reference herein to any particular server computer in the singular is not a limitation of the invention. It is understood by those with ordinary skill in the art that one or multiple server computers can be deployed to execute particular functionality, depending on the architecture of a particular system. A more detailed description regarding exemplary elements operating in the exemplary web environment 1001 will be described further below.

Continuing with reference to FIG. 2B, the exemplary embodiment of the present invention will further feature a Quality Assurance Inspection/Review environment 1101 in which images for image-customized computer-based postage labels ordered by users will be reviewed to identify and reject images of unacceptable image quality and images with content that violate pre-established quality assurance standards.

The exemplary embodiment of the present invention will further feature a customized postage label generation environment 1201 in which a customized postage label image generation server 1202 will generate a representation of a sheet of customized computer-based postage labels. The representation of a sheet of customized computer-based postage labels would comprise, in the case of the exemplary embodiment, 20 individual customized postage label representations, all of which would be characterized by the same image and the same set of customization features (e.g., size, position, vertical orientation, horizontal orientation). The customized postage label image generation server 1202 will order generation of unique postage indicia for each customized postage label and will inject the generated postage indicia into each respective customized postage label representation.

The exemplary embodiment of the present invention will further feature a production environment 1301 in which sheets of customized computer-based postage labels will be printed. The sheets of customized computer-based postage labels will each be visually inspected for quality assurance according to a post-print quality assurance procedure.

The exemplary embodiment of the present invention will further feature a shipping environment 1401 in which sheets of customized computer-based postage labels approved by the post-print quality assurance procedure will be assembled to fulfill an order, and will be shipped to the respective recipient as indicated by the ordering user.

Figure 3B:
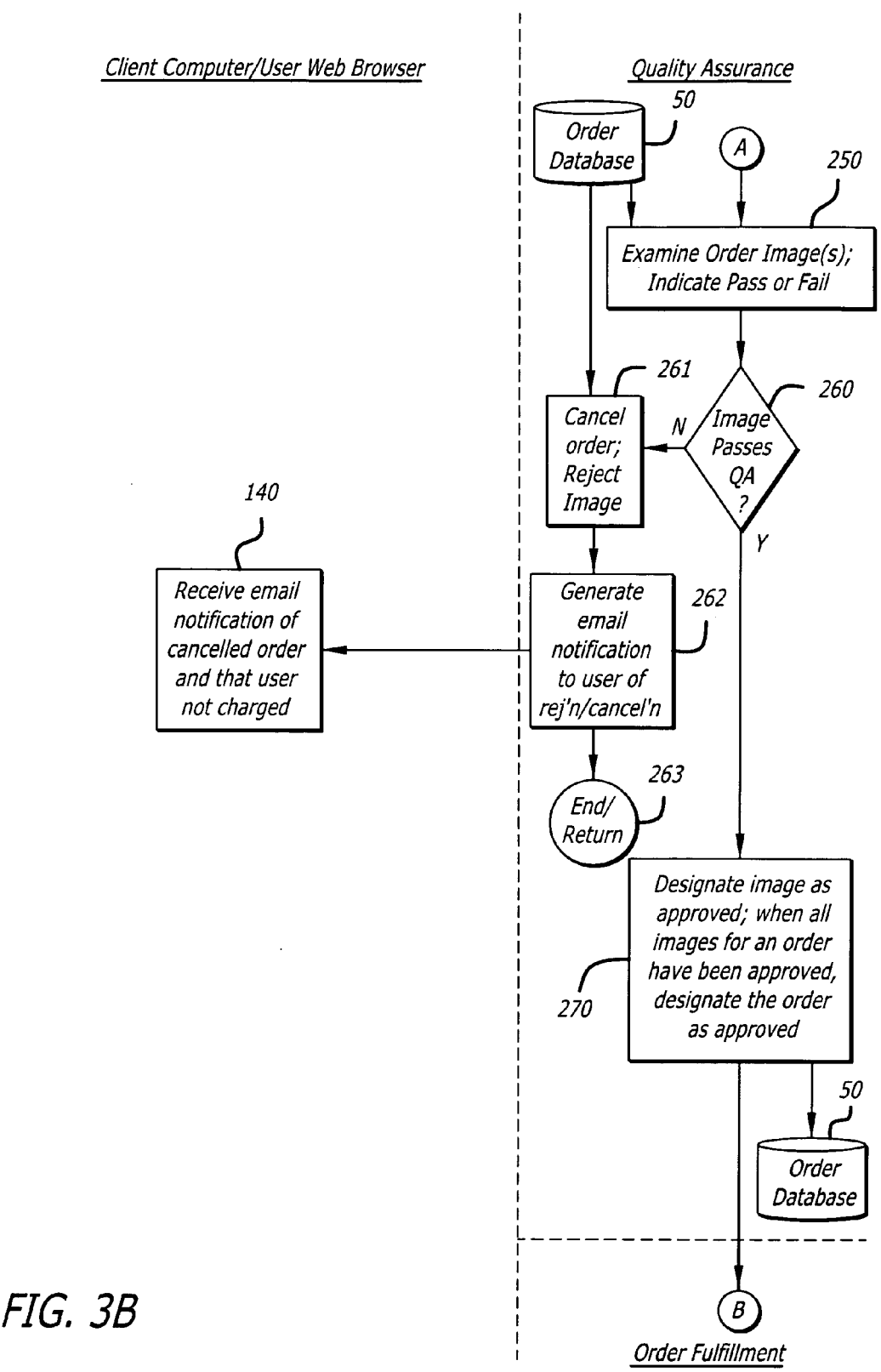
Figure 3C:
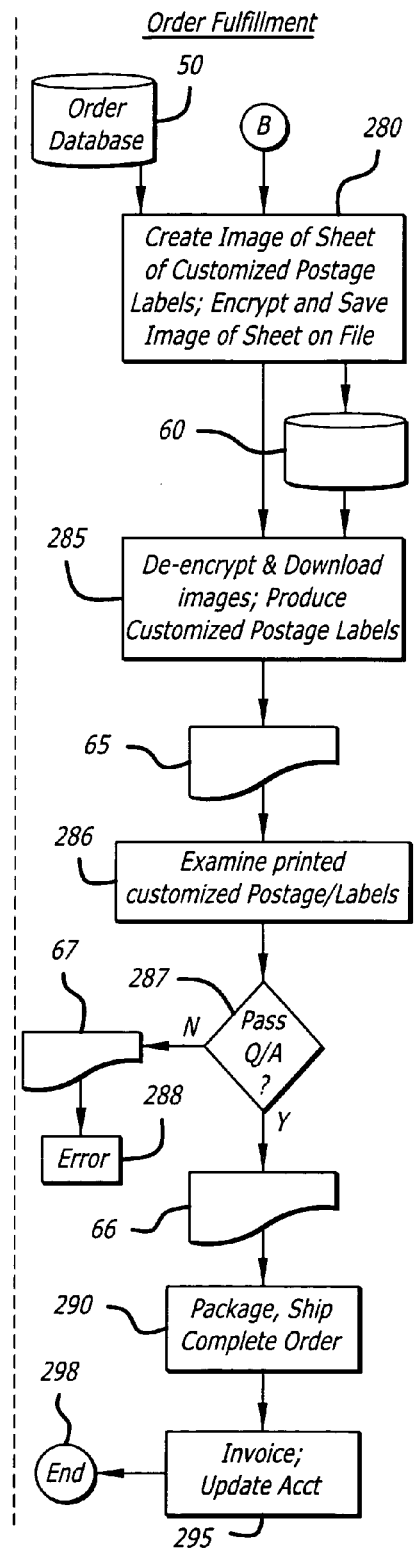

With reference to FIGS. 3A through 3C, an overview is described below of high-level logic functions for creating customized computer-based postage labels in an exemplary embodiment of the present invention. Interactions between exemplary elements of the exemplary embodiment of the present invention are described below with reference to FIG. 2B. A more detailed description of elements of the respective logic functions depicted in FIGS. 3A through 3C and FIG. 2B are provided with reference to other figures.

In FIGS. 3A through 3C, logic functions for a web browser (element 1002 in FIG. 2B) and/or a client computer (e.g., one of elements 10a through 10z depicted in FIG. 2A) are depicted on the left side of the drawing.

In the exemplary embodiment, software named MACROMEDIA FLASH® would be installed on each client computer to facilitate viewing of the exemplary user interface of the exemplary embodiment of the present invention. As will be understood by someone with ordinary skill in the art, MACROMEDIA FLASH® is a software program that integrates video, text, audio, and graphics.

Figure 7:
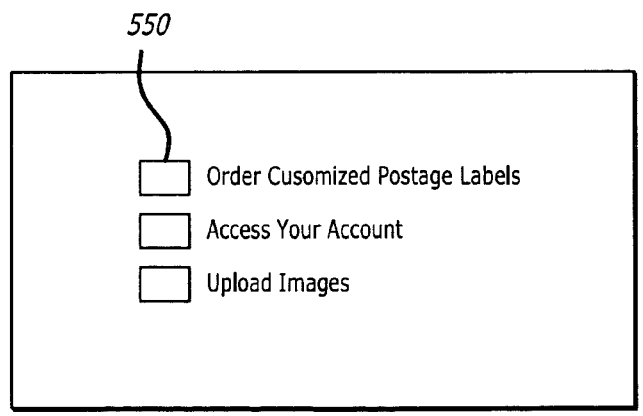
FIG. 7 is a graphic representation depicting a screen shot of an exemplary user interface home page screen in an exemplary embodiment of the present invention.

As depicted in FIGS. 3A through 3C, a user, using a client device (e.g., element 10a depicted in FIG. 2A) with a web browser (element 1002 in FIG. 2B), will request, in function 100, postage label customization. A user will request postage label customization such as, for example, by clicking on a user interface postage label customization "button" on a home page (see element 550, "Order Customized Postage labels", FIG. 7) at the postage label customization website 19. Alternatively, accessing the home page of the postage label customization website 19 could, in some embodiments, constitute a request for postage label customization.

Continuing with reference to FIGS. 3A through 3C, the postage label customization website 19 (via, a postage label customization website server computer 1004 depicted in FIG. 2B), will receive, in function 200, the user's request for postage label customization. In response to receiving, in function 200, the user's request for postage label customization, the postage label customization website 19 will, in function 210, generate a blank customizable postage label template and will cause a display of the template to be presented on a display device that is integral to, connected to, or otherwise in communications with the respective client device. For example, if the request for postage label customization was received in function 200 from client 10a, then the postage label customization website 19 will, in function 210, transmit, render or otherwise prepare the blank customizable postage label template for display on the respective display device 11a.

In the exemplary embodiment, a single customizable postage label template type is provided; the blank template will be characterized by a single set of parameters and by a single set of customizable elements; the display of the blank template will be formatted in a single way. However, it will be understood by someone with ordinary skill in the art that in alternative embodiments of the present invention, a plurality of template types could be provided to the user for selection without varying from the spirit of the present invention. In such an alternative embodiment, the user's selection of a particular template type would be communicated to the postage label customization website 19. Each template type would be characterized by a respective set of parameters and by a respective set of customizable elements; a display of a blank template corresponding to each template type would be formatted according to the respective template type and would be adapted to facilitate customization of the respective set of customizable elements. In such an alternative embodiment, the postage label customization website 19 would detect the user's indication of a selection of a particular template type, and would generate and cause the display of a blank template corresponding to the user-selected template type.

Returning to the exemplary embodiment, with reference to FIGS. 3A through 3C, the respective client, e.g., client 10a, would, in function 110, receive the blank template, would display a representation of the blank template on the respective display device, e.g., 11a, would instruct the user to input information corresponding to customizable elements of the blank template, and would facilitate the user's input of information corresponding to the customizable elements. In the exemplary embodiment, customizable elements will comprise the image (see element 2, FIG. 1), the border (see element 3, FIG. 1), and the amount of postage (see element 5, FIG. 1). In the exemplary embodiment, the user will be instructed to upload an image, select a border option from a plurality of border options, and select a postage amount from a plurality of discrete postage amounts. In the exemplary embodiment, a postage amount may be selected from: $0.23, $0.37, $0.49, $0.60, $0.83, $1.16, and $3.85. The postage amounts supported in the exemplary embodiment are exemplary and non-limiting; other postage amounts could be supported without departing from the spirit of the invention.

FIG. 5 is a graphic representation depicting a screen shot of an exemplary user interface blank postage label template screen 500 that depicts a representation of an exemplary blank customizable postage label template 530 in the exemplary embodiment of the present invention. As depicted in FIG. 5, the representation of the exemplary blank customizable postage label template 530 will comprise a display of a country identifier 531, a blank customizable postage amount field 532, a blank customizable image field 534, a customizable border field 533, a brand name 523, a mock postage indicia field 522, and a mock serial number 521. The exemplary blank customizable postage label template 530 will provide only a mock postage indicia field 522 because actual machine-readable postage indicia will be generated in a later function (see, e.g., function 280, described below with reference to FIGS. 3A through 3C). The exemplary blank customizable postage label template 530 will provide only a mock serial number 521 because an actual serial number will be generated in a later function.

Figure 12:
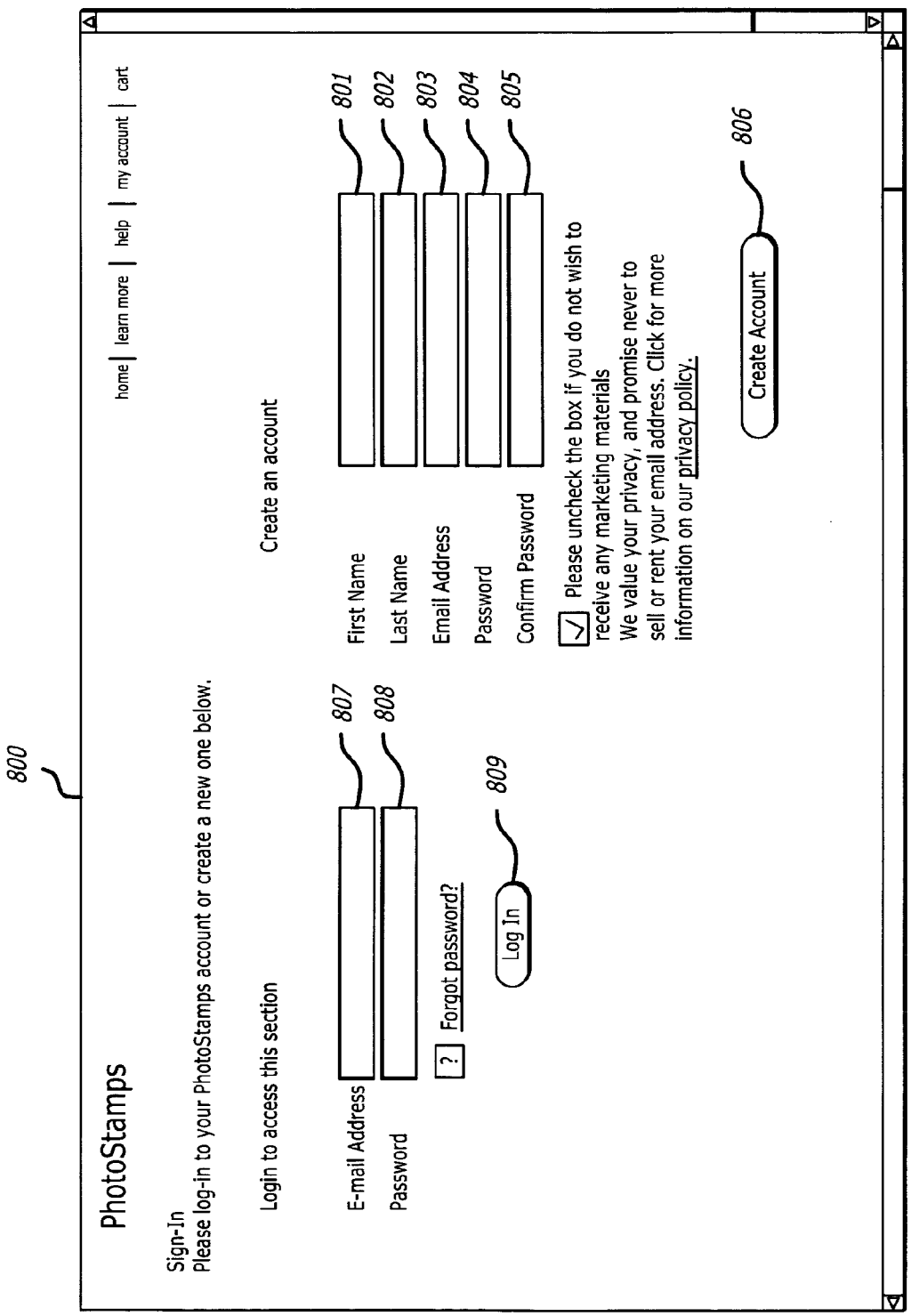
FIG. 12 is a graphic representation depicting a screen shot of an exemplary Sign-In/Create an Account screen in an exemplary embodiment of the present invention.

The exemplary user interface blank label template screen 500 will provide an onscreen button 520 that, when clicked by the user, will facilitate the user selecting a new image with which to customize the blank customizable image field 534. In the exemplary embodiment, before a user would be able to use the postage label customization service, the user would need to first establish a password-protected account. An exemplary Sign-In/Create an Account screen 800 is depicted in FIG. 12. With reference to FIG. 2B, communication 1003 in the exemplary embodiment between a user's web browser 1002 and the postage label customization website server 1004 will be according to HTTPS once a returning user logs in, or a new user enters information into the Create an Account screen (element 800 in FIG. 12).

Returning with reference to FIG. 12, in establishing an account, the user will provide, among other things, the user's name 801 (first name) and 802 (last name), an email address 803, and a password 804 (with confirmation 805). Once the information (e.g., elements 801-805) for establishing an account has been entered, the user could click the Create Account button 806 to cause the account information to be reviewed and, if approved by the system, to be used to create an account for the user/customer.

In the exemplary embodiment, when the user clicks the Create Account button 806, a copy of the Terms and Conditions for user access and ordering would be displayed on the respective display device 11a-11z connected with, or otherwise in communication with, the user's respective client device 10a-10z. Excerpts from an exemplary Terms and Conditions are provided in FIGS. 14A-14C.

Figure 14A:
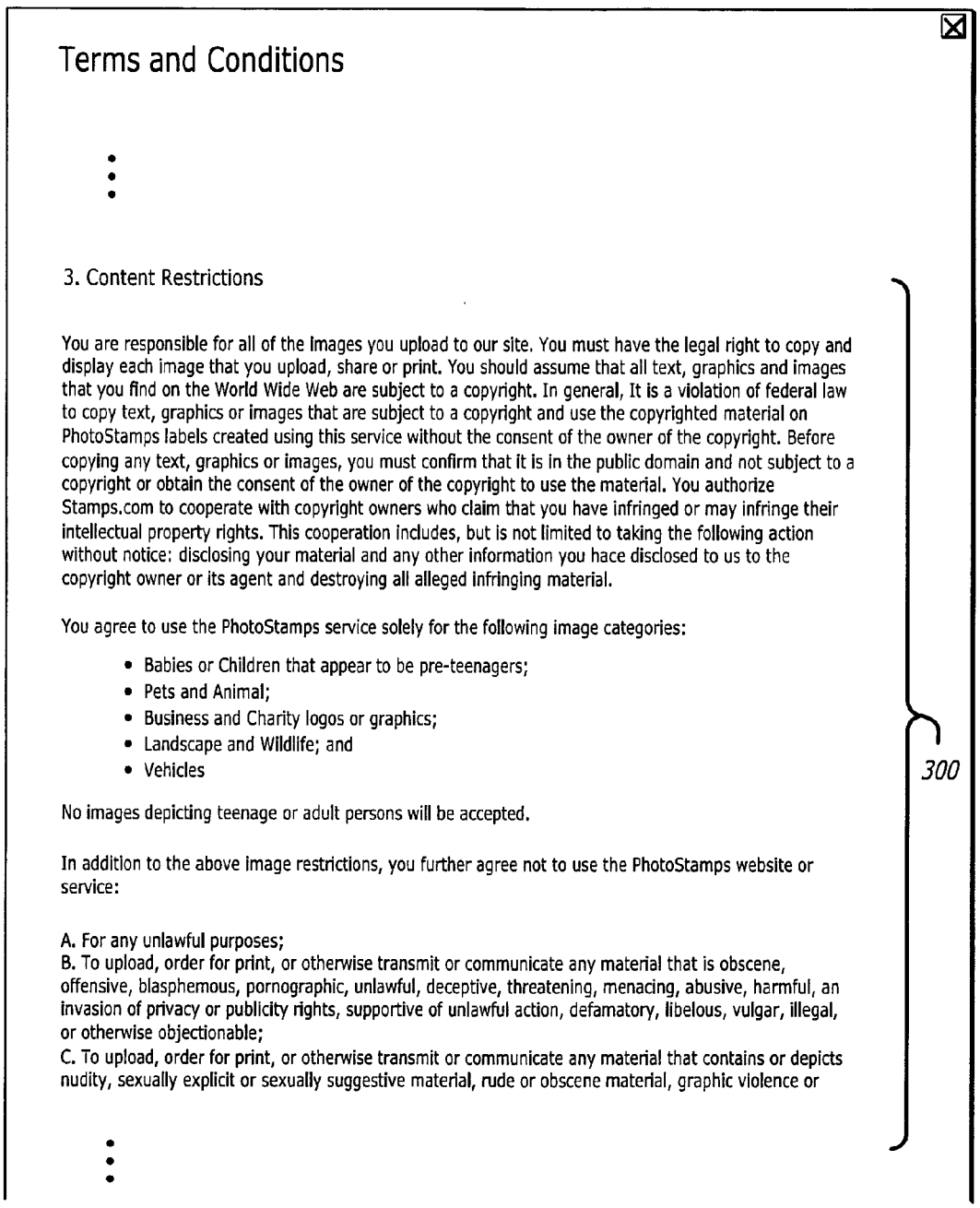

As depicted in FIGS. 14A-14B, the exemplary Terms and Conditions would present Content Restrictions 300. As depicted in FIG. 14B, the exemplary Terms and Conditions would further provide warning of possible suspension and termination of access 310. As depicted in FIG. 14C, the exemplary Terms and Conditions would further provide notice 320 to a user of procedures for reporting violations by a third-party user of intellectual property.

Figure 21:
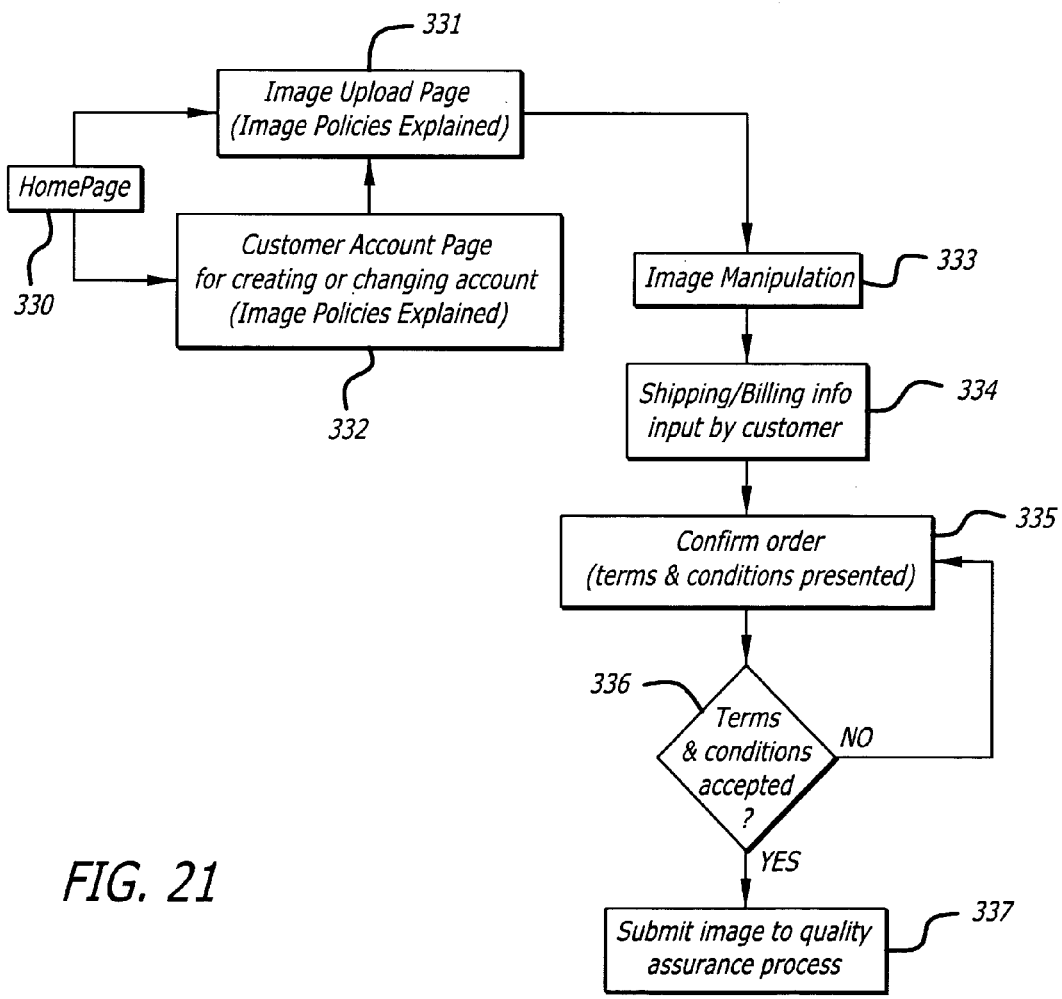
FIG. 21 is a high level flow diagram depicting high level logic functions for presenting Image Policies and Restrictions in an exemplary embodiment of the present invention.

As depicted in FIG. 21, Image Policies would be presented to the customer at several points during the ordering process. As depicted in FIG. 21, a customer can enter the Homepage 330 (See, for example, FIG. 7 and the description herein of FIG. 7) of the postage label customization website, and from there, navigate to, among others, an Image Upload Page 331 (See, for example, FIG. 19 and the description herein of FIG. 19), or a Customer Account Page 332 (See, for example, FIG. 12 and the description herein of FIG. 12). As depicted in FIG. 21, image policies would be explained in both the Image Upload Page 331, and the Customer Account Page 332. A new customer entering account signup information in the Customer Account Page 332 would be advised of the image policies before being able to navigate to the Image Upload Page 331. A returning customer would be able to navigate directly to the Image Upload Page 331. In either the case of a new customer that has first entered account signup information, or a returning customer that had previously entered account signup information, the Image Upload Page 331 would advise the customer of the image policies.

Once a customer has uploaded an image, the customer can manipulate the image via the Image Manipulation process 333. When the customer is satisfied with the image, the customer would be able to input shipping and billing information 334 (See, for example, FIGS. 9 and 10 and the description of FIGS. 9 and 10 herein) before being invited to Confirm the Order 335 (See, for example, FIG. 11 and the description of FIG. 11 herein). When the customer confirms the order 335, the Terms and Conditions (exemplary excerpts (related to the presentation of image policies) of which are depicted in FIGS. 14A-14C) would be presented to the customer for an affirmative indication of acceptance.

The Terms and Conditions accepted test 336 would be performed before submitting the image to the quality assurance process 337. If the customer has indicated acceptance of the Terms and Conditions, then the Submit Image to Quality Assurance Process 337 would be performed. However, if the customer had not indicated acceptance of the Terms and Condition, then the customer would be again presented with the Confirm Order 335 page, including the Terms and Conditions. The image would not be submitted to the Quality Assurance Process in step 337 unless and until the user accepted the Terms and Conditions.

Returning with reference to FIG. 12, if the user has previously established an account, the user would be able to login by entering the user's email address in the email address login field 807, by entering the correct password in the login password field 808, and by clicking the Log In button 809. Because the establishment of an account with an eCommerce website is well understood by someone with ordinary skill in the art, details about the establishment of an account are not further elaborated herein.

Figure 30:
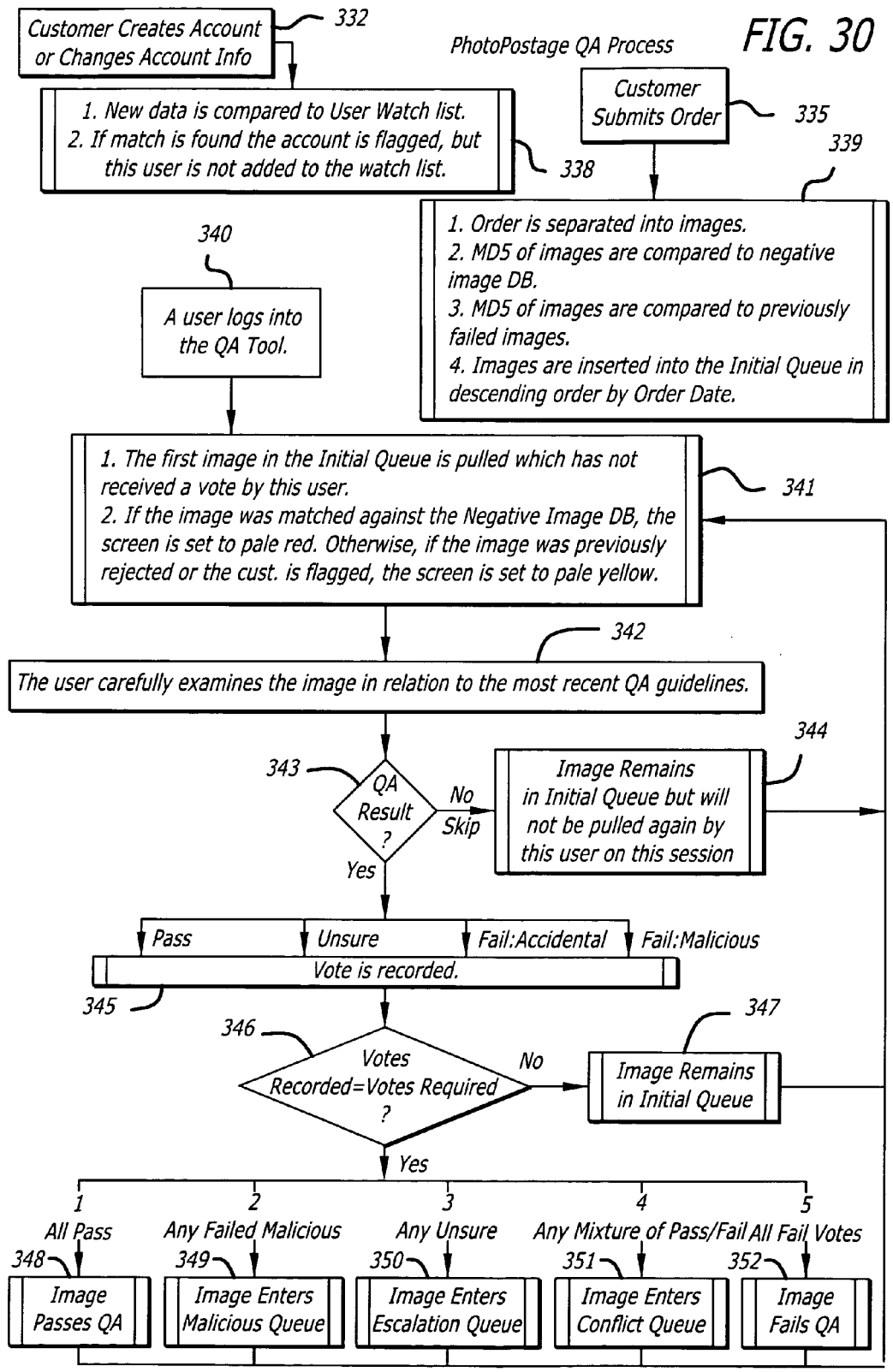
FIG. 30 is a high level flow diagram depicting high level logic functions in an exemplary quality assurance processing embodiment of the present invention.

In the exemplary embodiment, as depicted in FIG. 30, when customer creates an account or changes account information in the Customer Account Page 332, the customer's data is compared in process 338 to a User Watch List; if a match between the customer's data and the User Watch List is found, the customer account is flagged as a Watch List User/Account. In the exemplary embodiment, the customer/customer account is not added to the User Watch List at this point.

In the exemplary embodiment, a Negative Users Database would also be provided. The Negative Users Database would initially be acquired from a third-party and would be grown internally "organically", and/or periodically updated via third-party sources. A table in the Negative Users Database would have a code to indicate a user on a watchlist, for example journalists. A child table of codes would also be provided to indicate the category of user, such as, for example, "J" for journalist.

The Negative Users Database will contain records resulting from customer accounts that have been suspended. The customer and image information in the Negative Users Database will be "spidered" (all fields as defined). All customer fields and image information would be "spidered" to retrieve, such as via a GOOGLE search, information for similar subject matter with no particular scoring or ranking. A visual indicator such as changing the color of a link will be employed. The exemplary embodiment would use an application to improve data integrity quality with a third-party service. Fields that would be spidered to retrieve information for similar subject matter may include customer Email Address, Telephone Number, Credit Card Hash, Image MD5 Hash, Upload Image Name, Bill To Address1 and Bill To Address2 and City and State and ZIP Code, Ship To Address1 and Ship To Address2 and City and State and ZIP Code. In the exemplary embodiment, a factor would be associated with each spidered field as a validity weighing factor.

It will be understood by someone with ordinary skill in the art that the description herein of a hash function, such as MD5, is exemplary and non-limiting; other hash functions could be used without departing from the spirit of the invention. A hash value may be directly derived from a hash function or may comprise a modification of a hash value directly derived from a hash function.

Spidered retrieval will use various means to ensure data integrity of retrieval, including data name variation technologies to search for various variations, such as, for example: phonetic variations, such as, for example, SOUNDEX™; variations due to subconscious correction (such as dropping a terminal "e" from the name Smythe; variations due to physical variations, such as typographical transpositions; real world variations such as nicknames; variation due to truncation, such as formal abbreviation (e.g., Street becomes St), informal abbreviation (e.g., William becomes Will or Wm), or systematic truncation (such as when a form field is too short to contain the entire character string); variations due to concatenations (e.g., La Grange becomes Lagrange); variations due to splitting (e.g., Lagrange becomes La Grange); sequence variations (e.g., Dr. Carl Jung becomes Carl Jung, MD or Carl G Jung, PhD); variations due to use of initials (e.g., Carl G Jung becomes C G Jung); variations due to mixed usage (e.g., second, 2d, $2^{nd}$); and variations due to "noise" such as titles (e.g., Reverand, Jr., Sr., III, etc.).

In an alternative embodiment, a user would be able to upload images, customize computer-based postage labels and request to proceed to checkout before being asked to login. If the user had not previously established an account, the user would at that time "Create an account" before proceeding with checking out.

With reference to FIG. 2B, the postage label customization website server 1004 will communicate via a communication means 1009 with an account server 1008. Communications means 1009 may comprise any type of communication means whether now known or in the future discovered, including, for example, wireless communications. The account server 1008 will be responsible for secure protection and storage of user credit card and other account information.

With reference to the exemplary embodiment, once a user of the exemplary embodiment has established an account, the user will be able to access a personal image gallery. The exemplary user interface to the user's personal image gallery will facilitate the user uploading one or more images to the user's personal image gallery for use in customizing postage labels. In the exemplary embodiment, users will each be able to store up to ten (10) images in their personal image gallery. It will be understood by someone with ordinary skill in the art that the description of a 10-image storage limit in the exemplary embodiment is illustrative, and is not a limitation of the present invention.

FIG. 18 is a graphic representation depicting a screen shot of an exemplary user's image gallery summary screen 1800 in the exemplary embodiment of the present invention. In the exemplary image gallery summary screen 1800 depicted in FIG. 18, six exemplary images, 1801*a*, 1801*b*, 1801*c*, 1801*d*, 1801*e* and 1801*f* are depicted. For each image, e.g., 1801*a* through 1801*f*, a corresponding Select action button, e.g., 1802*a* through 1802*f*, and a corresponding Delete action button, e.g., 1803*a* through 1803*f* (corresponding to the particular image, which in the present example is image 1801*a*) will be provided. So for example, for image 1801*a*, a corresponding Select action button 1802*a*, and a corresponding Delete action button 1803*a* will be provided. If the user clicked on a Select action button, e.g., 1802*a*, corresponding to a particular image, e.g., 1801*a*, the particular image, e.g., 1801*a*, would be selected for use in filling the image window (element 534, FIG. 5) in the blank postage label template (element 530, FIG. 5). If, on the other hand, the user clicked on a Delete action button, e.g., 1803*a*, corresponding to a particular image, e.g., 1801*a*, the particular image, e.g., 1801*a*, would be deleted from the user's image gallery and would not appear in the user's image gallery summary screen 1800.

Figure 19:
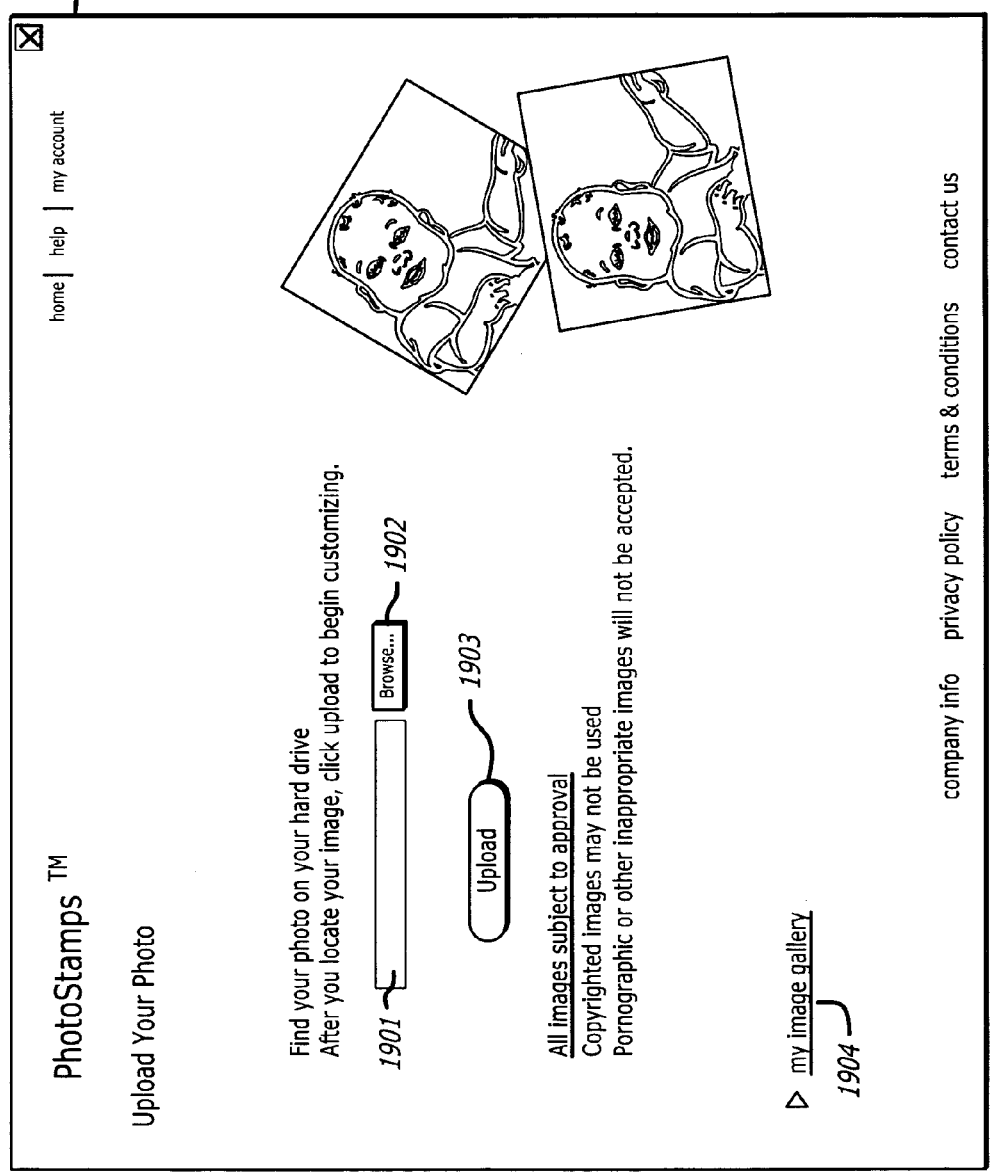
FIG. 19 is a graphic representation depicting a screen shot of an exemplary upload image screen in the exemplary embodiment of the present invention.

As depicted in FIG. 18, the exemplary embodiment would also provide an upload option 1804. Clicking on the upload option 1804 would cause a display of an exemplary upload image screen 1900 such as is depicted in FIG. 19. FIG. 19 is a graphic representation depicting a screen shot of an exemplary upload image screen 1900 in the exemplary embodiment of the present invention. In exemplary upload image screen 1900, an image source identification window 1901 would be provided. A user would have the option to key in to the image source identification window 1901 a location, such as a file on a hard drive on the user's computer, or a file on a disk, CD ROM or the like to which the user's computer has access, or some other addressable source; alternatively, the user could click a Browse button 1902 that would be provided in the exemplary embodiment. Clicking the Browse button 1902 would cause a list of addressable sources, directories and/or files to be displayed, from which the user would be able to highlight/select a particular file name and addressable location.

Once a user had identified a particular file in the image source identification window 1901, an Upload button 1903 would be provided that, when clicked, would upload the file from the file designated in the image source identification window 1901. After the file is uploaded, the user could then click on a "my image gallery" display button 1904. Clicking on the "my image gallery" display button 1904 would cause the exemplary embodiment to display the exemplary image gallery summary screen 1800 such as is depicted in FIG. 18.

As depicted in FIG. 18, the exemplary embodiment would also provide a previous order inguiry option 1805. Clicking on the previous order inguiry option 1805 would cause a display of a previous order summary screen (not depicted).

The exemplary embodiment will support various image formats, including GIF, BMP, JPG, and TIF. The image formats listed are illustrative and not a limitation of the invention; image formats now known and in the future discovered could be equally supported by an embodiment of the present invention. Users will be able, therefore, to upload and save images using any of the supported image formats. Size and resolution of each image will depend on the file format used.

Returning with reference to FIG. 5, once a user has established an account and uploads one or more images, if the user clicks the select-a-new-image button 520, a list will be displayed (not shown) of the images in the user's gallery. If a user has not previously established an account, clicking the select select-a-new-image button 520 would cause the display of user interface screens with which the user would need to establish an account.

If the user clicks the select-a-new-image button 520, and if a particular image that the user wants to use is not displayed in the user's gallery list, the user will need to upload the particular image and then select it from the user's gallery list.

If, on the other hand, the user clicks the select-a-new-image button 520, and the particular image that the user wants to use is listed in the user's gallery list, the user will be able to click on the "click & drag" field 504 on the exemplary user interface blank postage label template screen 500, click on the listing of the desired image, and drag the desired image to the blank customizable image field 534 (see element 534' described below with reference to FIG. 6). Once the blank customizable image field 534 has been filled with the particular image, the user would be able to click on the "click & drag" field 504 to reposition the image within the image field (see element 534' described below with reference to FIG. 6).

Continuing with reference to FIG. 5, the user will be able to select a postage amount (labeled Select Postage 501) by clicking on a pull-down postage amount menu button 502. Doing so will cause the display of the amounts of $0.23, $0.37, $0.49, $0.60, $0.83, $1.16, and $3.85. Moving the online cursor to the desire amount and highlighting the desired postage amount will cause the selected postage amount to appear in both the selected postage amount field 503, and will also customize the blank customizable postage amount field 532 (see element 532' described below with reference to FIG. 6).

In the exemplary embodiment, the exemplary user interface blank postage label template screen 500 will also provide a border customization field 512 with forward 510 and backward 511 buttons to scroll through a plurality of border color and/or pattern options. In the exemplary embodiment, the default border color/pattern will be a particular solid color, e.g., black. If a user selects a customized border, the customizable border field 533 will be customized according to the user's selection (see element 533' described below with reference to FIG. 6). In the exemplary embodiment, border color options will include: black (the default color), dark blue, red, light blue, orange, dark grey, yellow, green, violet, or white. Border color options in the exemplary embodiment are exemplary and non-limiting; other colors could be supported without departing from the spirit of the present invention. In the exemplary embodiment, when white is selected as the border color, postage value (see element 532' described below with reference to FIG. 6) will be dark blue.

In the exemplary embodiment, the exemplary user interface blank postage label template screen 500 will also provide a total price 535 per sheet of customized postage labels. Once a user has selected a postage amount 503, the total price field 535 will be updated (see element 535' described below with reference to FIG. 6).

The exemplary embodiment is described herein with reference to sheets of customized postage labels. In the exemplary embodiment, a user will be required to order a full sheet of customized postage labels; orders for partial sheets of customized postage labels will not be allowed. In the exemplary embodiment, each sheet of customized postage labels will contain 20 customized postage labels.

It will be understood by someone with ordinary skill in the art that in alternative embodiments, it would be possible in the spirit of the present invention to facilitate partial sheet orders, to facilitate shipping label orders, e.g., with one "postage label", postage label, and/or shipping label per page, and/or to facilitate other variations on order quantities and requirements.

In the exemplary embodiment, the exemplary user interface blank postage label template screen 500 depicted in FIG. 5 will also provide various image manipulation buttons (zoom in 505, zoom out 506; rotate counterclockwise 507, rotate clockwise 508; flip sideward 509, flip upward 510; a reset button 513). The image manipulation buttons will be useable by the user once the user has customized the blank customizable image field 534.

Returning with reference to FIGS. 3A-through 3C, once the user has input information corresponding to the customizable elements, the postage label customization website 19 will, in function 220, receive the user's customization input, and then will, in function 230, generate a preview display of the customized postage label and transmit, render or otherwise prepare the preview display to the respective client, e.g., 10a, for display on the respective display device, e.g., 11a.

The respective client, e.g., 10a, will, in function 115, receive, render or otherwise obtain the preview display of the customized postage label, e.g., via the web browser resident on the respective client device, and will present the preview display (see FIG. 6 and the description provided below with reference to FIG. 6) on the respective display device, e.g., 11a, for user determination, in function 120 of whether the customized postage label preview is satisfactory.

It will be understood by someone with ordinary skill in the art that the user will be able to separately customize each customizable field (image 534, border 533, and amount 532) on the exemplary user interface blank postage label template screen 500 depicted in FIG. 5 and that the exemplary preview display of the customized postage label in the exemplary embodiment will reflect each interim customization. It will be understood by someone with ordinary skill in the art that, rather than provide a preview display of each feature as a user provides customization instructions, an alternative embodiment could provide an onscreen preview button; once the user had completed inputting customization instructions, the user would click the preview button to cause a display of the customized postage label preview.

Figure 6:
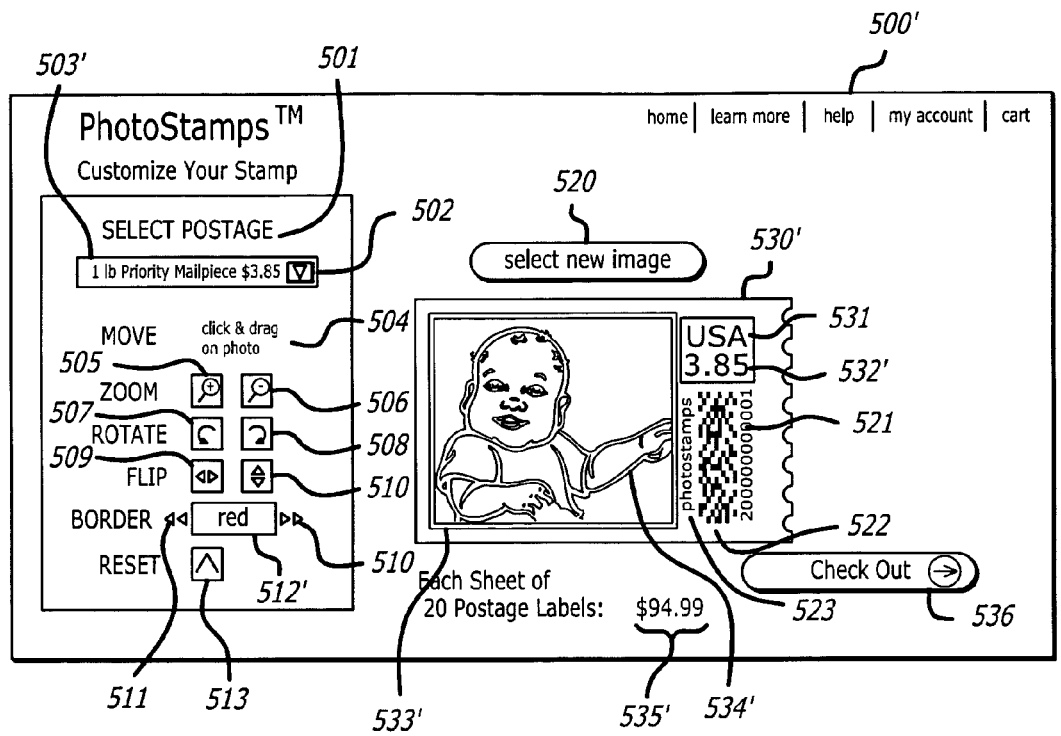
FIG. 6 is a graphic representation depicting a screen shot of an exemplary user interface customized postage label screen in the exemplary embodiment of the present invention.

FIG. 6 is a graphic representation depicting a screen shot of an exemplary user interface customized postage label preview screen 500' in the exemplary embodiment of the present invention. The exemplary user interface customized postage label screen 500' shown in FIG. 6 depicts a user's border selection 512' of a red border; a user's postage amount selection 503' of 1 lb. Priority Mail $3.85; a customized postage label 530' reflecting the user-customized postage amount 532', the user-customized border 533', the user-customized image 534', and a total price field 535' that has been updated to reflect the total amount ($94.99) of postage for 20 postage labels at the selected postage amount of $3.85.

Returning with reference to FIGS. 3A through 3C, if the user determines, in function 120, that the customized postage label is not satisfactory to the user, then the user could request that the template be reset (see element 513 in FIGS. 5 and 6) in function 118, returning control of the web browser (e.g., element 1002 in FIG. 2B) client (e.g., element 10a in FIG. 2A), to function 100.

If, on the other hand, the user determines, in function 120, that the customized postage label is satisfactory, then the user could proceed, in function 130, to submit the order (the user could indicate that, for example, the user is ready to "Check Out" by, e.g., clicking the "Check Out" button 536 depicted in FIGS. 5 and 6) and input order information, such as, for example, billing information (e.g., user name, credit card type, credit card number, credit card expiration date, billing address, and the like), shipping information (e.g., shipping address), and the quantity of the order.

Figure 8:
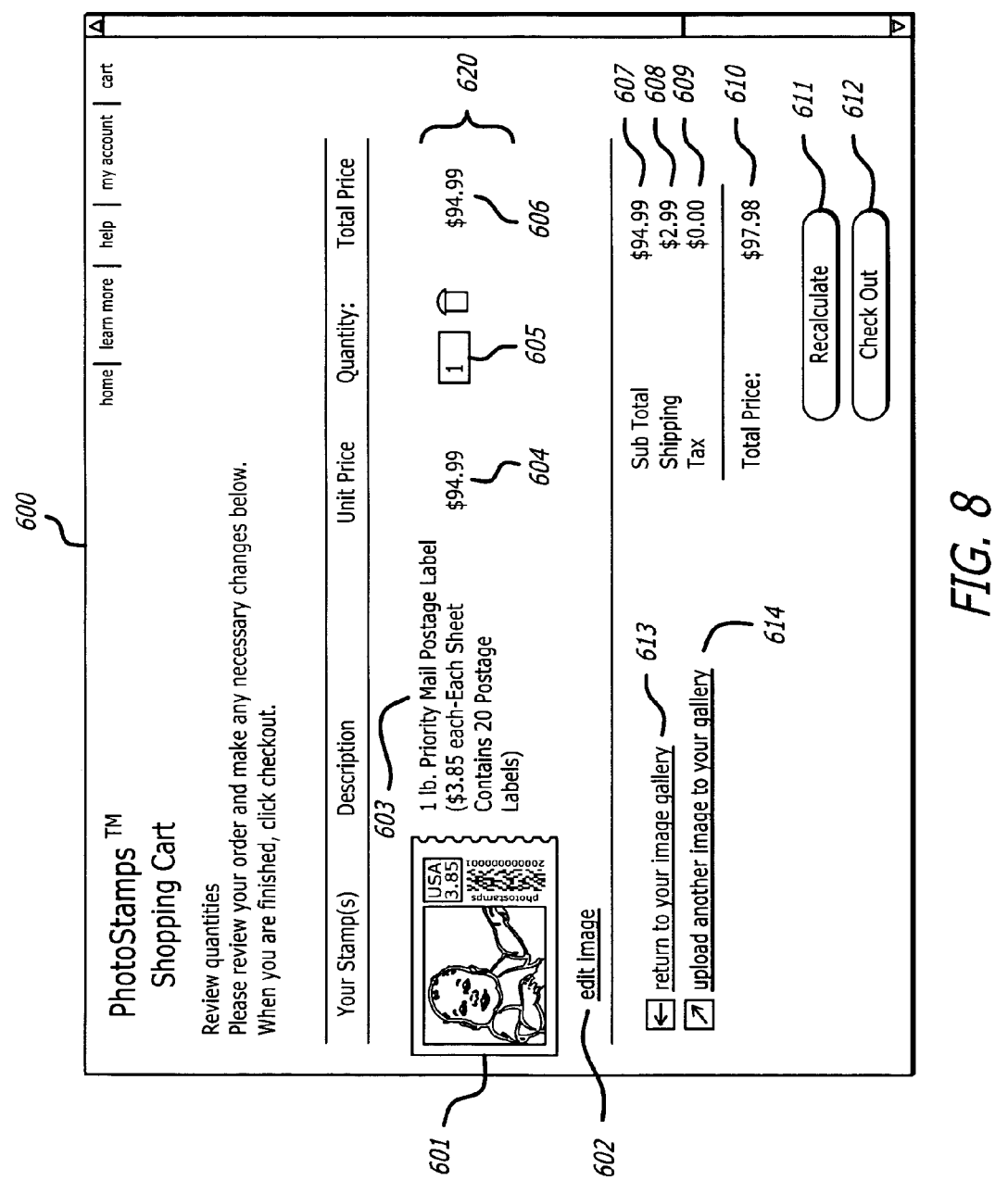

FIG. 8 is a graphic representation depicting a screen shot of an exemplary shopping cart summary screen 600 in an exemplary embodiment of the present invention. As depicted in FIG. 8, an exemplary shopping cart summary screen 600 would display a line, e.g., element 620, for each different customized postage label 601 in the particular user's current order. Each order line 620 will be characterized by a miniature preview display of the customized postage label 601 (which should match the preview display 530' that was shown in the corresponding exemplary user interface customized postage label preview screen 500' depicted in FIG. 6), a description of a sheet of such postage labels 603, a unit price 604 (that reflects the total price for a sheet of postage labels), a quantity 605 (that reflects the number of sheets ordered), and a total price 606 for the total quantity of the particular customized postage label.

Figure 11:
FIG. 11 is a graphic representation depicting a screen shot of an exemplary order confirmation screen in an exemplary embodiment of the present invention.

For any particular customized postage label 601 in the order 600, the user could click on the edit image field 602 to refine the customization of that particular postage label. The exemplary shopping cart summary screen 600 would also provide a sub-total 607 that would reflect the total of all customized postage labels in the order, a shipping fee 608, an amount of tax 609 (however, there is presently no tax for U.S. postage), and a Total Price 610 for the entire order. The exemplary shopping cart summary screen 600 would also provide an option to return to the user's image gallery 613, and an option to upload another image to the user's image gallery 614. The user would be able to modify the quantity field for any customized postage label listed by placing the cursor on the quantity field 605 and entering a different number; the user would be able to request recalculation of the total order by then clicking the Recalculate button 611. When the user is satisfied with the summary of the order as presented on the exemplary shopping cart summary screen 600, the user would be able to click on the Checkout button 612 which would take the user to further order finalization screen, such as are depicted in FIGS. 9, 10, and 11.

Figure 9:
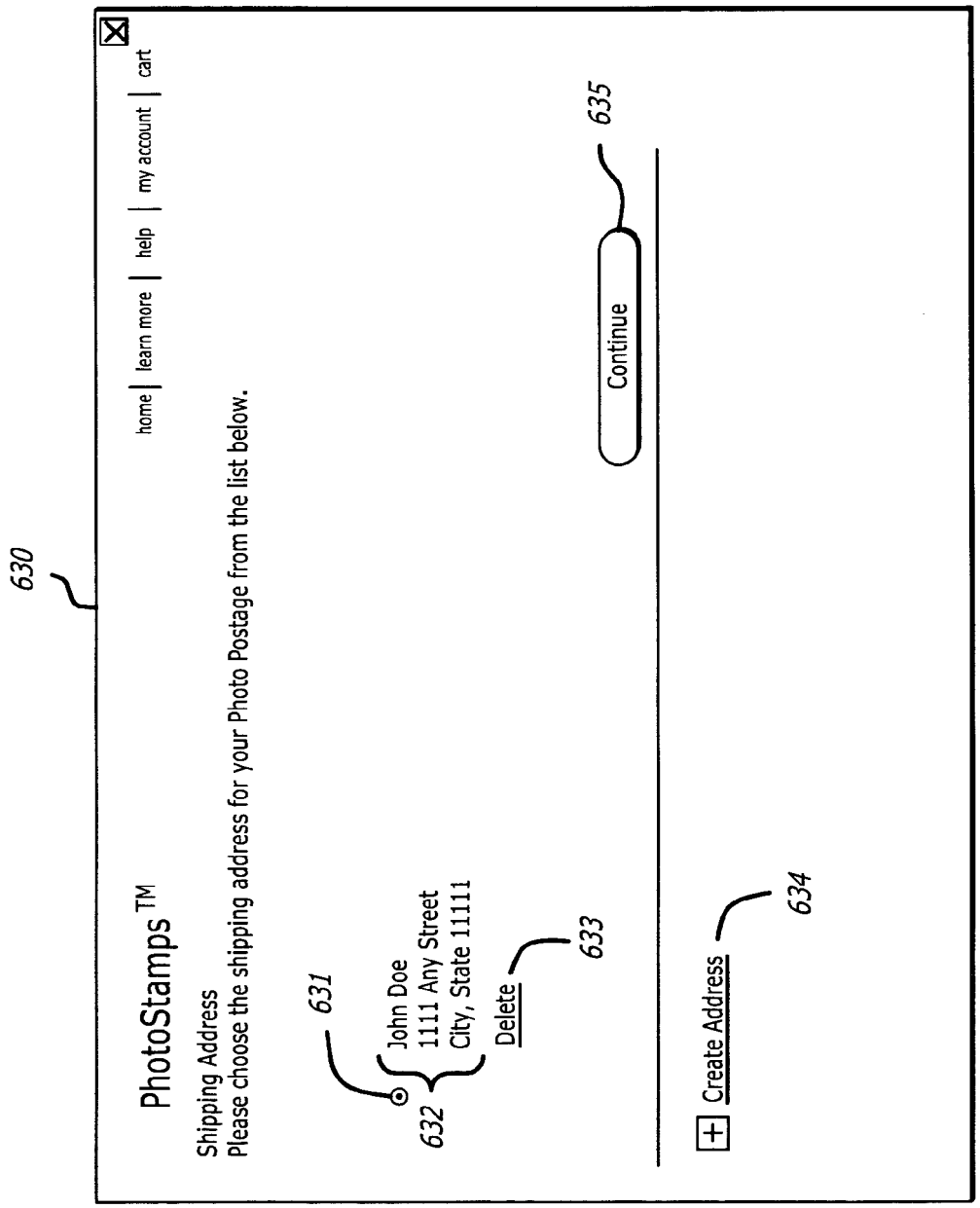
FIG. 9 is a graphic representation depicting a screen shot of an exemplary shipping address screen in an exemplary embodiment of the present invention.

FIG. 9 is a graphic representation depicting a screen shot of an exemplary shipping address screen 630 in an exemplary embodiment of the present invention. Using the exemplary shipping address screen 630, a user would be able to choose the default address 632 to which the customized postage should be set by clicking the default address button 631. Alternatively, the user would be able to click the Delete button 633 and cause the deletion of the default address as the shipping address. The user would be able to click the Create Address button 634 and enter a new shipping address. Once the shipping address information is correct, the user would be able to click on the Continue button 635 to proceed to the next order finalization screen.

FIG. 10 is a graphic representation depicting a screen shot of an exemplary billing information screen 650 in an exemplary embodiment of the present invention. As depicted in FIG. 10, the user would be able to either choose to reuse previously provided credit card information 651 and click the Confirm your order button 652 to proceed to the next screen, or could supply billing information (elements 653 (credit card type) through 669 (email address)) and then click the Confirm your order button 670. As depicted in FIG. 10, if the user chooses to enter new billing information, the user would be provided with input fields for credit card type 653 (selected by clicking on the credit card type pull down menu button 654 and highlighting the desired credit card type), name on card 655, card number 656, credit card expiration date 657, an option to save the credit card information 658, an option to indicate that the billing address is the same as the shipping address 659, the user's first name 660, the user's last name 661, a street address 662, an Apt./Ste./Unit field 663, city 664, state 665, zip code 666, daytime phone 667, evening phone 668, and email address 669.

Once the user has entered the appropriate billing information and confirmed the order by clicking on the appropriate confirmation button 652 or 670 as the case may be, the user would be presented with a final Confirm Your Order screen. FIG. 11 is a graphic representation depicting a screen shot of an exemplary order confirmation screen 680 in an exemplary embodiment of the present invention. The exemplary order confirmation screen 680 summarizes the order, reflecting information previously depicted and described with reference to FIGS. 8, 9 and 10. If the user wants to accept the order, the user would need to indicate in agreement field 681 that the user agrees to the terms and conditions 682 for the website, and then submit the order by clicking the Submit Order button 683.

With reference to FIG. 30, when a Customer Submits an Order 335, then in process 339, the Order is separated into images; an MD5 (a Message-Digest algorithm 5 (MD5 is a message-digest algorithm developed by Ron Rivest. It is useful for digital signature applications where a large message has to be "compressed" in a secure manner before being signed with a private key)) hash of each image will be compared to images on a Negative Image Database (also referred to herein as the Bad Image Database); the MD5 hash of the image will also be compared to hash values of images on a Previously Failed Image Database; images are marked according to matches, if any, found on the Negative Image Database or the Previously Failed Image Database, and are then inserted into a general pre-print quality assurance queue (element 1103, FIG. 2B).

With reference to FIG. 2B, in the exemplary embodiment, user credit card information and the ordered postage will be stored by the Account Server 1008, encrypted in a secure administrative "Commerce" database; all "backend" processes associated with the customized postage will follow Vault security measures.

Returning with reference to FIGS. 3A through 3C, the postage label customization website 19 will, in function 240, receive the order information and will generate an entry for the order in an order database 50.

With reference to FIG. 2B, once a user submits an order, a unique Order Number will be assigned to the order by the postage label customization website server 1004. An entry for the order will be stored by the postage label customization website server 1004 in the order database (element 50, FIGS. 3A through 3C). Subsequently, the order will be submitted, as described further below, for quality assurance inspection and review.

In the exemplary embodiment, an entry for an order on the order database (element 50, FIGS. 3A through 3C) would comprise customer and billing information, a pre-print quality assurance disposition, a post-print quality assurance disposition (initialized to a value that indicates that all of the images in the order have not yet been approved), and an entry for each image. An entry for an image would comprise: a URL (Universal Resource Locator) for the corresponding uploaded image, scale information that describes the scaling of the uploaded image with respect to the customized postage label image (see element 534', FIG. 6), offset information that describes the offset of the uploaded image with respect to the customized postage label image (see element 534', FIG. 6), flip information that describes the flip orientation of the uploaded image with respect to the customized postage label image (see element 534', FIG. 6), horizontal information that describes the horizontal orientation of the uploaded image with respect to the customized postage label image (see element 534', FIG. 6), and a pre-print quality assurance disposition (initialized to a value that indicates that the image has not yet been reviewed).

In the exemplary embodiment, with reference to FIGS. 3A through 3C, the image(s) for each order will be examined at a "pre-print" stage in a quality assurance procedure depicted in function 250. Pre-print stage image quality assurance will be performed in order to identify and reject illegal or obscene subject matter, and/or poor quality images. In the exemplary embodiment, pre-print image quality assurance will be implemented using a computer-managed human review process that is described in more detail below. Quality assurance users will indicate whether each respective image in an order passes or fails quality assurance standards.

With reference to FIG. 2B, an Internet postage provider system upload file server 1006 will upload images in each submitted order (from the order database, depicted as element 50 in FIGS. 3A through 3C) to a pre-print quality assurance queue 1103, which will in turn, be processed by an image quality assurance server 1102.

The exemplary embodiment will provide a Quality Assurance inspection interface, sometimes referred to herein as the Inspector Admin (administrative) Tool. The exemplary Inspector Admin Tool will allow for the quality assurance processing of image review, and image approval or rejection. In order to use the Inspector Admin Tool, a Quality Assurance inspector/reviewer (also sometimes referred to as an Inspector, or alternatively, a QA User) would log in to the Inspector Admin Tool.

Figure 13:
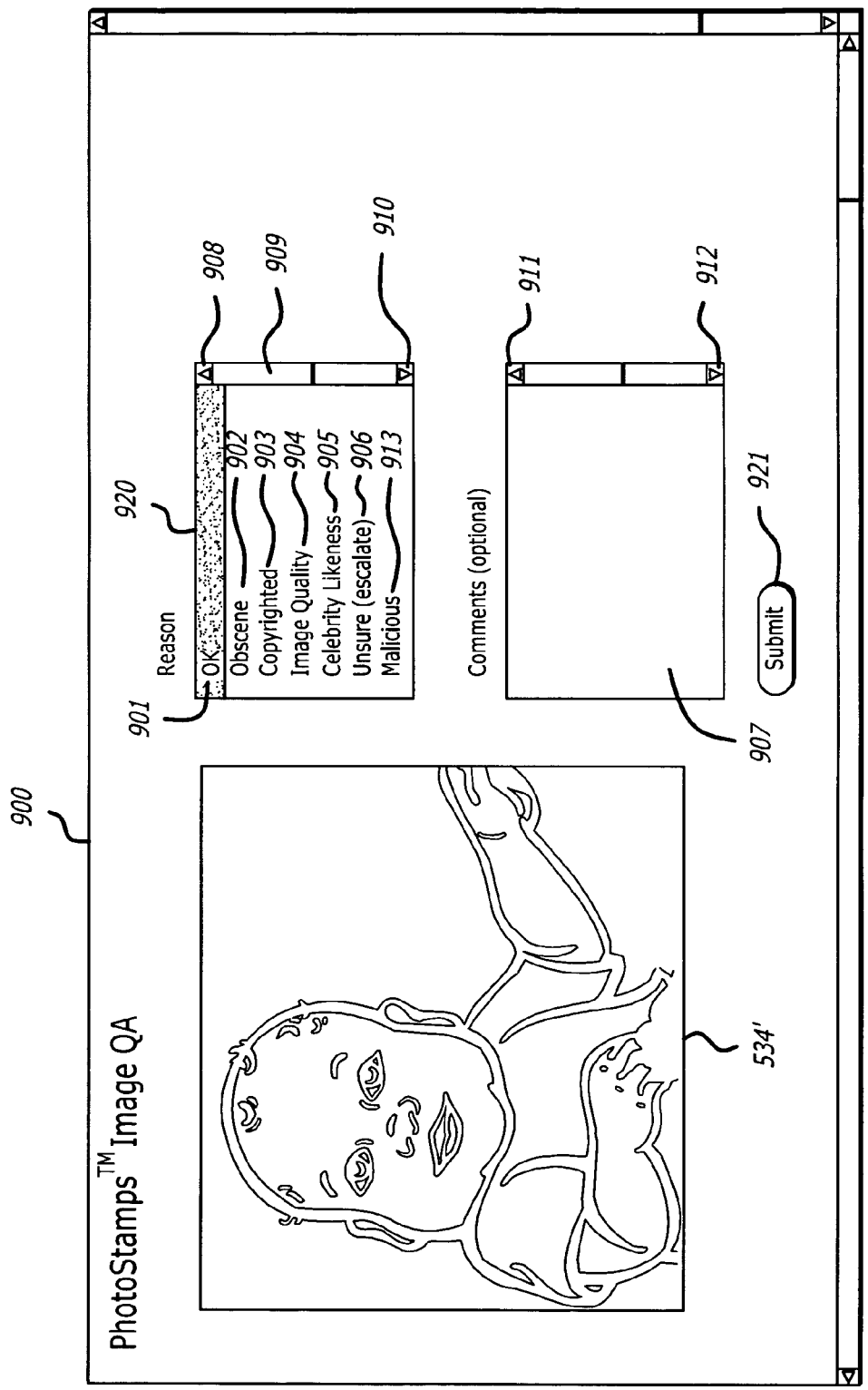
FIG. 13 is a graphic representation depicting a screen shot of an exemplary pre-print image quality assurance review screen in the exemplary embodiment of the present invention.

FIG. 13 is a graphic representation depicting a screen shot of an exemplary pre-print image quality assurance review screen 900 of the exemplary Inspector Admin Tool in the exemplary embodiment of the present invention. Once a user (customer) has submitted an order, the images will be submitted for pre-print quality assurance inspection/review by a pre-print quality assurance inspector/reviewer (who may also sometimes be referred to herein as a QA User). In the exemplary pre-print image quality assurance review screen 900, each ordered image, e.g., 534', will be presented to a pre-print quality assurance inspector/reviewer.

With reference to FIG. 2B, in the exemplary embodiment, ordered images will be queued sequentially by the image quality assurance server 1102 through a pre-print quality assurance interface 1104, referred to herein as the Inspector Admin Tool (or sometimes referred to herein as the "QA Tool"), for Quality Assurance inspector/reviewer action. A pre-print quality assurance inspector/reviewer will review user-ordered images, such as depicted in FIG. 13, and will assess the aesthetic and legal acceptance of an image. Each user's images will appear through the pre-print quality assurance interface 1104 in the exemplary pre-print image quality assurance review screen 900 depicted in FIG. 13, chronologically according to Order Number.

The exemplary system of the exemplary embodiment will provide a QA user record for each person authorized to perform a QA user role. The exemplary system of the exemplary embodiment will provide for a non-supervisory QA user role and a supervisory QA Manager role. A non-supervisory QA user will be allowed by the system to perform certain functions. For example, a QA user designated in the system as a non-supervisory QA user would be allowed by the system to access images from a general pre-print quality assurance queue (element 1103, FIG. 2B) (also sometimes referred to herein as the "Initial Queue"), and enter a non-supervisory QA user vote for each image reviewed by the non-supervisory QA user. A QA user designated in the system as a supervisory QA user would be allowed by the system to access images in various queues (which are explained further below) and enter a supervisory QA user decision, which would trump all non-supervisory QA user votes.

In the exemplary embodiment, the QA process would allow for "n" non-supervisory QA user votes. It will be understood by someone with ordinary skill in the art that the indication of "n" votes indicates a variable number of votes that could be pre-set. The variable "n" in the exemplary process would be set, for example, to require n=3 votes.

The exemplary system would provide the ability to disable the requirement for multiple votes. For example, the variable "n" could be set to n=1 vote.

When "n" is set to a number larger than one, the system would evaluate the aggregate dispositions for an image. For example, the system could be set to allow for designation that a single passing or failing vote would constitute a final vote. Alternatively, the system could be set to allow for successive votes, such as, for example, 2 pass votes to pass, 1 fail vote to fail; or vice versa. For example, the system could be set to require n passes to pass and n fail votes to fail; or it could be set to require some number 'x' (where x is less than n) fail votes to fail. In the exemplary embodiment, all votes would be independent.

In one exemplary embodiment, each image will be separately and independently reviewed by two different non-supervisory pre-print quality assurance inspectors/reviewers (QA Users). Each independent non-supervisory pre-print quality assurance inspector/reviewer will indicate their assessment of an image. An image will not be considered to have passed quality assurance unless both non-supervisory pre-print quality assurance inspectors/reviewers approve the image, or unless a Supervisory QA User (also sometimes referred to herein as a QA supervisor, or as a QA supervisory user or as a QA Manager) approves the image.

The first pre-print quality assurance inspector/reviewer to log in will receive the first image, in chronological Order Number order, available for that QA user's review at that time, in the general pre-print quality assurance queue (element 1103, FIG. 2B). As an image rises to the head of the general pre-print quality assurance general queue (element 1103, FIG. 2B), when a pre-print quality assurance inspector/reviewer next logs in, or next disposes of a previous image, the next image available for that QA user (that is, that QA user has not yet entered a vote for that image) will automatically be uploaded as the ordered image, e.g., 534', in the exemplary pre-print image quality assurance review screen 900 depicted in FIG. 13.

In the exemplary embodiment, non-supervisory inspectors/reviewers will not be able to choose from the general pre-print quality assurance queue (element 1103, FIG. 2B), but will always receive the earliest order images available for their review. If an inspector/review does not complete an image review, the image will be released back into the pre-print quality assurance queue (element 1103, FIG. 2B). That is, each image must receive disposition before it will advance in the pre-print quality assurance queue (element 1103, FIG. 2B), making the next image in the queue available. It is possible for a pre-print quality assurance inspector/reviewer to escalate an image for supervisory review.

With reference to FIG. 30, in process 340, a QA user would log into the QA Tool. In process 341, the first image in the general pre-print quality assurance queue which has not received a vote by the particular QA user would be uploaded or otherwise pulled and displayed as the ordered image (e.g., 534' in the exemplary pre-print image quality assurance review screen 900 depicted in FIG. 13). Continuing with reference to process 340 in FIG. 30, if the image carries an indication that a match between the image and at least one image on the Negative Image Database had been found, then the ordered image screen (e.g., 534' in the background of the exemplary pre-print image quality assurance review screen 900 depicted in FIG. 13) would be set to a first highlighted color, such as, for example, red. If no Negative Image Database match is indicated for the image, then if there is an indication that the image was previously rejected, or if the customer is flagged as a Watch List User, then the background of the exemplary pre-print image quality assurance review screen 900 depicted in FIG. 13) would be set to a second highlighted color, such as, for example, yellow.

In the exemplary embodiment, the Watch List User Database would be populated by quality assurance personnel as a result of quality assurance rejection and/or would be populated by the system when an image is flagged for rejection due to certain critical rejection reasons, e.g., copyright violations, malicious image order, frivolous image order, or an order exhibiting an intent to harm. Entries to the Watch List User Database would include information about the corresponding customer user obtained from the corresponding customer account. For example, an entry to the Watch List User Database for a particular customer would include name, address, credit card, and similar information about the customer. In the exemplary embodiment, the Watch List User Database would be used in the exemplary Quality Assurance process to alert QA users reviewing a new image ordered by a customer that the customer had previously submitted objectionable images. As described elsewhere herein, the alert to the QA user reviewing a new image would be provided, by, for example, generating a highlighting color, such as yellow, for a background of the image being reviewed.

With reference to FIG. 13, a plurality of quality assurance reasons e.g., "OK" 901, Obscene 902, Copyrighted 903, Image Quality 904, Celebrity Likeness 905, Unsure (Escalate) 906 and Malicious 913 will be presented in a quality assurance reason selection window 920. A pre-print quality assurance inspector/reviewer will be able to highlight one of the quality assurance reasons in the quality assurance reason selection window 920 for the review either passing or failing the image. If all of the pre-print quality assurance inspectors/reviewers selected "OK" 901 as the reason, the image would pass pre-print quality assurance review. In the exemplary embodiment, if one of the pre-print quality assurance inspectors/reviewers selected one of the other reasons (other than "OK"), e.g., Obscene 902, Copyrighted 903, Image Quality 904, Celebrity Likeness 905, Unsure (Escalate) 906, or Malicious 913 the image would fail pre-print quality assurance review.

The pre-print quality assurance reasons, e.g., 901 through 906 and 913, are illustrative and non-limiting; additional quality assurance reasons could be listed; a pre-print quality assurance inspector/reviewer would scroll through additional reasons using a window up key 908, down key 910, or tab 909.

The pre-print quality assurance inspector/reviewer would be able to input comments in the comment field 907, and would be able to scroll through the comments using a comment window up key 911 or down key 912. Once the pre-print quality assurance inspector/reviewer was satisfied with their assessment of the image 534', the pre-print quality assurance inspector/reviewer would click on the Submit button 921.

Clicking on the Submit button 921 would cause the next image in the general pre-print quality assurance queue (element 1103, FIG. 2B) that is available for the particular QA User to review, to be displayed to the pre-print quality assurance inspector/reviewer and would cause the quality assurance reason for the reviewed image to be submitted to the test function 260 (depicted in FIGS. 3A through 3C).

Returning with reference to FIG. 30, the QA user would then examine the ordered image screen (e.g., 534' in the background of the exemplary pre-print image quality assurance review screen 900 depicted in FIG. 13) and, ideally, would enter a QA result. In test process 343, a QA Result is tested to see if a QA Result was entered. If no QA Result had been entered, then in process 344, the relevant image would remain in the general pre-print quality assurance queue (also sometimes referred to herein as the "Initial Queue"). In the exemplary embodiment, as depicted in process 344, if the particular QA user did not enter a QA result for a particular image, then the image would not be pulled again during the same session for review by the same QA user. In test process 343, if a QA Result is detected, then the QA Result (the "vote") is recorded in process 345.

Continuing with reference to FIG. 30, when a vote has been recorded in process 345, then test 346 would be executed to test whether or not the number of votes that have been recorded for the particular image is equal to the number of votes required (e.g., number of votes="n"?). If it is determined in test 346 that the number of votes recorded is less than (not equal to) the number of votes required, then process 347 would allow the image to remain in the Initial Queue. If on the other hand, it is determined in test 346 that the number of votes is equal to (or greater than) the number of votes required, then the image would be recorded, with its respective votes, on one of a plurality of queues 348, 349, 350, 351, 352.

Continuing with reference to FIG. 30, if all votes recorded were pass (OK; reason 901, FIG. 13) votes, then the image would be entered into the Image Passes QA queue 348. Images in the Image Passes QA queue 348 are essentially "dequeued" for further quality assurance purposes, and are available for printing.

If, on the other hand, any of the votes recorded was a vote that the image was "Malicious" (reason 913, FIG. 13), then the image would be entered into the Malicious Queue 349. If any of the votes recorded was an "Unsure" vote (reason 906, FIG. 13), then the image would be entered into the Escalation Queue 350. If any other mixture of pass (reason 901, FIG. 13) and fail (e.g., reasons 902-905, FIG. 13), then the image would be entered into the Conflict Queue 351. If all votes recorded were fail votes (e.g., reasons 902-905, FIG. 13) (but not Unsure or Malicious votes), then the image would be entered into the Image Fails QA Queue 352.

In an alternative exemplary embodiment, in test step 346, even if the number of votes recorded does not yet equal the number of votes required, the votes recorded would be tested to identify whether any votes indicate the Image is Malicious, or indicate the Unsure reason. If the Image has been identified as Malicious, it would be immediately entered into the Malicious Queue 349 and would not be available for further voting by downline non-supervisory QA users (non-supervisory QA users that had not yet reviewed the particular image). If an Unsure vote had been cast for the Image, the Image would immediately enter the Escalation Queue 350 and would not be available for further voting by downline non-supervisory QA users. In the alternative exemplary embodiment, images could be immediately escalated for supervisory action when a non-supervisory pre-print quality assurance inspector/reviewer is unsure as to its disposition; escalation for supervisor action would be accomplished by the pre-print quality assurance inspector/reviewer highlighting the "unsure" reason (element 906, FIG. 13). Escalation would restrict the image from being released back in to the general pre-print quality assurance queue (element 1103, FIG. 2B). Subsequent image quality assurance disposition changes made by supervisory action would be recorded in the order database (element 50, FIGS. 3A through 3C).

Returning with reference to the exemplary embodiment, and with reference to FIG. 30, Images in the Malicious Queue 349, the Escalation Queue 350, and the Conflict Queue 351, will be reviewed by a supervisory QA User (e.g., a QA Manager). With respect to Images in the Malicious Queue 349, the Escalation Queue 350, and the Conflict Queue 351, a QA Supervisor/Manager, by virtue of a supervisory role indicated in the system for the QA Supervisor/Manager, will cast a deciding vote that will trump/override all votes by non-supervisory QA users. Results of the QA Manager review of Images in the Malicious Queue 349, the Escalation Queue 350, and the Conflict Queue 351 may be useful in further quality assurance training of non-supervisory QA users.

In the exemplary embodiment, a QA Supervisor will, through a computer interface, assess the aesthetic and legal acceptance of each image in the queues for supervisory review (e.g., the Malicious Queue 349, the Escalation Queue 350, and the Conflict Queue 351). A QA Supervisor may also review images previously reviewed but not escalated by non-supervisory QA users on a random or other basis (in e.g., the Image Passes QA queue 348, or the Image Fails QA Queue 352). Access to the QA Supervisor interface will be determined by Windows user group roles. In the exemplary embodiment, the QA Supervisor interface will be identical to the QA User interface with differing underlying functionality. Images will be made available to the QA Supervisor interface through the queues for supervisory review (e.g., the Malicious Queue 349, the Escalation Queue 350, and the Conflict Queue 351). A QA Supervisor will be able to select an image for review and the QA Supe'rvisor's selection will not being limited by a sequential ordering of an image queue. Accordingly, a decision on the disposition of a particular image can be deferred, if deferral is determined to be appropriate by a QA Supervisor.

In the exemplary embodiment, an Image with material considered to fall in a Critical category will be rejected from use with USPS postage; critical category material will include content that is considered harmful, illegal, or controversial. Exemplary critical category material quality assurance standards in the exemplary embodiment will include content with:

Any nudity;

Any woman wearing a low-cut top or very short skirt;

Any man wearing Speedos or other skin tight shorts;

Any child that appears to be two years old or older who is not wearing a shirt;

Any foreign language that the inspector cannot translate;

Any profanity;

Any rude, obscene or unrecognizable gestures;

Anything sexually suggestive;

Anything violent or that implies violence or accidental injury (fire, explosions, threats, weapons of any kind, etc.);

Any postage stamp, meter mark, or indicia;

Anything racist, sexist, or otherwise discriminatory;

Anything supportive of illegal activities;

Any religious or spiritual iconography that is the subject of the image;

Anything slanderous or libelous; insulting text, or doctored to be insulting or compromising.

Material containing content that may be copyrighted material, that is not owned by the person who submits the image for print, will be considered to be in an "Intermediate" Material category. It can be very difficult to assess whether a person submitting an image owns the copyright. Therefore, in the exemplary embodiment, QA reviewers will only exclude images at the behest of a particular copyright owner.

In the exemplary embodiment, Images of teenage or adult persons will not be accepted. Further, in the exemplary embodiment, only Images depicting babies or pre-teen children, pets and animals, business and charity logos or graphics, landscape and wildlife, and vehicles, will be considered as containing acceptable subject matter.

In the exemplary embodiment, a bad image will intentionally, periodically be entered into the general pre-print quality assurance queue (element 1103, FIG. 2B) for review by non-supervisory QA users. Results of QA processing of intentionally entered bad images will be monitored. For example, each vote by each non-supervisory QA user will be monitored. Executive or higher management would also monitor QA results of supervisory QA user review in the event that the intentionally entered bad image is not unanimously rejected by non-supervisory QA users. As a further example, it would be possible to intentionally, periodically, enter a bad image to the Malicious, Escalation, and Conflict QA queues (349-351, FIG. 30) for review by supervisory QA users; supervisory QA processing of such intentionally entered bad images would be monitored.

With reference to FIGS. 3A through 3C, if, in test function 260, the image(s) of an order does not pass quality assurance review, then in function 261, the entire order will be designated in the order database 50 as rejected and cancelled (see also, element 1106, Rejected Images, FIG. 2B); in function 262, an email message (see elements 1107, and 1010, in FIG. 2B) will be generated (an email to a user will be generated by the Account Server 1008, FIG. 2B) to the email address of the respective user that submitted the order. The email, to be received 140 by the user, will contain notification of the rejection of the image and of cancellation of the order. Once email notification has been sent, the rejection procedure will end 263.

In the exemplary embodiment, it is possible that a multi-image order could be partially rejected. For example, if one image of a plurality of images submitted for a single order was rejected in the QA process, the customer would be advised in an email message (an example email message generated by the system is depicted in FIGS. 27A and 27B) that the particular image was unacceptable and that the order was reduced according to the rejected image. As depicted in FIGS. 27A and 27B, the email is directed to the name 3600 of the customer; a ship date 3601, an order number 3602, and a shipping group number 3603 are reported; the image(s) that will be included in the order, and corresponding order detail 3604 are shown; and shipping information and billing information 3605 is reported. In a partial rejection, the rejected image is also reported 3606. Text 3607 explains Image Policies and Content Restrictions.

In the exemplary embodiment, if one image is rejected, e.g., for certain reasons, the customer would be advised in an email message that the particular image was unacceptable and that the order was reduced according to the rejected image, and would be warned that the provider reserves the right to charge a processing fee (such as, for example, $10) for each order for an image that violates Content Restrictions.

In the exemplary embodiment, if one image is rejected, e.g., for certain critical reasons, the customer would be advised in an email message that the particular image was unacceptable and that the order was reduced according to the rejected image, and would be warned that the provider reserves the right to charge a processing fee (such as, for example, $10) for each order for an image that violates Content Restrictions.

In the exemplary embodiment, if one image is rejected, e.g., for Malicious reasons, the customer would be advised in an email message that the particular image was unacceptable and that the order was reduced according to the rejected image, and that a processing fee (such as, for example, $10) for each order for an image that violates Content Restrictions has been charged; the order amount would reflect the addition of the processing fee for each rejected image.

In the exemplary embodiment, if all images in an order are rejected, the entire order is cancelled, and if appropriate, a processing fee is charged the customer for each rejected image in the cancelled order.

An SKU for a rejected image processing fee charge would be reported on the order to assess the processing fee.

Figure 26:
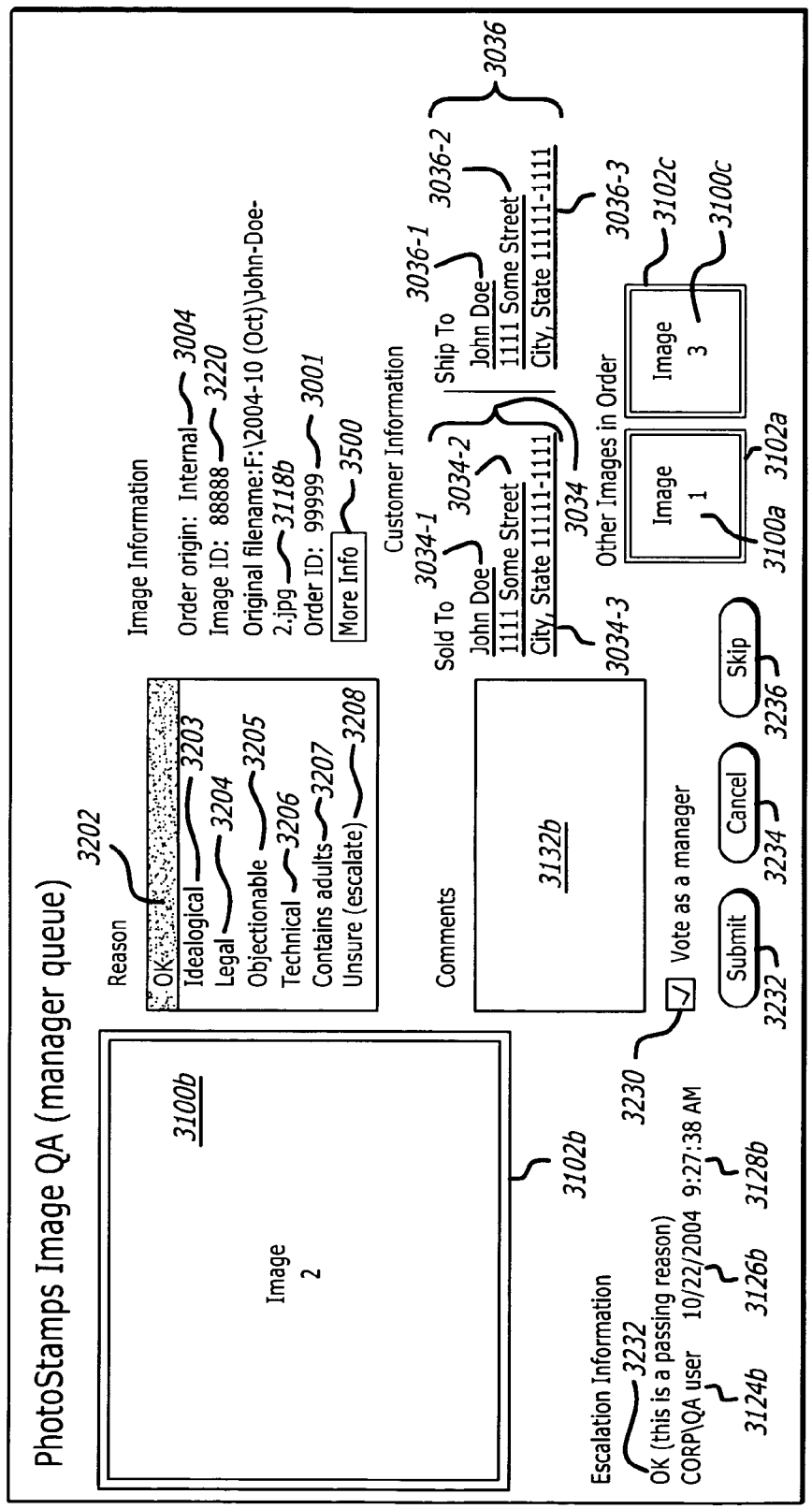
FIG. 26 is a graphic representation depicting a screen shot of a pre-print image quality assurance manager queue image reason screen in an alternative exemplary quality assurance processing embodiment of the present invention.

In the exemplary embodiment, either a non-supervisory QA user, or a supervisory QA user, will be authorized to send an email message to a customer that has submitted an image that violates, or potentially violates, Content Restrictions; the email message is generated by the system to ask the customer to provide certain information about the ordered image. In order to request that such an email message be generated, the QA user clicks the More Info button 3500 (FIG. 26). Clicking the More Info button will cause the system to request the QA user to indicate fields for which more information about the image is requested. For example, the QA user could request more information about the name or relationship of the image subject. As another example, the QA user could request an affirmative indication of copyright ownership by the customer of the image. In addition to requesting the additional information requested by the QA user, a More Info email message would further advise the customer of the Image Content Policies and Restrictions. When a More Info email message is sent, further processing of the image would be suspended until a response is received from the corresponding customer.

Once the corresponding customer responds, the information provided by the customer is recorded and is associated with the order. Both the More Info email and the customer's response will be viewable by QA users viewing the associated image and/or subsequent orders by the same customer. If later, the image should be identified as objectionable, the customer's additional information about the subject image would be available in the event that the customer is prosecuted in regard to the submission of the image.

Figure 22:
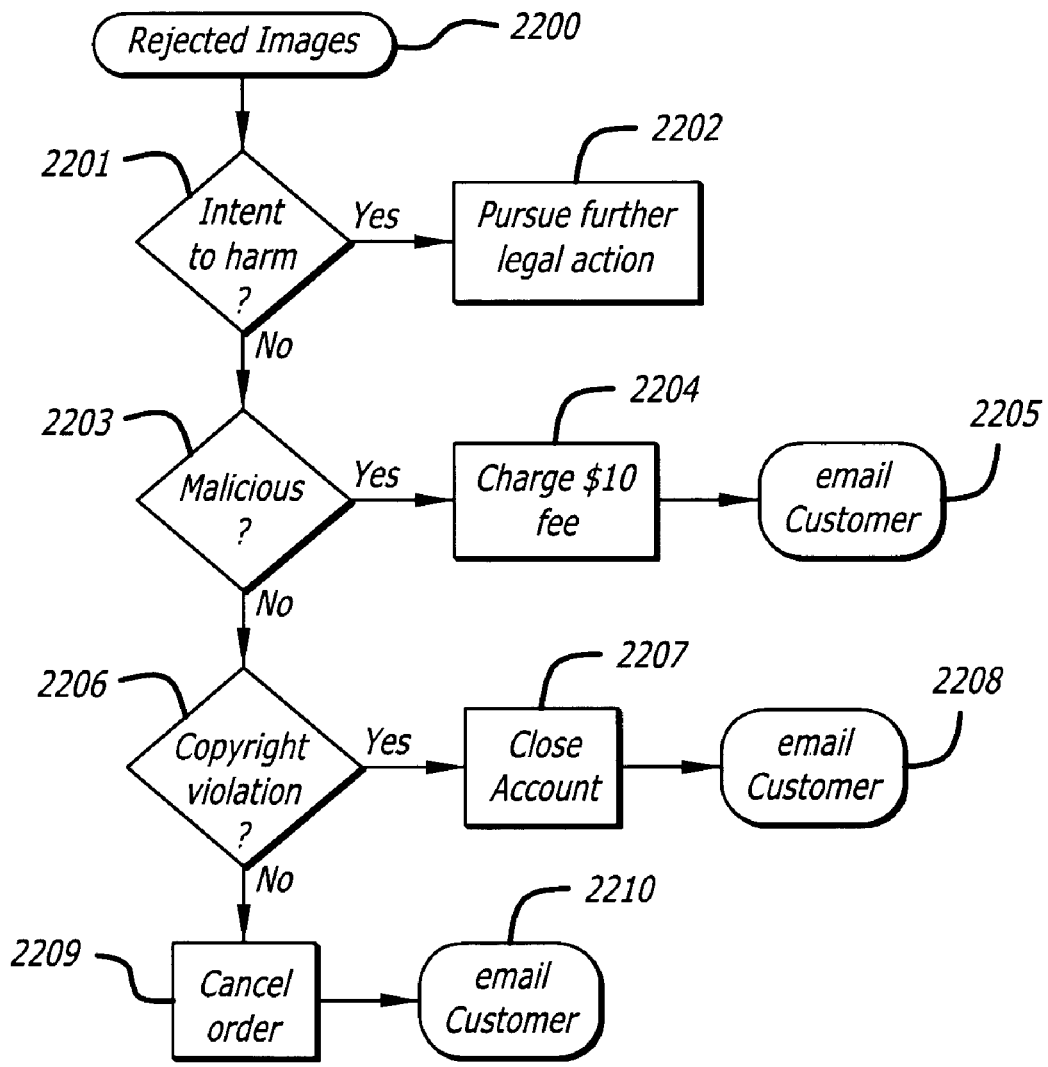
FIG. 22 is a high level flow diagram depicting high level logic functions for processing rejected images in an exemplary embodiment of the present invention.

FIG. 22 is a high level flow diagram depicting high level logic functions for processing rejected images in an exemplary embodiment of the present invention. As depicted in FIG. 22, a reason for rejecting a rejected image 2200, or alternatively, the rejected image 2200, would be tested 2201 to determine whether the image was submitted with an intent to harm. If the rejected image 2200 was submitted with an intent to harm, then legal action would be pursued 2202.

If no intent to harm was found, then the reason for rejecting the rejected image 2200, or alternatively, the rejected image 2200, would be tested 2203 to determine whether the image was Malicious. If the image was Malicious, then a processing fee, e.g., $10, would be charged 2204 to the customer's account, and an email notifying the customer of the charge would be generated and sent 2205.

If no intent to harm was found, and if the image was not Malicious, then the reason for rejecting the rejected image 2200, or alternatively, the rejected image 2200, would be tested 2206 to determine whether the image 2200 violates copyright policies. If the image violated copyright policies, then the customer's account would be closed 2207 and an email would be generated and sent 2208 to the customer reporting closing of the account.

If no intent to harm was found, and if the image was not Malicious and did not violate copyright policies, then the order (or that portion of the order relating to the rejected image 2200) would be cancelled 2209 and an email would be generated and sent 2210 to the customer reporting the cancellation.

In the exemplary embodiment, when an image is rejected, a rejection field associated with the image would be set to show that the image was rejected. Further, the rejected image would not be recorded in the customer's image library and would not be counted against the customers image allotment. The rejected image would be made available to the Negative Research Image database for potential matching with subsequently ordered images. The rejected image would also be made available to emails to the customer, such as rejection notifications; such emails could contain a link to the original image.

Returning with reference to FIGS. 3A through 3C, if, on the other hand, in test function 260, the image(s) pass quality assurance review, then, with reference to FIG. 2B, the approved image will be passed to the approved image processor 1110. With reference to FIG. 2B, the approved image processor 1110 will track all images for a particular order, and will detect when all images for a particular order have been inspected and approved by pre-print quality assurance. When all images for a particular order have been inspected and approved, the approved image processor 1110 will designate, e.g., via communications means 1111, on, e.g., the order database (element 50, FIGS. 3A through 3B), that the entire order has been inspected and approved by pre-print quality assurance.

With reference to FIGS. 3A through 3C, in function 270 (performed by the approved image processor 1110 depicted in FIG. 2B), when all images for an order have been approved, the order will be designated as approved on the order database 50 that will be used for order fulfillment.

It will be understood by someone with ordinary skill in the art that file and database architecture can be subject to many variations without departing from the spirit of the present invention. Accordingly, it will be understood by someone with ordinary skill in the art that description herein of information being saved to a particular file or database is exemplary, illustrative and non-limiting. Reference herein to any particular file or database will be understood to apply equally to any and all computer-readable media, whether now known or in the future discovered, including but not limited to: computer-readable storage media such as disk, CD, RAM and/or ROM memory of the particular computer that is performing the save or retrieve/read operation, or; RAM and/or ROM memory of any computer; or to a communication medium, whether now known or in the future discovered, such as, for example, a communication via an Internet communication, whether wireless, or otherwise. Further, the description herein of the exemplary embodiment "saving" information will be understood to apply equally to committing the information to storage or communication, including, for example, saving information to a file, a database, or any other type of representation of information, and/or communicating the information via, e.g., an Internet communication, whether wireless or otherwise.

It will be understood by someone with ordinary skill in the art that saving orders in the exemplary embodiment for fulfillment to an order database (element 50, FIGS. 3A through 3C) could facilitate batch processing. Batch processing, however, is not a limitation of the present invention. Rather, in the exemplary embodiment, orders on the order database 50 will be updated to reflect pre-print quality assurance approval or rejection of each order; fulfillment processing will constantly poll the order database 50 to detect approved orders not yet processed for fulfillment; in the exemplary embodiment, when an order is pulled for fulfillment processing, a status for the respective order will be updated to reflect that fulfillment processing is in-progress; once an order has been successfully printed and finally approved, packaged and shipped, the order status for the respective order in the order database 50 would be updated as complete.

The Bad Image Database (also referred to herein as the Negative Image Database), previously mentioned above will contain images, or links to images, that are considered to fail quality assurance standards. Herein, this particular database will be referred to as the Bad Image, or Negative Image, Database.

As previously mentioned above, before each user-ordered image is examined during pre-print quality assurance review, the Negative Image Database would be checked for the particular user-ordered image being reviewed. To determine whether or not a match exists between a particular user-ordered image and the images on the Negative Image Database, image search technology will be used. If a match is found between the user-ordered image being reviewed and an image on the Negative Image Database, the Quality Assurance user/reviewer would be alerted as was previously described above.

Incoming (customer-provided) images will be compared against the Negative Image Database. An MD5 hash of each image will be created and stored. The Negative Image Database search could be written in various different programming languages. In one embodiment, PERL™ programming language would be used; in another embodiment, C# .NET™ would be used. In the exemplary embodiment, the image list of the Negative Image Database will be updated once per week by means of performing a GOOGLE™ search.

One or more image recognition technologies will be used to perform the Negative Image Database search. One image recognition technology that could be used is referred to as Image Fingerprint technology. With an Image Fingerprint technology, an image contains attributes that can be asserted as a fingerprint. Manipulation of the image retains the fingerprint, so derivative images can be identified. Another image recognition technology that could be used is referred to as Image Inference technology. With an Image Inference technology, a base of images is retained; an image not contained in the base of images can be determined to be similar according to a means of biometric comparison.

In the exemplary embodiment, the Negative Image Database would be periodically updated. In the exemplary embodiment, the Negative Image Database update process would use a WINDOWS 32 spider service watching a certain database table (the QA Negative Research Image Database described further below) for new entries. In the exemplary embodiment, the WINDOWS 32 spider service would "wake up" every 10 minutes and would process up to twenty (20) new entries in the QA Negative Research Image Database (described further below). In the exemplary embodiment, the Spider Service would navigate to http://images.google.com with each new entry. The Spider Service would get the Image URLs and source page URLs corresponding to the new entry and would store the Image URLs and source page URLs in a Database table. Asynchronous requests would be issued to a list of links from the table. Responses would be processed by converting each of the response streams to an MD5 hash. The combined list of unique Image hashes (to eliminate duplicate images) would be stored in another Database table. The table of unique image hashes is the GOOGLE™ Image Hash Library, also referred to herein as the Negative Image Database, or alternatively, as the Bad Image Database, against which each incoming Image QA request will be checked.

Figure 16:
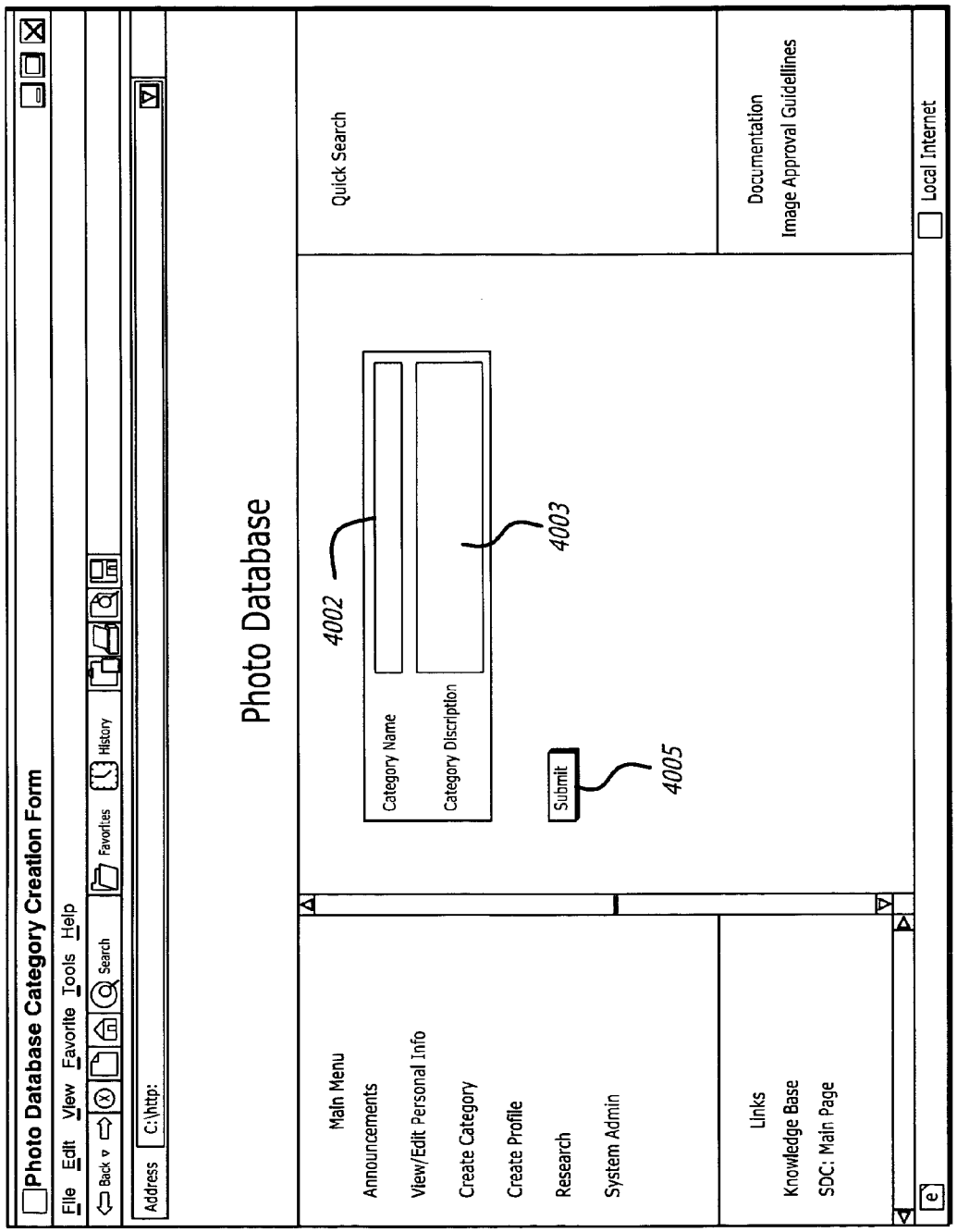
FIG. 16 is a graphic representation depicting an exemplary Photo Database Create Category screen in an exemplary embodiment of the present invention.

In addition to the Negative Image Database, QA users will build a QA Negative Research Image Database by entering information in Photo Database screens, exemplars of which are depicted in FIGS. 15, 16 and 17. When a QA user identifies an objectionable image provided by a customer, the QA user will create a negative research image profile in the Negative Research Image Database by using the Photo Database application described below with respect to FIGS. 15, 16, and 17. In the exemplary embodiment, new entries to the Negative Image Database could also be populated from the Negative Research Image Database by using an HTTP POST request to a web-service. The web-service would add the new entry to the Negative Image Database.

FIG. 15 is a graphic representation depicting an exemplary Photo Database main page screen in an exemplary embodiment of the present invention. As depicted in FIG. 15, a text welcome instruction 4000 advises the QA user to either enter a keyword search in the search field 4004, or select one of the knowledge base categories 4001 to find information about a particular category.

FIG. 16 is a graphic representation depicting an exemplary Photo Database Create Category screen in an exemplary embodiment of the present invention. As depicted in FIG. 16, a QA user would be able to create a new Photo Database category by entering a Category Name in the Category Name field 4002, entering a Category Description in the Category Description field 4003, and clicking the Submit button 4005.

FIG. 17 is a graphic representation depicting an exemplary Photo Database Create Profile Screen in an exemplary embodiment of the present invention. Using the Create Profile Screen, a QA user can create a profile for a negative image by entering a Name of the subject of the image; if a person is pictured in the image, the QA user would enter a first name 4006, a middle name 4007, and a last name 4008. The QA user would enter a description of the notoriety of the subject in the image in the Notoriety description field 4009. The QA user would enter (by selecting) a hair color in the hair color field 4010 and an eye color in the eye color field 4011. The QA user would be able to select an ethnicity in the ethnicity field 4012. The QA user would enter an approximate date of birth in the date of birth fields 4013. The QA user would select a Starting Category in the Starting Category field 4014.

As depicted in FIG. 17, the QA user would be able to invoke image recognition technology by clicking a first browse button 4025; the QA user would be able to browse images that are identified by image recognition technology and select a first similar photo in the first similar photo field 4015. The QA user would be able to invoke image recognition technology by clicking a second browse button 4026; the QA user would be able to browse images that are identified by image recognition technology and select a second similar photo in the second similar photo field 4016. The QA user would be able to invoke image recognition technology by clicking a third browse button 4027; the QA user would be able to browse images that are identified by image recognition technology and select a third similar photo in the third similar photo field 4017. The QA user would be able to invoke image recognition technology by clicking a fourth browse button 4028; the QA user would be able to browse images that are identified by image recognition technology and select a fourth similar photo in the fourth similar photo field 4018. The QA user would be able to invoke image recognition technology by clicking a fifth browse button 4029; the QA user would be able to browse images that are identified by image recognition technology and select a fifth similar photo in the fifth similar photo field 4019. The QA user could reset the screen by clicking the Reset button 4021, or if satisfied with the input, could submit the contents of the screen to establish a negative image profile by clicking the Submit button 4020.

As will be understood by someone with ordinary skill in the art, any of various ways could be used to alert a Quality Assurance user/reviewer that a match has been identified between a user-ordered image being reviewed and an image on the Bad Image Database. For example, each user-ordered image (e.g., element 3100*a*, FIG. 24) being reviewed could be graphically presented, such as depicted (and described further below) with respect to FIGS. 24-26, in a graphic frame (e.g., element 3102*a*, FIG. 24). When no match has been identified between a user-ordered image being reviewed and an image on the Bad Image Database, the graphic frame could be white; when a match has been identified between a user-ordered image being reviewed and an image on the Bad Image Database, the graphic frame could be a bright color, such as, for example, red, and/or the graphic frame could, for example, be presented as flashing (e.g., on and off).

FIG. 23 is a graphic representation depicting a screen shot of a portion of an alternative exemplary pre-print image quality assurance ("QA") order status screen in an alternative exemplary quality assurance processing embodiment of the present invention. As depicted in FIG. 23, entry (by pressing a Submit button 3002) of an Order ID (element 3000, FIG. 23) would cause display of a set of information about that particular Order. The information displayed would include, for example: an Order ID (an identifier that uniquely (at least for some period of time) corresponds to the particular order) 3001; an Origin identifier (i.e., an identifier that categorizes the relationship of the user that placed the order with respect to the customized stamp provider organization, e.g., "Internal" would identify that the user placing the Order worked for the customized stamp provider) 3004; a Customer ID (an identifier that uniquely corresponds to the particular user/customer that placed the order) 3006; an Ordered At date 3008; a Payment Method (an indicator of a payment method used by the user to pay for the order, e.g., a credit or debit card identifier such as "Visa", etc.) 3010; a tax amount 3012; an amount for shipping the order 3014; a Total amount 3016; an Image QA status (that would, e.g., describe or denote the status of the order with respect to quality assurance processing, such as, for example, "Pending", "Complete", etc.) 3020; a PDF generation status (that would, e.g., describe or denote the status of the order with respect to generation of an image file) 3022; a download status (that would, e.g., describe or denote the order with respect to being downloaded for printing/fulfillment) 3024; a post-print QA status (that would, e.g., describe or denote the status of the order with respect to quality assurance inspection of the printed order) 3026; a download batch status (that would, e.g., describe or denote the status of the order with respect to a batch download for printing, if batch processing were used) 3028; a PDF priority (that would, e.g., describe or denote priority of the order for PDF generation) 3030; a Hold status (that would, e.g., describe or denote whether or not the order was on Hold) 3032; Sold To information (including, e.g., the name, address and telephone number of the user that paid for the order) 3034; and Ship To information (including, e.g., the name and address of the person or entity to whom/to which the order would be shipped) 3036. The Order Status screen display in this alternative exemplary embodiment would display on-screen status change buttons to allow the QA user to select order status information by date 3040, by change type 3042, for an old status 3044, or for a new status 3046.

The Customer ID 3006 displayed on the alternative exemplary pre-print image quality order status screen (FIG. 23) would be a link field—that is, the QA user could click on the Customer ID 3006 to navigate to a pre-print image quality assurance customer detail screen (see, e.g., FIG. 28) that will be described in more detail below.

Following the information described above with respect to FIG. 23, information about each line item in the respective order would be displayed. For example, FIG. 24 is a graphic representation depicting a screen shot of a pre-print image quality assurance order line item portion for a first line item of a multi-line item order on an alternative exemplary pre-print image quality assurance order status screen in an alternative exemplary embodiment of the present invention; FIG. 25 is a graphic representation depicting a screen shot of a pre-print image quality assurance order line item portion for a second and third line item of a multi-line item order on an alternative exemplary pre-print image quality assurance order status screen in an alternative exemplary embodiment of the present invention.

For each line item in an order, a line item number, e.g., 3101*a* (FIG. 24), 3101*b* and 3101*c* (FIG. 25), identifying the particular line item with respect to the particular order, would be displayed. For each line item in an order, an image, e.g., 3100*a* (FIG. 24), 3100*b* and 3100*c* (FIG. 25), corresponding to an image provided by the user that submitted the order, would be displayed. For each line item in an order, the image, e.g., 3100*a* (FIG. 24), 3100*b* and 3100*c* (FIG. 25), corresponding to the line item, would be presented with a respective graphical frame, e.g., 3102*a* (FIG. 24), 3102*b* and 3102*c* (FIG. 25).

For each line item in an order, a description, e.g., 3104*a* (FIG. 24), 3104*b* and 3104*c* (FIG. 25) describing the postage ordered in the respective line item, would be displayed. For each line item in an order, a Design ID, e.g., 3106*a* (FIG. 24), 3106*b* and 3106*c* (FIG. 25), identifying a particular design, e.g., of a template of blank customized postage labels, would be displayed. For example, a first particular Design ID could be assigned to a first sheet template of customized postage labels, wherein each label on such a first sheet template would have a first set of dimensions and each sheet of labels with the first particular Design ID would have a first number of labels, in a first arrangement of those labels, on the sheet; a second particular Design ID could be assigned to a second sheet template of customized postage labels, wherein each label on such a second sheet template would have a second set of dimensions and each sheet of labels with the second particular Design ID would have a second number of labels, in a second arrangement of those labels, on the sheet.

For each line item in an order, a value (e.g., in cents), e.g., 3108*a* (FIG. 24), 3108*b* and 3108*c* (FIG. 25), for each postage-indicia-bearing customized postage item to be printed on a sheet, would be displayed. For each line item in an order, a quantity (e.g., of the number of sheets), e.g., 3110*a* (FIG. 24), 3110*b* and 3110*c* (FIG. 25), describing the quantity ordered for the particular line item, would be displayed. For each line item in an order, a Unit Price, e.g., 3112*a* (FIG. 24), 3112*b* and 3112*c* (FIG. 25), corresponding to the total price for, e.g., each sheet ordered in the particular line item, would be displayed. For each line item in an order, a Line Item Total price, e.g., 3114*a* (FIG. 24), 3114*b* and 3114*c* (FIG. 25), describing the total price for all units ordered for the particular line item, would be displayed. For each line item in an order, an Image QA Status, e.g., 3116*a* (FIG. 24), 3116*b* and 3116*c* (FIG. 25) describing the status of QA review for the particular image (3100*a* (FIG. 24), 3100*b* and 3100*c* (FIG. 25)) corresponding to the particular line item, would be displayed.

For each line item in an order, an Original image filename, e.g., 3118*a* (FIG. 24), 3118*b* and 3118*c* (FIG. 25), identifying a name of a file in which the particular image (e.g., 3100*a* (FIG. 24), 3100*b* and 3100*c* (FIG. 25)) corresponding to the particular line item, would be displayed. For each line item in an order, a Border Color, e.g., 3119*a* (FIG. 24), 3119*b* and 3119*c* (FIG. 25), as selected by the ordering user, would be displayed.

For each line item in an order, any Image QA (QA1) votes 3150*a* (FIG. 24; elements 3150*b* and 3150*c* in FIG. 25) (e.g., 3120*a*-3132*a* (FIG. 24), 3120*b*-3132*b* and 3120*c*-3132*c* (FIG. 25)), that had been provided by any pre-print QA user (or supervisor) regarding the particular image (e.g., 3100*a* (FIG. 24), 3100*b* and 3100*c* (FIG. 25)) corresponding to the particular line item, would be displayed.

QA1 is sometimes used herein to refer to pre-print quality assurance/review. QA2 is sometimes used herein to refer to post-print quality assurance review.

The description below of the content (e.g., 3120*a*-3132*a* (FIG. 24), 3120*b*-3132*b* and 3120*c*-3132*c* (FIG. 25)), of pre-print Image QA (QA1) votes 3150*a* (FIG. 24; elements 3150*b* and 3150*c* in FIG. 25) would apply similarly to content of post-print QA (QA2) votes 3151*a* (FIG. 24; elements 3151*b* and 3151*c* in FIG. 25), in the event that any post-print votes had been entered. In FIG. 24, None 3134*a*, (and in FIG. 25, None 3134*b* and None 3134*c*) indicates that no post-print quality assurance/review votes have yet been entered for the order.

Each exemplary display of an Image QA (QA1) vote would comprise, e.g., a vote reason description (e.g., 3120*a* (FIG. 24), 3120*b* and 3120*c* (FIG. 25)), corresponding to a result of a particular QA user's review of the particular image (e.g., 3100*a* (FIG. 24), 3100*b* and 3100*c* (FIG. 25)). Each exemplary display of an Image QA vote would further comprise, e.g., an indicator (e.g., 3122*a* (FIG. 24), 3122*b* and 3122*c* (FIG. 25)) as to whether or not the QA user that submitted the particular vote is a manager or not (e.g., 1—Yes; 0—No). Each exemplary display of an Image QA vote would further comprise, e.g., a QA User identifier (e.g., 3124*a* (FIG. 24), 3124*b* and 3124*c* (FIG. 25)) identifying the QA user that submitted the particular vote. Each exemplary display of an Image QA vote would further comprise, e.g., a Date and Time (e.g., 3126a-3128a (FIG. 24), 3126b-3128b and 3126c-3128c (FIG. 25)) identifying the date and time that the QA user submitted the particular vote. Each exemplary display of an Image QA vote would further comprise, e.g., a Comment section (e.g., 3130a (FIG. 24), 3130b and 3130c (FIG. 25)) displaying any comments input by the QA user that submitted the particular vote. Each exemplary display of an Image QA vote would further comprise, e.g., a Delete Vote option (e.g., 3132a (FIG. 24), 3132b and 3132c (FIG. 25)) that, if clicked by an authorized QA user, (such as a supervisory QA user), would cause the particular vote to be deleted.

For an order to pass QA review, each image in the order must pass QA review. For an image to pass QA review, it must be reviewed by a QA user, or as mentioned above, depending on the embodiment, possibly by multiple QA users, and receive a passing vote from each QA user. If an image received a failing vote from one or more QA users, the failing vote could, as previously mentioned above, be overridden by a QA supervisory user. For example, a QA supervisory user could choose the Delete Vote option (e.g., element 3132b, FIG. 25) to delete a particular vote.

In order to review a particular image, a QA user accessing an Order Status screen, as depicted e.g., in FIGS. 23-25, would click on the particular image, e.g., Image 2 (element 3100b, FIG. 25). Clicking on, e.g., Image 2 (element 3100b) in FIG. 25, would cause display of a pre-print image quality assurance manager queue image reason screen as depicted in FIG. 26.

As depicted in FIG. 26, the particular image being reviewed, in the case depicted, Image 2, element 3100b, is displayed in a graphic frame 3102b. At least one QA review Reason, e.g., OK 3202, Ideological 3203, Legal 3204, Objectionable 3205, Technical 3206, Contains adult [material] 3207, Unsure (escalate) 3208 would be displayed. A QA user would highlight one of the Reasons to submit a vote. Highlighting the OK reason 3202 would pass the image 3100b. Highlighting any of reasons 3203-3207, would cause the image, e.g., image 3100b, to fail QA review. Highlighting reason 3208 would cause the image being reviewed, e.g., image 3100b, to be queued for management review. Highlighting any of reasons 3202-3208, and then clicking on the Submit button 3232, would cause the particular QA reason highlighted to be displayed as a vote reason description, e.g., 3120b; would cause the particular QA user's identifier, e.g., 3124b, to be displayed in a field associated with the particular QA reason selected (e.g., 3120b); and would cause a date (e.g., 3126b) and time (e.g., 3128b) that the vote was submitted, to be displayed. Before clicking the Submit button 3232, the QA user could enter comments, e.g., 3132b. Before clicking the Submit button 3232, the QA user could check the "Vote as a manager" field 3230. During the QA user's review of the image being reviewed, e.g., Image 2 (element 3100b), any other images (e.g., Image 1 (element 3100a), and Image 3 (element 3100c)) and the respective graphical frames (e.g., 3102a and 3102c) in the particular Order (3001) would be displayed. A QA user would be able to cancel the vote by clicking on the Cancel button 3234 or could skip voting on the particular image being reviewed by clicking the Skip button 3236.

As depicted in FIG. 26, the exemplary pre-print image quality assurance manager queue image reason screen would display the Order origin identifier 3004, an Image ID 3220, the original filename, e.g., 3118b, and an Order ID 3001, corresponding to the order, corresponding to the particular image, e.g., 3100b, being reviewed.

The exemplary pre-print image quality assurance manager queue image reason screen depicted in FIG. 26 would provide Sold to information 3034 and Ship to information 3036. The exemplary pre-print image quality assurance manager queue image reason screen depicted in FIG. 26 would provide a linked field displaying the name 3034-1 of the purchasing user. Clicking on the purchasing user name 3034-1 would cause the system to navigate to a search engine, such as, for example, GOOGLE™, and search for information regarding the particular name. A search for information regarding the purchasing user name 3034-1 would be provided to allow a QA user to investigate any news regarding that particular user that might be relevant to QA review.

The exemplary pre-print image quality assurance manager queue image reason screen depicted in FIG. 26 would similarly provide a linked field displaying the purchaser's address 3034-2 and city/state/zip code 3034-3 of the purchasing user. Clicking on the purchaser's address 3034-2 or city/state/zip code 3034-3 would cause the system to navigate to a search engine, such as, for example, GOOGLE™, and search for information regarding the purchaser's address 3034-2 or city/state/zip code 3034-3. A search for information regarding the purchasers address 3034-2 and/or city/state/zip code 3034-3 would be provided to allow a QA user to investigate any news regarding that particular address 3034-2 and/or city/state/zip code 3034-3 that might be relevant to QA review.

The exemplary pre-print image quality assurance manager queue image reason screen depicted in FIG. 26 would provide a linked field displaying the name 3036-1 of the party to whom the order would be shipped. Clicking on the Ship To name 3036-1 would cause the system to navigate to a search engine, such as, for example, GOOGLE™, and to search for information related to the particular name. A search for information related to the Ship To name 3036-1 would be provided to allow a QA user to investigate any news regarding that particular Ship To name that might be relevant to QA review.

The exemplary pre-print image quality assurance manager queue image reason screen depicted in FIG. 26 would similarly provide a linked field displaying the ship to address 3036-2 and city/state/zip code 3036-3. Clicking on the ship to address 3036-2 or city/state/zip code 3036-3 would cause the system to navigate to a search engine, such as, for example, GOOGLE™, and to search for information related to the Ship to address 3036-2 or city/state/zip code 3036-3. A search for information related to the Ship to address 3036-2 and/or city/state/zip code 3036-3 would be provided to allow a QA user to investigate any news regarding that particular address 3036-2 and/or city/state/zip code 3036-3 that might be relevant to QA review.

As previously mentioned above, a QA user could obtain detailed customer information about a particular customer, e.g., customer 3006, by clicking on the Customer ID 3006 field depicted in FIG. 23 to navigate to a pre-print image quality assurance customer detail screen (such as is depicted, e.g., in FIG. 28).

With reference to FIG. 28, a pre-print image quality assurance customer detail screen would display a Customer ID 3006 corresponding to the particular customer user. In addition, an email address 3401, a first name 3402, a last name 3403, an "opt-out" field 3404, and a status field 3405 would be displayed. A number of orders found 3408 would be displayed. Each order, e.g., 3001, submitted by the particular customer ID (3006) would be reported. For each order, e.g., 3001, reported, a date 3410 and time 3412 corresponding to the date and time that the order was submitted would be displayed. Emails sent to the particular user corresponding to the Customer ID 3006 would be displayed; each email would be reported with a date 3416 and time 3417 that the email was sent, and would report a brief subject description 3418 that would include an identifier of the corresponding order 3001.

Continuing with reference to FIG. 28, the QA user reviewing the pre-print image quality assurance customer detail screen would be able to click on an email listed, e.g., by clicking on the subject description 3418, in order to navigate to a display of text that was contained in the relevant email.

Continuing with reference to FIG. 28, information including, e.g., a Call Date 3420, a Representative's Name 3422, a Disposition 3424, and Notes 3426 would be presented for each call, in the event that any calls had been, by a representative of provider of the customized postage to the respective customer. A provider representative would also be able to input a Call History line item, e.g., 3431, via the Customer Detail screen depicted in FIG. 28, e.g., by clicking on the Enter a disposition link 3430.

FIG. 29 is a graphic representation depicting an electronic mail ("email") message, in an alternative exemplary quality assurance processing embodiment of the present invention, to a user (email address 3401, corresponding to a particular user with a particular customer ID 3006, as was displayed in FIG. 28), notifying the user that one or more images in the user's order were rejected due to quality assurance reasons. As depicted in FIG. 29, a QA fail email would be addressed to a particular user's corresponding email address 3401, and would address the user by the user's first name 3402.

Returning with reference to FIG. 28, a QA user viewing a pre-print image quality assurance customer detail screen would be able to click on an order ID 3001, in either the Found Order list 3409, or in the emails sent list 3415; doing so would allow the QA user to navigate to the pre-print image quality assurance order status screen such as depicted in FIGS. 23-25 corresponding to the order ID 3001.

In the exemplary embodiment, a source of images could be designated as a trusted source. One significance of a source of images being designated as a trusted source will be that images ordered by a trusted source will be indicated to quality assurance users as images from a trusted sources.

In the exemplary embodiment, an XML interface will be provided to certain entities and/or persons pre-qualified as trusted sources. The main elements of the trusted source XML interface will be: 1) an Images element that will contain all the images for a particular order; 2) a URL element that will contain either a path to an image, or an identification of an image on a medium accessible by the system; 3) an Order-Session element that contains a SessionID, which is used to group orders together for a particular order; and 4) an Order element that contains the Trusted Source's order ID as well as the shipping address, the shipping method, and the order lines for the order. Each OrderLine element provides line item specifics for the ordered product, a ProductID, and an ImageID which is a link to the image listed in the Images element.

In the exemplary embodiment, trusted sources are given access to a secure website for the XML interface. The overall construction of an exemplary trusted source XML request would be as follows:

```
<PhotoStampsIFaceRequest>
    <SessionId>172.16.11.110.1111451231.8713.0.01:
        JW0ecjlQ7a2JFBZS/3Wtss3PGEI</SessionId>
    <Action type="ActionType">
    . . .
    </Action>
    <Action type="ActionType">
    . . .
    </Action>
    <Action type="ActionType">
    . . .
    </Action>
</PhotoStampsIFaceRequest>
```

The exemplary embodiment would provide a number of different Action Types. In the exemplary embodiment, many Action Types could be used multiple times during a single session. For example, during a single session, Actions of Action Type "AddCartItem" could be used multiple times during a single session to add multiple items to the session cart. However, an Action of Action Type "Login" could only be used once during a given session. In the exemplary embodiment, a SessionID is optional for a first request—if a SessionID is not provided, the system will generate one; once a SessionID is returned, it should be used in all requests from that point on until the end of the given user session.

In the exemplary embodiment, each response by the systen to an XML submitter would be provided in a form such as:

```
<PhotoStampsIFaceResponse>
    <SessionId>172.16.11.110.1111451231.8713.0.01:
        JW0ecjlQ7a2JFBZS/3Wtss3PGEI</SessionId>
    <Action type="ActionType">
        <Result>Success</Result>
    </Action>
    <Action type="ActionType">
        <Id>1</Id>
        <Result>Success</Result>
    </Action>
    <Action type="ActionType">
        <Id>2</Id>
        <Result>Failure</Success>
    </Action>
</PhotoStampsIFaceResponse>
```

In the exemplary embodiment, an action ID could be used for an Action that can be used multiple times during a single session. For Example, in the case of Action Type AddCartItem, a distinct action ID could be used with each AddCartItem action during a given session. In the exemplary embodiment, using a distinct action ID for each action would have no effect on the final system—that is, each AddCartItem could designate an action ID of 1, and the system would not process the action differently than if each AddCartItem had a distinct action ID. However, assigning a distinct action ID to each action would allow a client to keep track of which actions failed and which succeeded. A current SessionID, either the one originally passed by the client or one assigned by the system, would be passed back with every response, and would also be included in the headers as a Set-Cookie for the cookie "sid".

If an error is detected, a response would be returned to the client/user in a manner such as:

```
<PhotoStampsIFaceResponse>
    <SessionId>172.16.11.110.1111451231.8713.0.01:
        JW0ecjlQ7a2JFBZS/3Wtss3PGEI</SessionId>
    <Error>500</Error>
    <Description>The error message would be located right
        here.</Description>
</PhotoStampsIFaceResponse>
```

The following Actions Types would be provided:

Login: The Login Action Type would be used once during a given session to login to the session and would be entered in the following manner:

```
<Action type="Login">
    <Username>username</Username>
    <Password>password</Password>
</Action>
```
A successful response would mean that the corresponding user/client is logged in under the session referred to by the current Session ID. Both the Username and the Password fields would be required.

AddImageToEditQueue: The AddImageToEditQueue Action Type would be used to add an image to the queue and would be entered in the following manner:
```
<Action type="AddImageToEditQueue">
    <Id>1</Id>
    <ImageFilename>a07325bc5dd41a224a1edf9c57d6ef
        14</ImageFilename>
    <Postage>37</Postage>
    <Color>000000</Color>
    <Scale>100</Scale>
    <Rotation>0</Rotation>
    <OffsetX>0</OffsetX>
    <OffsetY>0</OffsetY>
    <VerticalFlip>false</VerticalFlip>
    <HorizontalFlip>false</HorizontalFlip>
</Action>
```
In the exemplary embodiment, only the Id and ImageFilename fields would be required; all the other fields would be optional; values for the other fields shown in the example above would be default values.

The above-provided example of the AddImageToEditQueue Action Type would result in a centered image that would not have been rotated or flipped in any way; the postage indicia would have a 37 cent postage value; the postage image would have a black border. Changes to the various parameter fields mentioned in the above-provided example of the AddImageToEditQueue Action Type would result in changing the way the image is initially presented to the system editor. For example, the value set for the scale parameter could be changed so that the image will be zoomed in or out as soon as the page loads.

The parameter fields for the AddImageToEditQueue Action Type in the exemplary embodiment would be:

Postage: This parameter would be the value of the stamp in cents. 37 cents would be the default. The valid values would be: 23, 37, 49, 60, 83, 106, 385.

Color: This parameter would be a hex RGB value representing the border of the image on the stamp.

Scale: This parameter would represent percentage zoom. 100 would be the normal size. Numbers lower than 100 zoom out; numbers larger than 100 numbers zoom in.

Rotation: This parameter would represent clockwise rotation in degrees.

OffsetX: This parameter would represent the number of pixels to move the image side to side. A negative value for this parameter would move the image left; a positive value for this parameter would move the image right.

OffsetY: This parameter would represent the number of pixels to move the image up or down. A negative value for this parameter would move the image down; a positive value for this parameter would move the image up.

VerticalFlip: This parameter would represent the vertical flip of the image. A "true" value would cause the image to be vertically flipped; a "false" value would cause the image to remain vertically stable; the only valid values for this parameter would be "true" and "false".

HorizontalFlip: This parameter would represent the horizontal flip of the image. A "true" value would cause the image to be horizontally flipped; a "false" value would cause the image to remain horizontally stable; the only valid values for this parameter would be "true" and "false".

Once an image is detected by the system with a successful AddImageToEditQueue entry, the image would be added to the image editing queue on the system website. The client user would then be able to access the /editimages/ portion of the system website to edit the images. Each such successfully added image would be viewable in sequence; once the client/user has completed editing the image, the final image would be added to the cart in its final edited form.

AddCartItem: The AddCartItem Action Type would be used to add an image to the client/user's cart and would be entered in the following manner:
```
<Action type="AddCartItem">
    <Id>1</Id>
    <ImageFilename>a07325bc5dd41a224a1edf9c57d6ef
        14</ImageFilename>
    <Postage>37</Postage>
    <Color>000000</Color>
    <Scale>100</Scale>
    <Rotation>0</Rotation>
    <OffsetX>0</OffsetX>
    <OffsetY>0</OffsetY>
    <VerticalFlip>false</VerticalFlip>
    <HorizontalFlip>false</HorizontalFlip>
    <Quantity>1</Quantity>
</Action>
```
Many of the parameters (including the required and optional list) for the AddCartItem Action Type are the same parameters as were described above for the AddImageToEditQueue Action Type. The difference is that, on successful acceptance of this Action Type, the item designated would be added to the cart; the website editor would be bypassed. The Quantity parameter, however, is new and specific to the AddCartItem Action Type. The default value of the Quantity parameter is 1. The Quantity parameter would set the number of sheets of the ordered image that should be added to the cart.

In order to pass control to the web browser, the client would need to start a browser and point it to a particular website that would be specified to the client user. The client would need to provide the Session ID set earlier in a session_id parameter of a query string, and plug a url into a url part of the query string. The user would then be attached to the given session identified by the Session ID and would be redirected to the url provided. If no url was provided, the user would be be sent to the cart page. To send a user into the image editing queue, a different URL would be used; the session ID specified should match the session ID that was assigned during the XML conversation.

In the exemplary embodiment, each customer account will provide a field, or alternatively, a set of fields, that will describe a profile of the corresponding customer (a customer image profile). The system would be used by system personnel to populate the profile field(s). For example, a particular customer account could be set to indicate that the customer has been pre-qualified as a trusted source. As compared to a trusted source, if a customer has submitted an image that has been rejected by quality assurance, the customer image profile corresponding to the customer could be designated as a watch. If a customer has submitted more than one image that has been rejected by quality assurance, the customer image profile corresponding to the customer could be designated as suspended or scrutinize.

Returning with reference to the exemplary embodiment, and with reference to FIGS. 3A through 3C, the order database 50 will be processed periodically, for example, at a certain time, or certain times, each day. In alternative embodiments, other types of order fulfillment approaches could be used.

With reference to FIGS. 3A through 3C, processing pre-print quality-assurance-passed orders on the order database 50 will begin as depicted in function 280 by creating an image of a sheet of each customized postage label ordered by the respective user. Creating an image of a sheet of a particular customized postage label as depicted in function 280 will involve generating machine-readable postage indicia for each postage label on a sheet and then injecting the respective machine-readable postage indicia into each individual customized postage label image on the sheet. In the exemplary embodiment, images of sheets of postage labels are created in PDF format.

In the exemplary embodiment, customized postage label features associated with an order are represented in PDF format.

It will be understood by someone with ordinary skill in the art that reference herein to a server, such as a reference to the image generation server, or to a function [of a server], performing a particular action will be understood to mean that software executing on that server, such as software executing on the image generation server, performs the particular action.

Continuing with reference to function 280 in FIGS. 3A through 3B, as the image generation server (element 1202, depicted in FIG. 2B) assembles an image of a sheet of a particular customized postage label, the image generation server (element 1202, depicted in FIG. 2B) would generate an Order ID (identification) number that uniquely identifies each sheet of postage labels and correlates to the Order number.

The image generation server (element 1202, depicted in FIG. 2B) would generate an Order ID number by using the Order number associated with the order, an actual image number within an order (1 for the first image in an order; 2 for the second image in an order; etc.), a relative sheet number (0 for the first sheet; 1 for the second sheet, 2 for the third sheet, etc.) within a quantity of sheets ordered for a particular image, an actual sheet number within a total number of sheets for the particular order, and the total number of sheets for the particular order. For example, in an order assigned order number "XXX" in which the user ordered a quantity of two (2) for image A and a quantity of three (3) for image B, the order ID number for the first sheet of customized Image A postage labels would be assigned as XXX-1-0; 1 of 5 (order number XXX; 1 for the first image; 0 for the first relative sheet of 2 sheets of image A; sheet 1 of 5 total sheets of customized postage labels). The second sheet of customized Image A postage labels would be assigned as XXX-1-1; 2 of 5 (order number XXX; 1 for the first image; 1 for the second relative sheet of 2 sheets of image A; sheet 2 of 5 total sheets of customized postage labels). The first sheet of customized Image B postage labels would be assigned as XXX-2-0; 3 of 5 (order number XXX; 2 for the second image; 0 for the first relative sheet of 3 sheets of image B; sheet 3 of 5 total sheets of customized postage labels. Similarly, the second and third sheets of customized Image B postage labels would be assigned as XXX-2-1; 4 of 5, and XXX-2-2; 5 of 5, respectively.

As will be described further below, this Order ID number will be printed, both in human readable text and as a scannable barcode (a machine readable representation of the Order ID number), on the corresponding sheet of printed customized postage labels. The printing of the Order ID number on each sheet of printed customized postage labels will facilitate bundling of all printed sheets for an order for final shipment to the recipient designated by the user.

With reference to FIG. 2B, residing on the image server is a barcode module 1210. With reference to image generation server function 300 in FIG. 14A, once an Order ID number has been generated by the customized postage label image generation server 1202 (also sometimes referred to herein as simply, the "image generation server 1202" or as "image server 1202"), the barcode module would be called to generate a machine-readable representation, such as a barcode, to represent the respective Order ID number. Both the Order ID number and the corresponding machine-readable representation of the Order ID number, such as a barcode, would be injected into the PDF-formatted representation of the corresponding sheet of customized postage labels. When all of the sheets for an order have been assembled, each PDF-formatted sheet representation would then be saved as a PDF-formatted representation of a sheet of customized postage labels on a computer-readable storage medium, such as e.g., an order image database.

It will be understood by someone with ordinary skill in the art that reference herein to a file or a database is non-limiting and is an exemplary description of a computer-readable storage medium.

Returning with reference to FIGS. 3A through 3C, the images of sheets of customized postage 60 that would be created in function 280 and saved/stored in 8 encrypted form will be periodically downloaded as depicted in function 285.

In the exemplary embodiment, the download (depicted in FIG. 2B as element 1303 as protected under HTTPS) will take place at the printer's location.

The exemplary embodiment will provide a download utility with which to download the images of sheets of customized postage 60 (FIGS. 3A through 3C); the download utility will provide a download utility user interface. The exemplary download utility will be a .NET Windows Forms control hosted in Internet Explorer.

With reference to FIG. 2B, the generic Internet postage server 1203 will communicate, via, e.g., communication means 1206, to the Account Server 1008, each postage amount corresponding to each respective, generic Internet postage indicia data generated and the corresponding customer information associated with the each respective, generic Internet postage indicia data generated.

With reference to FIG. 2B, the exemplary embodiment will provide a Print Delivery Application 1302. In the exemplary embodiment, a dedicated computer, such as, for example, a laptop, would host the Print Delivery Application 1302. The Print Delivery Application 1302 will provide the download utility user interface previously described above with which post-print QA users would download encrypted PDF files of exemplary customized postage sheets from a queue 1303 over an HTTPS connection. In the exemplary embodiment, security within this download utility user interface will require Windows authentication paired with a pass code to the private key. The download utility user interface will act as a conduit to accept files from queue 1303 or optionally allow a user to specify files in a comma-delimited manner. The user will be able to control the location to which these files will be saved. In the exemplary embodiment, end-of-day procedures will include deletion of all working PDF files on the laptop and on the printer.

In the exemplary embodiment, a secure server would be used, or alternatively, dedicated for use, as a Raster Image Processor to improve efficiency in the printing process. Raster Image Processing is a process and means of turning vector digital information, such as a PostScript file, into a high-resolution raster image. That is, Raster Image Processing takes digital information about fonts and graphics that describes the appearance of an image and translates that digital information into an image composed of individual dots that the imaging device (such as a desktop printer or an imagesetter) can output. That is, Raster Image Processing is a translator for a printer or imagesetter. Instructions would be provided to a Raster Image Processing (RIP) in the language of a desktop publishing application and the RIP translates the instructions into the language of the target printer or imagesetter. If the desktop publishing application language is too complicated for the RIP translator or if the RIP misunderstands the instructions, the terminology is that the file does not RIP. The RIP offers additional features and functions not found in standard printer drivers.

Figure 20:
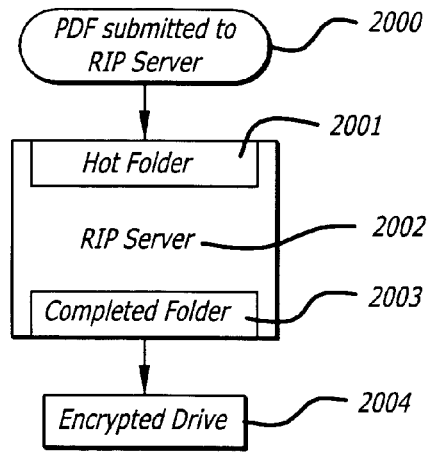
FIG. 20 is a high level flow diagram depicting high level logic functions for processing images to be printed using an exemplary Raster Image Processor server in an exemplary embodiment of the present invention.

In the exemplary embodiment, as depicted in FIG. 20, a PDF file 2000 would be sent to a hot folder 2001 that would be accessible by the RIP Server 2002. The RIP Server 2002 would access the PDF in the hot folder 2001 and would process the PDF file. The RIP'd file would be sent to a completed folder 2003. In the exemplary embodiment, the RIP'd file would be sent to either: a temporary network file system where it could be stored temporarily, or an encrypted drive for direct delivery to a printer. If the file is sent to a network file system, the file(s) would be queued until an encrypted drive 2004 is mounted, at which time the file(s) would be transferred to the encrypted drive 2004 for delivery to the printer. Files on the network file system would be deleted upon successful transfer to the encrypted drive 2004.

The encrypted drive 2004 would be placed in a safe. Data saved on the encrypted drive 2004 would be encrypted using an encryption software, such as, for example, BEST-CRYPT™ software. Files on the encrypted drive would be periodically printed.

The downloaded customized postage PDF file will be loaded onto the printing device by the printing supervisor, or by the download user, or by some other employee of the Internet Postage provider. The third-party printer will place the downloaded PDF file into the printer queue 1305 for printing, as the printing supervisor monitors the printing. At the end of the print session, all PDF files will be removed from the printer. The printing supervisor will then record an end print counter number; both the printing supervisor and the third-party printer will then sign off on the end print counter number entered in the postage print log book.

At the end of the print and fulfillment session (after all prints and reprints are done) the final print counter value will be recorded in the exemplary postage print log book and signed off by the printing supervisor and the third-party printer. All PDF files from the laptop will be removed at the end of the print and fulfillment session (after post-print quality assurance inspection and review (described further below) and after all prints and reprints).

In the exemplary embodiment, reconciliation would then be undertaken. The number of prints (the difference between the start print counter value and the end print counter value) should be equal to the number of pages in the PDF file plus any misprinted pages. Any misprints or spoils will be voided. Misprinted sheets and rejected orders will be forwarded/returned to personnel within the Internet Postage provider organization for manual handling to resolve misprint problems. A copy of the daily exemplary postage print log book will be handed into to personnel within the Internet Postage provider organization for manual handling to resolve misprint problems, along with any misprints. In the exemplary embodiment, the exemplary postage print log book will remain in the possession of the printing supervisor.

With reference to FIGS. 3A through 3C, in the exemplary embodiment, as depicted in function 285, sheets of customized postage labels 65 will be produced.

With reference to FIG. 2B, the Print Delivery Application 1303 and Printer 1304 would perform the function 285 depicted in FIGS. 3A through 3C.

Returning with reference to FIGS. 3A through 3C, the completed printed order of customized postage labels 65 will then be examined in function 286 by post-print quality assurance administration reviewer. In function 287, the post-print quality assurance administration reviewer will determine whether or not the printed sheets of customized postage labels 65 pass post-print quality assurance inspection.

With reference to FIG. 2B, printed sheets of postage labels will be reviewed by a post-print quality assurance inspector using a post-print quality assurance inspection interface 1120, who will either reject the order 1122 or will accept the order 1123.

Returning with reference to FIGS. 3A through 3C, if the customized postage labels 65 do not pass post-print quality assurance inspection (elements 286, 287), the print problem/rejected labels/order 67, will need to be resolved in error-handling function 288. For example, the image of the rejected labels/order 67 corresponding to the respective customized postage label on the image file 60 could be re-initiated for further processing.

With reference to FIGS. 3A through 3C, if the customized postage labels 65 pass post-print quality assurance inspection (elements 286, 287), resulting in post-print-Q/A-passed customized postage labels 66, the order corresponding to the post-print-Q/A-passed customized postage labels 66 and the corresponding post-print-Q/A-passed customized postage labels 66 will be packaged and shipped in function 290. In function 290 (FIGS. 3A through 3C), the post-print-Q/A-passed customized postage labels 66 will be shipped to the respective user, or to a recipient designated by the respective user.

With reference to FIG. 2B, once all Order ID numbers in an order have successfully passed post-print quality assurance inspection/review, the printed order would be packaged 1402 and shipped 1403 and a shipping notification 1406 would be provided to the Account Server 1008, which would facilitate generation of an invoice and generation of an email 1010 to the user that the order has been shipped.

In the exemplary embodiment, in the event that a completed order is shipped and later discovered to have contained an image that violates QA standards, records in the system related to the image-customized computer-based postage-indicia-bearing items will be marked to designate that the image-customized computer-based postage-indicia-bearing items have been voided, and an email message will be sent to the ordering user and the receiving user; the email message will notify the ordering user and the receiving user that the printed order contains an impermissible image and that the image-customized computer-based postage-indicia-bearing items are void; and an adjustment to the ordering user's bill will be made to refund the amount of postage (but not the amount for shipping).

With reference to FIGS. 3A through 3C, the order corresponding to the passed customized postage labels 66 will be invoiced in function 295 to a credit card designated by the ordering user; also in function 295, files/databases will be updated to reflect completion of the order. An invoice would contain the following:
 Branding
 Sold to information
 Shipping information Barcode and human readable order number
Addressed adhesive label that shall be affixed to the appropriate envelope; this adhesive label would contain shipping name and address and aforementioned barcode.
Identifier of QA reviewer
Order Number
Order Date
Payment Method
Shipment Date
Method of Shipment
Overview of order line items, including:
  Iconic representation of image printed
  Textual description
  Unit (Sheet) Price
  Quantity of Sheets Ordered per SKU
  Extended Price
Sub Total
Shipping Cost (e.g., Flat-rate $2.99)
Tax ($0.00)
Invoice Total Price Once respective orders have been fulfilled, the postage label customization process is complete, as depicted in the "end" function 298.

With reference to FIG. 2B, payment from a user/credit card company enters the exemplary embodiment system through a payment gateway 1015 which provides payment information, via a communications means 1014, e.g., an HTTPS communications means, to a payment processor server 1011. The payment processor server 1011 serves payment information to the account server 1008, via a communications means 1012, e.g., an HTTPS communications means; account server 1008 would update account information with payment information.

Other features of the invention are implicit in the above-provided description and/or are depicted and/or implicit in the accompanying Figures.

Facsimile Reproduction of Copyright Material

A portion of the disclosure of this patent document contains material which is subject to copyright protection by the copyright owner, Stamps.com Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A method using a computer system comprising at least one computer device for managing image content for image customization of computer-based postage-indicia-bearing items, said method comprising:
  using the computer system for receiving a first quality assurance review result by a first quality assurance user for a user-supplied image for a respective order for at least one customized computer-based postage-indicia-bearing item, wherein said first quality assurance review result comprises an independent evaluation by the first quality assurance user without reference to any other evaluation of the user-supplied image;
  using the computer system for receiving a second quality assurance review result by a second quality assurance user for the user-supplied image for the respective order for the at least one customized computer-based postage-indicia-bearing item, wherein said second quality assurance review result comprises an independent evaluation by the second quality assurance user without reference to any other evaluation of the user-supplied image;
  using the computer system to evaluate the first quality assurance review result and the second quality assurance review result to determine an evaluation result comprising a purpose-specific indication for further purpose-specific processing;
  using the computer system for automatically determining further purpose-specific processing for the respective order according to said evaluation result by the computer system of the first quality assurance review result and the second quality assurance review result; and
  using the computer system for automatically saving the respective image for further purpose-specific processing in a particular purpose-specific further-processing queue of a plurality of purpose-specific further-processing queues according to said evaluation result, each of said purpose-specific further-processing queues comprising a computer-accessible repository of a plurality of images for which said evaluation result corresponds to a specific further-processing purpose.

2. The method of claim 1 said method further comprising:
said using the computer system for automatically saving the respective order for further purpose-specific processing comprising, for an evaluation result that indicates that one of the first quality assurance review result or the second quality assurance review result comprises an approval of the user-supplied image, and that one of the first quality assurance review result or the second quality assurance review result comprises a rejection of the user-supplied image, automatically saving the respective order in a further quality assurance review queue for further quality assurance review by a supervisory quality assurance reviewer.

3. The method of claim 1, said method further comprising:
said using the computer system for automatically saving the respective order for further purpose-specific processing comprising, for an evaluation result that indicates that the first quality assurance review result and the second quality assurance review result both indicate a rejection of the user-supplied image, automatically saving the respective order in a rejection processing queue for rejection processing.

4. The method of claim 1, said method further comprising:
said using the computer system for automatically saving the respective order for further purpose-specific processing comprising, for an evaluation result that indicates that at least one of the first quality assurance review result or the second quality assurance review result indicates that the user-supplied image was malicious, automatically saving the respective order in a malicious image suspect queue for further-quality assurance processing of malicious images.

5. The method of claim 1, said method further comprising:
said using the computer system for automatically saving the respective order for further purpose-specific processing comprising, for an evaluation result that indicates that at least one of the first quality assurance review result or the second quality assurance review result indicates escalation of the user-supplied image for supervisory review, automatically saving the respective order in an escalated quality review processing queue for escalated quality assurance processing of escalated images.

6. The method of claim 1, said method further comprising:
said using the computer system for automatically saving the respective order for further purpose-specific processing comprising, for an evaluation result that indicates that the first quality assurance review result and the second quality assurance review result both indicate an approval of the user-supplied image, automatically saving the respective order in a print processing queue for print processing for printing the respective order.

7. The method of claim 1, said method further comprising:
using the computer system for displaying a representation of the respective order from a first particular purpose-specific further processing queue, according to a request by a supervisory quality assurance user to inspect orders from the first particular purpose-specific further processing queue.

8. The method of claim 2, said method further comprising:
using the computer system for displaying a representation of the respective order from the further quality assurance processing queue, according to a request by a supervisory quality assurance user to inspect orders from the further quality assurance processing queue.

9. A computer system for managing image content for image customization of computer-based postage-indicia-bearing items, said computer system comprising at least one computer device, said at least one computer device programmed to:
automatically queue a user-supplied image for review by a first quality assurance user, and for review by a second quality assurance user, said user-supplied image for a respective order for at least one customized, computer-based postage-indicia-bearing item;
display the user-supplied image to a display monitor corresponding to review by the first quality assurance user;
display the user-supplied image to a display monitor corresponding to review by the second quality assurance user;
receive a first quality assurance review result by the first quality assurance user for the user-supplied image comprising an independent evaluation by the first quality assurance user without reference to any other evaluation of the user-supplied image;
receive a second quality assurance review result by the second quality assurance user for the user-supplied image comprising an independent evaluation by the second quality assurance user without reference to any other evaluation of the user-supplied image;
evaluate the first quality assurance review result and the second quality assurance review result to determine an evaluation result;
save the user-supplied image in a further-processing queue for further processing according to said evaluation result of the first quality assurance review result and the second quality assurance review result, said further-processing queue comprising a computer-accessible repository of a plurality of images for which said evaluation result corresponds to a particular further-processing purpose.

10. The computer system of claim 9, wherein said at least one computer device being programmed to save the user-supplied image in a further-processing queue for further processing comprises indicating that the user-supplied image is ready for further quality assurance review by a third quality assurance user, wherein the third quality assurance user is a supervisory reviewer with authority to make a final disposition of the respective order, wherein one of the first quality assurance review result and the second quality assurance review result indicates an approval of the user-supplied image, and wherein one of the first quality assurance review result and the second quality assurance review result indicates a rejection of the user-supplied image.

11. The computer system of claim 9, wherein said at least one computer device being programmed to save the user-supplied image in a further-processing queue for further processing comprises indicating that the user-supplied image is ready for rejection processing of the respective order, wherein the first quality assurance review result and the second quality assurance review result both indicate a rejection of the user-supplied image.

12. The computer system of claim 9, wherein said at least one computer device being programmed to save the user-supplied image in a further-processing queue for further processing comprises indicating that the user-supplied image is ready for further quality assurance processing of malicious images by a third quality assurance user, wherein the third quality assurance user is a supervisory reviewer with authority to make a final disposition of the respective order, wherein at least one of the first quality assurance review result and the second quality assurance review result indicates that the user-supplied image was malicious.

13. The computer system of claim 9, wherein said at least one computer device being programmed to save the user-supplied image in a further-processing queue for further processing comprises indicating that the user-supplied image is ready for escalated quality assurance processing of escalated images by a third quality assurance user, wherein the third quality assurance user is a supervisory reviewer with authority to make a final disposition of the respective order, wherein at least one of the first quality assurance review result and the second quality assurance review result indicates escalation of the user-supplied image for supervisory review.

14. The computer system of claim 9, wherein said evaluation result comprises an indication to automatically save the user-supplied image in a further quality assurance processing queue for further quality assurance processing by a third quality assurance user, wherein the third quality assurance user is a supervisory reviewer with authority to make a final disposition of the user-supplied image, wherein one or the other of the first quality assurance review result or the second quality assurance review result indicates a quality assurance review result other than an approval.

15. The method of claim 7, said method further comprising:
using the computer system for queuing the respective order for print processing in response to an approval of the user-supplied image by the supervisory quality assurance user; and
using the computer system for queuing the respective order for rejection processing in response to a rejection of the user-supplied image by the supervisory quality assurance user.

16. The computer system of claim 10, said at least one computer device further programmed to:

queue the respective order for print processing in response to an approval of the user-supplied image by the third quality assurance user; and queue the respective order for rejection processing in response to a final rejection of the user-supplied image by the third quality assurance user.

17. The computer system of claim 9, said at least one computer device further programmed to:

determine whether all user-supplied images associated with the respective order have been approved by quality assurance;

for the respective order for which all user-supplied images associated with the respective order have been approved by quality assurance, generate computer-based postage indicia for a plurality of customized postage labels and create customized postage labels comprising corresponding computer-based postage indicia and the user-supplied images associated with the respective order.

18. A computer system for managing image content for image customization of computer-based postage-indicia-bearing items, said computer system comprising at least one computer device, said at least one computer device programmed to:

automatically queue each user-supplied image associated with an order for at least one customized, computer-based postage-indicia-bearing item for review by a first quality assurance user, and for review by a second quality assurance user, said order comprising each said user-supplied image, a respective number of labels associated with each said user-supplied image, and a respective amount of postage for each label associated with each said user-supplied image;

for each said user-supplied image:

display said user-supplied image to a display monitor corresponding to review by the first quality assurance user, display said user-supplied image to a display monitor corresponding to review by the second quality assurance user, receive a first quality assurance review result by the first quality assurance user for said user-supplied image comprising an independent evaluation by the first quality assurance user without reference to any other evaluation of the user-supplied image, receive a second quality assurance review result by the second quality assurance user for said user-supplied image comprising an independent evaluation by the second quality assurance user without reference to any other evaluation of the user-supplied image, evaluate the first quality assurance review result and the second quality assurance review result to determine an evaluation result, save in a memory storage associated with said user-supplied image, an indication of said evaluation result of the first quality assurance review result and the second quality assurance review result, test each evaluation result in the memory storage associated with said user-supplied image associated with the order; and for the order for which each said evaluation result associated with each said user-supplied image indicates that each said user-supplied image has passed quality assurance review, create customized postage labels for the respective number of labels, each customized postage label comprising the respective user-supplied image and computer-based postage indicia for the respective amount of postage.

* * * * *